(12) United States Patent
Chang et al.

(10) Patent No.: US 10,816,765 B2
(45) Date of Patent: *Oct. 27, 2020

(54) SIX LENS OPTICAL IMAGE CAPTURING SYSTEM HAVING VISIBLE AND INFRARED IMAGE PLANES

(71) Applicant: ABILITY OPTO-ELECTRONICS TECHNOLOGY CO.LTD., Taichung (TW)

(72) Inventors: Yeong-Ming Chang, Taichung (TW); Kuo-Yu Liao, Taichung (TW); Chien-Hsun Lai, Taichung (TW); Yao-Wei Liu, Taichung (TW)

(73) Assignee: Ability Opto-Electronics Technology Co. Ltd., Taichung (TW)

( * ) Notice: Subject to any disclaimer, the term of this patent is extended or adjusted under 35 U.S.C. 154(b) by 191 days.

This patent is subject to a terminal disclaimer.

(21) Appl. No.: 16/031,293

(22) Filed: Jul. 10, 2018

(65) Prior Publication Data
US 2019/0243104 A1    Aug. 8, 2019

(30) Foreign Application Priority Data
Feb. 8, 2018 (TW) .............................. 107104562 A

(51) Int. Cl.
*G02B 9/62* (2006.01)
*G02B 13/00* (2006.01)
(Continued)

(52) U.S. Cl.
CPC ........... *G02B 13/0045* (2013.01); *G02B 9/62* (2013.01); *G02B 13/008* (2013.01); *G02B 9/64* (2013.01);
(Continued)

(58) Field of Classification Search
CPC .... G02B 9/64; G02B 13/0045; G02B 13/008; G02B 13/14; G02B 13/146; G02B 13/18; G02B 27/0012
(Continued)

(56) References Cited

U.S. PATENT DOCUMENTS 10,495,860 B2 * 12/2019 Liu ...................... G02B 15/142
2013/0215520 A1    8/2013 Lai et al.

FOREIGN PATENT DOCUMENTS

| CN | 104423022 A | 3/2015 |
|---|---|---|
| CN | 105511054 A | 4/2016 |

(Continued)

*Primary Examiner* — Ryan S Dunning
(74) *Attorney, Agent, or Firm* — Muncy, Geissler, Olds & Lowe, P.C.

(57) ABSTRACT

An optical image capturing system is provided. In order from an object side to an image side, the optical image capturing system includes a first lens, a second lens, a third lens, a fourth lens, a fifth lens, and a sixth lens. At least one lens among the first lens to the fifth lens has positive refractive power. The sixth lens may have negative refractive power and an object side and an image side thereof are aspherical wherein at least one surface of the sixth lens has an inflection point. The optical image capturing system has six lenses with refractive power. When meeting some certain conditions, the optical image capturing system may have outstanding light-gathering ability and an adjustment ability about the optical path in order to elevate the image quality.

25 Claims, 30 Drawing Sheets

(51) Int. Cl.
   G02B 9/64    (2006.01)
   G02B 13/14   (2006.01)
   G02B 27/00   (2006.01)
(52) U.S. Cl.
   CPC ............ *G02B 13/14* (2013.01); *G02B 13/146* (2013.01); *G02B 27/0012* (2013.01)
(58) Field of Classification Search
   USPC ......... 359/355–357, 435, 722, 723, 755–762
   See application file for complete search history.

(56) References Cited

FOREIGN PATENT DOCUMENTS

| | | |
|---|---|---|
| CN | 106405790 A | 2/2017 |
| CN | 106468822 A | 3/2017 |
| CN | 106468823 A | 3/2017 |
| CN | 206178233 U | 5/2017 |
| CN | 206178234 U | 5/2017 |
| CN | 107203030 A | 9/2017 |
| CN | 107272147 A | 10/2017 |
| CN | 107632367 A | 1/2018 |
| TW | 201508313 A | 3/2015 |
| TW | 201533469 A | 9/2015 |
| WO | WO-2012008357 A1 | 1/2012 |

\* cited by examiner

SIX LENS OPTICAL IMAGE CAPTURING SYSTEM HAVING VISIBLE AND INFRARED IMAGE PLANES

CROSS-REFERENCE TO RELATED APPLICATION

This application claims priority from Taiwan Patent Application No. 107104562, filed on Feb. 8, 2018, in the Taiwan Intellectual Property Office, the content of which is hereby incorporated by reference in its entirety for all purposes.

BACKGROUND OF THE INVENTION

1. Field of the Invention

The present disclosure relates to an optical image capturing system, and more particularly is about a minimized optical image capturing system which can be applied to electronic products.

2. Description of the Related Art

In recent years, with the rise of portable electronic devices having camera functionalities, the demand for an optical image capturing system has gradually been raised. The image sensing device of the ordinary photographing camera is commonly selected from a charge coupled device (CCD) or a complementary metal-oxide semiconductor sensor (CMOS Sensor). Also, as advanced semiconductor manufacturing technology enables the minimization of the pixel size of the image sensing device, the development of the optical image capturing system has gravitated towards the field of high pixels. Therefore, the requirement for high imaging quality has been rapidly increasing.

The conventional optical system of a portable electronic device usually has four or five lens elements. However, the optical system is required to have higher resolution and take pictures in a dark environment, in other words, the optical system is asked to have a large aperture stop. A conventional optical system which cannot provide higher optical performance is required.

Therefore, it is an important issue about how to effectively increase the amount of light admitted into the optical image capturing system and further elevate the image quality thereof.

SUMMARY OF THE INVENTION

The aspect of embodiment of the present disclosure directs to an optical image capturing system and an optical image capturing lens which uses a combination of refractive powers, convex and concave surfaces of six lenses (the convex surface or concave surface in the present invention is the change of geometrical shape of the object side or an image side of each lens at different heights from an optical axis) to increase the amount of light admitted into the optical image capturing system, and to elevate quality of image formation, so that the optical image capturing system can be applied to the minimized electronic products.

Furthermore, in certain application of optical imaging, there will be a need to capture an image underway for recording or analyzing the light of the visible wavelength and the infrared wavelength, for example, an IP video surveillance camera. IP video surveillance camera may need to be equipped with a Day & Night function. The main reason is that the visible spectrum for human vision has wavelengths ranging from 400 to 700 nm, but the image formed on the camera sensor includes infrared light, which is invisible to human eyes. Therefore, based on the circumstances, an IR cut filter removable (ICR) is placed in front of the camera lens of the IP video surveillance camera in order to increase the "fidelity" of the image, which can prevent infrared light and color shift in the daytime; which can also allow infrared light coming at night to elevate luminance. Nevertheless, the elements of the ICR occupy a significant amount of space and are expensive, which impedes the design and manufacture of miniaturized surveillance cameras in the future.

One aspect of embodiment of the present invention directs to an optical image capturing system and an optical image capturing camera lens simultaneously. The optical image capturing system and an optical image capturing camera lens can utilize the combination of refractive powers, convex surfaces and concave surfaces of four lens and the selection of materials thereof to reduce the difference between the imaging focal length of visible light and imaging focal length of infrared light and to achieve the near "confocal" effect without the use of an ICR element.

The terms and their definition for the lens parameters in the embodiment of the present invention are shown as below for further reference.

The Lens Parameters Related to the Magnification of the Optical Image Capturing System The present invention of the optical image capturing system and the optical image capturing camera lens may be designed and applied to biometric technology, for example, facial recognition. When the embodiment of the present invention is configured to capture image for facial recognition, infrared light may be selected as the operation wavelength. At the same time, for a face of about 15 centimeters (cm) wide at a distance of 25-30 cm, at least 30 horizontal pixels can be formed in the horizontal direction of an photosensitive element (pixel size of 1.4 micrometers (μm)). The linear magnification of infrared light on the image plane is LM, and it meets the following conditions: LM=(30 horizontal pixels)*(1.4 μm pixel size)/(15 cm, width of the photographed object); LM≥0.0003. When visible light is adopted as the operation wavelength, for a face of about 15 cm wide at a distance of 25-30 cm, at least 50 horizontal pixels can be formed in the horizontal direction of a photosensitive element (pixel size of 1.4 micrometers (μm)).

The Lens Parameter Related to a Length or a Height

For visible spectrum, the present invention may select the wavelength of 555 nm as the primary reference wavelength and the basis for the measurement of focus shift. For infrared spectrum (700 nm-1300 nm), the present invention may select the wavelength of 850 nm as the primary reference wavelength and the basis for the measurement of focus shift.

The optical image capturing system has a first image plane and a second image plane. The first image plane which is perpendicular to the optical axis is an image plane specifically for visible light, and the through focus modulation transfer rates (value of MTF) at the first spatial frequency has a maximum value at the central field of view of the first image plane. The second image plane which is perpendicular to the optical axis is an image plane specifically for infrared light, and the through focus modulation transfer rates (value of MTF) at the first spatial frequency has a maximum value at the central of field of view of the second image plane. The optical image capturing system further has a first average image plane and a second average image plane. The first average image plane which is perpendicular to the optical axis is an image plane specifically for visible light. And the first average image plane is disposed at the average position of the defocusing positions, where the values of MTF of visible light at the central field of view, 0.3 field of view, and the 0.7 field of view are respectively at corresponding maximum at the first spatial frequency. The second average image plane which is perpendicular to the optical axis is an image plane specifically for infrared light. The second average image plane is disposed at the average position of the defocusing positions, where the values of MTF of infrared light at the central field of view, 0.3 field of view, and the 0.7 field of view are respectively at corresponding maximum at the first spatial frequency.

The aforementioned first spatial frequency is set to be an half spatial frequency (half frequency) of a photosensitive element (sensor) used in the present invention. For example, the photosensitive element having the pixel size of 1.12 μm or less, of which the quarter spatial frequency, half spatial frequency (half frequency) and full spatial frequency (full frequency) in the characteristic diagram of modulation transfer function are respectively at least 110 cycles/mm, 220 cycles/mm and 440 cycles/mm. Rays of any field of view can be further divided into sagittal ray and tangential ray.

The focus shifts where the through focus MTF values of the visible sagittal ray at the central field of view, 0.3 field of view, and 0.7 field of view of the optical image capturing system of the present invention are at their respective maxima, are respectively expressed as VSFS0, VSFS3, and VSFS7 (unit of measurement: mm). The maximum values of the through focus MTF of the visible sagittal ray at the central field of view, 0.3 field of view, and 0.7 field of view are respectively expressed as VSMTF0, VSMTF3, and VSMTF7. The focus shifts. where the through focus MTF values of the visible tangential ray at the central field of view, 0.3 field of view, and 0.7 field of view of the optical image capturing system of the present invention are at their respective maxima, are respectively expressed as VTFS0, VTFS3, and VTFS7 (unit of measurement: mm). The maximum values of the through focus MTF of the visible tangential ray at the central field of view, 0.3 field of view, and 0.7 field of view are respectively expressed as VTMTF0, VTMTF3, and VTMTF7. The average focus shift (position) of both of the aforementioned focus shifts of the visible sagittal ray at three fields of view and focus shifts of the visible tangential ray at three fields of view is expressed as AVFS (unit of measurement: mm), which meets the absolute value $|(VSFS0+VSFS3+VSFS7+VTFS0+VTFS3+VTFS7)/6|$.

The focus shifts, where the through focus MTF values of the infrared sagittal ray at the central field of view, 0.3 field of view, and 0.7 field of view of the optical image capturing system of the present invention are at their respective maxima, are respectively expressed as ISFS0, ISFS3, and ISFS7 (unit of measurement: mm). The average focus shift (position) of the aforementioned focus shifts of the infrared sagittal ray at three fields of view is expressed as AISFS (unit of measurement: mm). The maximum values of the through focus MTF of the infrared sagittal ray at the central field of view, 0.3 field of view. and 0.7 field of view are respectively expressed as ISMTF0, ISMTF3, and ISMTF7. The focus shifts, where the through focus MTF values of the infrared tangential ray at the central field of view, 0.3 field of view, and 0.7 field of view of the optical image capturing system of the present invention are at their respective maxima, are respectively expressed as ITFS0, ITFS3, and ITFS7 (unit of measurement: mm). The average focus shift (position) of the aforementioned focus shifts of the infrared tangential ray at three fields of view is expressed as AITFS (unit of measurement: mm). The maximum values of the through focus MTF of the infrared tangential ray at the central field of view, 0.3 field of view, and 0.7 field of view are respectively expressed as ITMTF0, ITMTF3, and ITMTF7. The average focus shift (position) of both of the aforementioned focus shifts of the infrared sagittal ray at the three fields of view and focus shifts of the infrared tangential ray at the three fields of view is expressed as AIFS (unit of measurement: mm), which meets the absolute value of $|(ISFS0+ISFS3+ISFS7+ITFS0+ITFS3+ITFS7)/6|$.

The focus shift between the focal points of visible light and the focal points of infrared light at their central fields of view (RGB/IR) of the entire optical image capturing system (i.e. wavelength of 850 nm versus wavelength of 555 nm, unit of measurement: mm) is expressed as FS, which meets the absolute value $|(VSFS0+VTFS0)/2-(ISFS0+ITFS0)/2|$. The difference (focus shift) between the average focus shift of visible light at the three fields of view and the average focus shift of infrared light at the three fields of view (RGB/IR) of the entire optical image capturing system is expressed as AFS (i.e. wavelength of 850 nm versus wavelength of 555 nm, unit of measurement: mm), which meets the absolute value of $|AIFS-AVFS|$.

The maximum height of an image of the optical image capturing system is expressed as HOI. The height of the optical image capturing system is expressed as HOS. The distance from the object side of the first lens of the optical image capturing system to the image side of the sixth lens of the optical image capturing system is expressed as InTL. The distance from a fixed aperture (stop) of the optical image capturing system to the first image plane of the optical image capturing system is expressed as InS. The distance from the first lens of the optical image capturing system to the second lens of the optical image capturing system is expressed as IN12 (example). The thickness of the first lens of the optical image capturing system on the optical axis is expressed as TP1 (example).

The Lens Parameter Related to the Material

A coefficient of dispersion of the first lens in the optical image capturing system is expressed as NA1 (example); the refractive index of the first lens is expressed as Nd1 (example).

The Lens Parameter Related to View Angle

The angle of view is expressed as AF. Half of the angle of view is expressed as HAF.

The angle of a chief ray is expressed as MRA.

The Lens Parameter Related to Exit/Entrance Pupil

The entrance pupil diameter of the optical image capturing system is expressed as HEP. The maximum effective half diameter (EHD) of any surface of a single lens refers to a perpendicular height between the optical axis and an intersection point, where the incident ray at the maximum angle of view passes through the most marginal entrance pupil and intersects with the surface of the lens. For example, the maximum effective half diameter of the object side of the first lens is expressed as EHD11. The maximum effective half diameter of the image side of the first lens is expressed as EHD 12. The maximum effective half diameter of the object side of the second lens is expressed as EHD21. The maximum effective half diameter of the image side of the second lens is expressed as EHD22. The maximum effective half diameters of any surfaces of other lens in the optical image capturing system are expressed in the similar way.

The Lens Parameter Related to the Surface Depth of the Lens

The distance parallel to an optical axis, which is measured from the intersection point where the object side of the sixth lens crosses the optical axis to the terminal point of the maximum effective half diameter outline curve on the object side of the sixth lens is expressed as InRS61 (depth of the EHD). The distance parallel to an optical axis, which is measured from the intersection point where the image side of the sixth lens crosses the optical axis to the terminal point of the maximum effective half diameter outline curve on the image side of the sixth lens is expressed as InRS62 (depth of the EHD). The depths of the EHD (sinkage values) on the object side or the image side of other lens are expressed in similar way.

The Lens Parameter Related to the Shape of the Lens

The critical point C is a point which is tangential to the tangential plane being perpendicular to the optical axis is on the specific surface of the lens except that an intersection point which crosses the optical axis on the specific surface of the lens. In addition to the description above, for example, the perpendicular distance between the critical point C51 on the object side of the fifth lens and the optical axis is HVT51 (example), the perpendicular distance between a critical point C52 on the image side of the fifth lens and the optical axis is HVT52 (example), the perpendicular distance between the critical point C61 on the object side of the sixth lens and the optical axis is HVT61 (example) and the perpendicular distance between a critical point C62 on the image side of the sixth lens and the optical axis is HVT62 (example). The perpendicular distances between the critical point on the image side or object side of other lens and the optical axis are expressed in similar way.

The inflection point on the object side of the sixth lens that is the first nearest to the optical axis is expressed as IF611, and the sinkage value of that inflection point IF611 is expressed as SGI611 (example). That is, the sinkage value SGI611 is a horizontal displacement distance parallel to the optical axis, which is measured from the intersection point crossing the optical axis on the object side of the sixth lens to the inflection point the first nearest to the optical axis on the object side of the sixth lens. The perpendicular distance between the inflection point IF611 and the optical axis is HIF611 (example). The inflection point on the image side of the sixth lens that is the first nearest to the optical axis is expressed as IF621, and the sinkage value of the inflection point IF621 is expressed as SGI621 (example). That is, the sinkage value SGI611 is a horizontal displacement distance parallel to the optical axis, which is measured from the intersection point crossing the optical axis on the image side of the sixth lens to the inflection point the first nearest to the optical axis on the image side of the sixth lens. The perpendicular distance between the inflection point IF621 and the optical axis is HIF621 (example).

The inflection point on object side of the sixth lens that is the second nearest to the optical axis is expressed as IF612, and the sinkage value of that inflection point IF612 is expressed as SGI612 (example). That is, the sinkage value SGI612 is a horizontal displacement distance parallel to the optical axis, which is measured from the intersection point crossing the optical axis on the object side of the sixth lens to the inflection point the second nearest to the optical axis on the object side of the sixth lens. The perpendicular distance between the inflection point IF612 and the optical axis is HIF612 (example). The inflection point on image side of the sixth lens that is the second nearest to the optical axis is expressed as IF622, and the sinkage value of the inflection point IF622 is expressed as SGI622 (example). That is, the sinkage value SGI622 is a horizontal displacement distance parallel to the optical axis, which is measured from the intersection point crossing the optical axis on the image side of the sixth lens to the inflection point the second nearest to the optical axis on the image side of the sixth lens. The perpendicular distance between the inflection point IF622 and the optical axis is HIF622 (example).

The inflection point on the object side of the sixth lens that is the third nearest to the optical axis is expressed as IF613, and the sinkage value of the inflection point IF613 is expressed as SGI613 (example). That is, the sinkage value SGI613 is a horizontal displacement distance parallel to the optical axis, which is measured from the intersection point crossing the optical axis on the object side of the sixth lens to the inflection point the third nearest to the optical axis on the object side of the sixth lens. The perpendicular distance between the inflection point IF613 and the optical axis is HIF613 (example). The inflection point on image side of the sixth lens that is the third nearest to the optical axis is expressed as IF623, and the sinkage value of the inflection point IF623 is expressed as SGI623 (example). That is, the sinkage value SGI623 is a horizontal displacement distance parallel to the optical axis, which is measured from the intersection point crossing the optical axis on the image side of the sixth lens to the inflection point the third nearest to the optical axis on the image side of the sixth lens. The perpendicular distance between the inflection point IF623 and the optical axis is HIF623 (example).

The inflection point on object side of the sixth lens that is the fourth nearest to the optical axis is expressed as IF614, and the sinkage value of the inflection point IF614 is expressed as SGI614 (example). That is, the sinkage value SGI614 is a horizontal displacement distance parallel to the optical axis, which is measured from the intersection point crossing the optical axis on the object side of the sixth lens to the inflection point the fourth nearest to the optical axis on the object side of the sixth lens. The perpendicular distance between the inflection point IF614 and the optical axis is HIF614 (example). The inflection point on image side of the sixth lens that is the fourth nearest to the optical axis is expressed as IF624, and the sinkage value of the inflection point IF624 is expressed as SGI624 (example). That is, the sinkage value SGI624 is a horizontal displacement distance parallel to the optical axis, which is measured from the intersection point crossing the optical axis on the image side of the sixth lens to the inflection point fourth nearest to the optical axis on the image side of the sixth lens. The perpendicular distance between the inflection point IF624 and the optical axis is HIF624 (example).

The inflection points on the object side or the image side of the other lens and the perpendicular distances between them and the optical axis, or the sinkage values thereof are expressed in the similar way described above.

The Lens Element Parameter Related to the Aberration

Optical distortion for image formation in the optical image capturing system is expressed as ODT. TV distortion for image formation in the optical image capturing system is expressed as TDT. Furthermore, the degree of aberration offset can be further described within the limited range of 50% to 100% field of view of the formed image. The offset of the spherical aberration is expressed as DFS. The offset of the coma aberration is expressed as DFC.

The characteristic diagram of the modulation transfer function of the optical image capturing system is used for testing and evaluating the contrast ratio and the sharpness ratio of the image. The vertical coordinate axis of the characteristic diagram of modulation transfer function indicates a contrast transfer rate (values are from 0 to 1). The horizontal coordinate axis indicates a spatial frequency (cycles/mm; lp/mm; line pairs per mm). Theoretically, an ideal image capturing system can 100% show the line contrast of a photographed object. However, the values of the contrast transfer rate at the vertical coordinate axis are smaller than 1 in the actual image capturing system. In addition, comparing to the central region, it is generally more difficult to achieve a fine degree of recovery in the edge region of the image. The contrast transfer rates (MTF values) with spatial frequencies of 55 cycles/m at the optical axis, 0.3 field of view and 0.7 field of view of a visible spectrum on the image plane are respectively expressed as MTFE0, MTFE3 and MTFE7. The contrast transfer rates (MTF values) with spatial frequencies of 110 cycles/m at the optical axis, 0.3 field of view and 0.7 field of view of a visible spectrum on the image plane are respectively expressed as MTFQ0, MTFQ3 and MTFQ7. The contrast transfer rates (MTF values) with spatial frequencies of 220 cycles/m at the optical axis, 0.3 field of view and 0.7 field of view of a visible spectrum on the image plane are respectively expressed as MTFH0, MTFH3 and MTFH7. The contrast transfer rates (MTF values) with spatial frequencies of 440 cycles/m at the optical axis, 0.3 field of view and 0.7 field of view of a visible spectrum on the image plane are respectively expressed as MTF0, MTF3 and MTF7. The three fields of view described above are representative to the center, the internal field of view and the external field of view of the lens. Thus, they may be used to evaluate whether the performance of a specific optical image capturing system is excellent. If the design of the optical image capturing system corresponds to a sensing device where the pixel size is below and/or equal to 1.12 micrometers, the quarter spatial frequencies, the half spatial frequencies (half frequencies) and the full spatial frequencies (full frequencies) of the characteristic diagram of modulation transfer function respectively are at least 110 cycles/mm, 220 cycles/mm and 440 cycles/mm.

If an optical image capturing system needs to satisfy requirements with the images of infrared spectrum and visible spectrum simultaneously, such as the requirement for night vision with lower light source, the used wavelength may be 850 nm or 800 nm. As the main function is to recognize shape of an object formed in black-and-white environment, the high resolution is unnecessary and a spatial frequency, which is less than 110 cycles/mm is used to evaluate the functionality of the infrared spectrum of the specific optical image capturing system. When the foregoing wavelength 850 nm focuses on the image plane, the contrast transfer rates (MTF values) with a spatial frequency of 55 cycles/mm at the optical axis, 0.3 field of view and 0.7 field of view on the image plane are respectively expressed as MTFI0, MTFI3 and MTFI7. However, because the difference between the infrared wavelength of 850 nm or 800 nm and the wavelength of the general visible light wavelength is long, it is hard to design an optical image capturing system which not only has to focus on visible light and infrared light (dual-mode) but also achieves a certain function respectively.

The present invention provides an optical image capturing system. The present invention may not only focus on visible light and infrared light (dual-mode) but also achieve a certain function respectively. The object side or the image side of the sixth lens may have inflection points, such that the angle of incidence from each field of view to the sixth lens can be adjusted effectively and the optical distortion and the TV distortion can be corrected as well. Besides, the surfaces of the sixth lens may be endowed with better capability to adjust the optical path, which elevate better image quality.

An optical image capturing system is provided in accordance with the present invention. In the order from an object side to an image side, the optical image capturing system includes a first lens, a second lens, a third lens, a fourth lens, a fifth lens, a sixth lens, a first image plane, and a second image plane. The first image plane is an image plane specifically for visible light and perpendicular to an optical axis, and through focus modulation transfer rates (MTF) of the central field of view of the first image plane having a maximum value at a first spatial frequency. The second image plane is an image plane specifically for infrared light and perpendicular to the optical axis, and through focus modulation transfer rates (MTF) of the central of field of view of the second image plane having a maximum value at the first spatial frequency. The first lens to the fifth lens each has a refractive power. Focal lengths of the six lenses are respectively f1, f2, f3, f4, f5 and f6. The focal length of the optical image capturing system is f. The entrance pupil diameter of the optical image capturing system is HEP. There is a distance HOS on an optical axis from the object side of the first lens to the first image plane. A half maximum angle of view of the optical image capturing system is HAF. The optical image capturing system has a maximum image height HOI on the first image plane that is perpendicular to the optical axis. The distance on the optical axis between the first image plane and the second image plane is FS. There is at least one lens made of the plastic material among the first lens to the sixth lens. Thicknesses of the first lens through sixth lens at a height of ½ HEP and parallel to the optical axis are respectively ETP1, ETP2, ETP3, ETP4, ETP5 and ETP6. A sum of ETP1 to ETP6 is SETP. Thicknesses of the first lens through sixth lens on the optical axis are respectively TP1, TP2, TP3, TP4, TP5 and TP6. A sum of TP1 to TP6 is STP. The optical image capturing system meets the following conditions: $1.0 \le f/HEP \le 10.0$; $0 \deg < HAF \le 150 \deg$; $0.2 \le SETP/STP < 1$ and $|FS| \le 15$ μm.

Another optical image capturing system is further provided in accordance with the present invention. In the order from an object side to an image side, the optical image capturing system includes a first lens, a second lens, a third lens, a fourth lens, a fifth lens, a sixth lens, a first image plane, and a second image plane. The first image plane is an image plane specifically for visible light and perpendicular to an optical axis, and through focus modulation transfer rates (MTF) of the central field of view of the first image plane having a maximum value at a first spatial frequency. The second image plane is an image plane specifically for infrared light and perpendicular to the optical axis, and through focus modulation transfer rates (MTF) of the central field of view of the second image plane having a maximum value at the first spatial frequency. The first lens has refractive power and the object side thereof near the optical axis is convex. The second lens has refractive power. The third lens has refractive power. The fourth lens, fifth lens and sixth lens have refractive powers. The optical image capturing system has a maximum image height HOI on the first image plane that is perpendicular to the optical axis. There is at least one lens made of glass material among the first lens to the sixth lens. There is at least one lens having positive refractive power among the first lens to the sixth lens. Focal lengths of the six lenses are respectively f1, f2, f3, f4, f5 and f6. Focal lengths of the first lens to the fifth lens are respectively f1, f2, f3, f4 and f5. The focal length of the optical image capturing system is f. The entrance pupil diameter of the optical image capturing system is HEP. There is a distance HOS on the optical axis from the object side of the first lens to the first image plane. The half maximum angle of view of the optical image capturing system is HAF. The optical image capturing system has a maximum image height HOT on the first image plane that is perpendicular to the optical axis. The distance on the optical axis between the first image plane and the second image plane is FS. There is at least two lens made of the plastic material among the first lens to the sixth lens. The distance parallel to the optical axis between a coordinate point at a height of ½ HEP on the object side of the first lens and the first image plane is ETL. The distance parallel to the optical axis between a first coordinate point at a height of ½ HEP on the image side of the sixth lens and the coordinate point at a height of ½ HEP on the object side of the first lens is EIN. The optical image capturing system meets the following conditions: 1≤f/HEP≤10; 0 deg<HAF≤150 deg; 0.2≤EIN/ETL<1 and |FS|≤15 μm.

Yet another optical image capturing system is further provided in accordance with the present disclosure. In the order from the object side to an image side, the optical image capturing system includes a first lens, a second lens, a third lens, a fourth lens, a first average image plane, and a second average image plane. A first average image plane is an image plane specifically for visible light and perpendicular to an optical axis. And the first average image plane is disposed at the average position of the defocusing positions, where through focus modulation transfer rates (values of MTF) of visible light at central field of view, 0.3 field of view, and 0.7 field of view of the optical image capturing system are respectively at corresponding maximum at a first spatial frequency. A second average image plane is an image plane specifically for infrared light and perpendicular to the optical axis. And the second average image plane is disposed at the average position of the defocusing positions, where through focus modulation transfer rates of infrared light (values of MTF) at central field of view, 0.3 field of view, and 0.7 field of view the optical image capturing system are respectively at corresponding maximum at the first spatial frequency. The optical image capturing system has six lenses with refractive powers. The optical image capturing system has a maximum image height HOI on the first image plane that is perpendicular to the optical axis. The first lens has refractive power. The second lens has refractive power. The third lens has refractive power. The fourth lens, fifth lens and sixth lens have refractive powers. Focal lengths of the six lenses are respectively f1, f2, f3, f4, f5 and f6. The focal length of the optical image capturing system is f. The entrance pupil diameter of the optical image capturing system is HEP. There is a distance HOS on the optical axis from the object side of the first lens to the first average image plane. The half maximum angle of view of the optical image capturing system is HAF. The optical image capturing system has a maximum image height HOI on the first average image plane that is perpendicular to the optical axis. With a point on the any surface of any one of the six lenses which crosses the optical axis defined as a starting point, a length of the outline curve from the starting point to a coordinate point of vertical height with a distance from the optical axis to the half entrance pupil diameter on the surface along the outline of the surface is ARE. The distance between the first average image plane and the second average image plane is expressed as AFS. The first lens to the sixth lens are made of the plastic material. Thicknesses of the first lens through the sixth lens at a height of ½ HEP and parallel to the optical axis are respectively ETP1, ETP2, ETP3, ETP4, ETP5 and ETP6. A sum of ETP1 to ETP6 is SETP. Thicknesses of the first lens through the sixth lens on the optical axis are respectively TP1, TP2, TP3, TP4, TP5 and TP6. A sum of TP1 to TP6 is STP. The optical image capturing system meets the following conditions: 1.0≤f/HEP≤10.0; 0 deg<HAF≤150 deg; 0.2≤SETP/STP<1 and |AFS|≤15 μm.

A thickness of a single lens at height of ½ entrance pupil diameter (HEP) particularly affects the corrected aberration of common area of each field of view of light and the capability of correcting optical path difference between each field of view of light in the scope of ½ entrance pupil diameter (HEP). The capability of aberration correction is enhanced if the thickness becomes greater, but the difficulty for manufacturing is also increased at the same time. Therefore, it is necessary to control the thickness of a single lens at height of ½ entrance pupil diameter (HEP), in particular to control the ratio relation (ETP/TP) between the thickness (ETP) of the lens at height of ½ entrance pupil diameter (HEP) and the thickness (TP) of the lens to which the surface belongs on the optical axis. For example, the thickness of the first lens at height of ½ entrance pupil diameter (HEP) is expressed as ETP1. The thickness of the second lens at height of ½ entrance pupil diameter (HEP) is expressed as ETP2. The thicknesses of other lens at height of ½ entrance pupil diameter (HEP) are expressed in the similar way. A sum of ETP1 to ETP6 described above is SETP. The embodiments of the present invention may satisfy the following relation: 0.3≤SETP/EIN<1.

In order to enhance the capability of aberration correction and reduce the difficulty for manufacturing at the same time, it is particularly necessary to control the ratio relation (ETP/TP) between the thickness (ETP) of the lens at height of ½ entrance pupil diameter (HEP) and the thickness (TP) of the lens to which the surface belongs on the optical axis. For example, the thickness of the first lens at height of ½ entrance pupil diameter (HEP) is expressed as ETP1. The thickness of the first lens on the optical axis is TP1. The ratio between both of them is ETP1/TP1. The thickness of the second lens at height of ½ entrance pupil diameter (HEP) is expressed as ETP2. The thickness of the second lens on the optical axis is TP2. The ratio between both of them is ETP2/TP2. The ratio relations between the thicknesses of other lens in the optical image capturing system at height of ½ entrance pupil diameter (HEP) and the thicknesses (TP) of the lens on the optical axis lens are expressed in the similar way. The embodiments of the present invention may satisfy the following relation: 0.2≤ETP/TP≤3.

The horizontal distance between two adjacent lenses at height of ½ entrance pupil diameter (HEP) is expressed as ED. The horizontal distance (ED) described above is parallel to the optical axis of the optical image capturing system and particularly affects the corrected aberration of common area of each field of view of light and the capability of correcting optical path difference between each field of view of light at the position of ½ entrance pupil diameter (HEP). The capability of aberration correction may be enhanced if the horizontal distance becomes greater, but the difficulty for manufacturing is also increased and the degree of 'miniaturization' due to the length of the optical image capturing system is restricted. Therefore, it is essential to control the horizontal distance (ED) between two specific adjacent lens at height of ½ entrance pupil diameter (HEP).

In order to enhance the capability of aberration correction and reduce the difficulty for 'miniaturization' due to the length of the optical image capturing system at the same time, it is particularly necessary to control the ratio relation (ED/IN) of the horizontal distance (ED) between the two adjacent lens at height of ½ entrance pupil diameter (HEP) to the horizontal distance (IN) between the two adjacent lens on the optical axis. For example, the horizontal distance between the first lens and the second lens at height of ½ entrance pupil diameter (HEP) is expressed as ED12. The horizontal distance between the first lens and the second lens on the optical axis is IN12. The ratio between both of them is ED12/IN12. The horizontal distance between the second lens and the third lens at height of ½ entrance pupil diameter (HEP) is expressed as ED23. The horizontal distance between the second lens and the third lens on the optical axis is IN23. The ratio between both of them is ED23/IN23. The ratio relations of the horizontal distances between other two adjacent lens in the optical image capturing system at height of ½ entrance pupil diameter (HEP) to the horizontal distances between the two adjacent lens on the optical axis are expressed in the similar way.

A horizontal distance parallel to the optical axis from a coordinate point on the image side of the sixth lens at height ½ HEP to the image plane is EBL. A horizontal distance parallel to the optical axis from an intersection point on the image side of the sixth lens crossing the optical axis to the image plane is BL. The embodiments of the present invention enhance the capability of aberration correction and reserve space for accommodating other optical elements. It may satisfy the following relation: 0.2≤EBL/BL<1.1. The optical image capturing system may further include a light filtering element. The light filtering element is located between the sixth lens and the image plane. The distance parallel to the optical axis from a coordinate point on the image side of the sixth lens at height ½ HEP to the light filtering element is EIR. The distance parallel to the optical axis from an intersection point on the image side of the sixth lens crossing the optical axis to the light filtering element is PIR. The embodiments of the present invention may meet the following relation: 0.1≤EIR/PIR≤1.1.

The height of optical system (HOS) may be reduced to achieve the minimization of the optical image capturing system when the absolute value of f1 is larger than f6 (|f1|>|f6|).

When |f2|+|f3|+|f4|+|f5| and |f1|+|f6| meet the aforementioned conditions, at least one lens among the second lens to the fifth lens may have a weak positive refractive power or a weak negative refractive power. The weak refractive power indicates that an absolute value of the focal length of a specific lens is greater than 10. When at least one lens among the second lens to fifth lens has the weak positive refractive power, the positive refractive power of the first lens can be shared by it, such that the unnecessary aberration will not appear too early. On the contrary, when at least one lens among the second lens to the fifth lens has the weak negative refractive power, the aberration of the optical image capturing system can be slightly corrected.

Besides, the sixth lens may have negative refractive power, and the image side thereof may be a concave surface. With this configuration, the back focal distance of the optical image capturing system may be shortened to maintain the characteristics of miniaturization of the system. Moreover, at least one surface of the sixth lens may possess at least one inflection point which is capable of effectively reducing the incident angle of the off-axis rays and may further correct the off-axis aberration.

BRIEF DESCRIPTION OF THE DRAWINGS

The detailed structure, operating principle and effects of the present disclosure will now be described in more details hereinafter with reference to the accompanying drawings that show various embodiments of the present invention as follows.

DESCRIPTION OF THE PREFERRED EMBODIMENTS

Figure 1A:
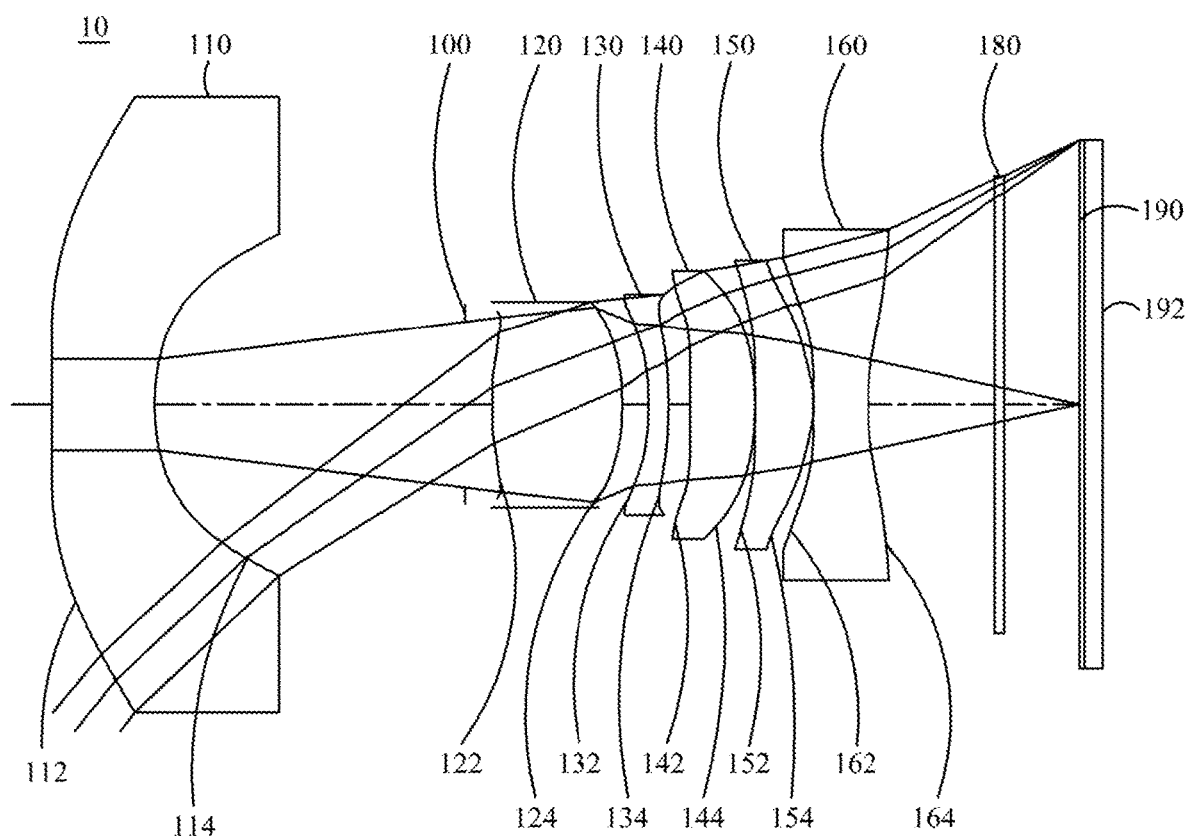
FIG. 1A is a schematic view of the optical image capturing system according to the first embodiment of the present invention.

The present invention has been described with some preferred embodiments thereof and it is understood that many changes and modifications in the described embodiments can be carried out without departing from the scope and the spirit of the invention that is intended to be limited only by the appended claims.

An optical image capturing system is provided, which includes, in the order from the object side to an image side, a first lens, a second lens, a third lens, a fourth lens, a fifth lens, and sixth lens with refractive power and a first image plane. The optical image capturing system may further include an image sensing device, which is disposed on a first image plane.

The optical image capturing system may use three sets of operation wavelengths, which are 486.1 nm, 587.5 nm and 656.2 nm, respectively, and 587.5 nm serves as the primary reference wavelength and a reference wavelength to obtain technical features of the optical system. The optical image capturing system may also use five sets of wavelengths which are 470 nm, 510 nm, 555 nm, 610 nm and 650 nm, respectively, and 555 nm serves as the primary reference wavelength and a reference wavelength to obtain technical features of the optical system.

The ratio between the focal length f of the optical image capturing system and the focal length fp of each lens with positive refractive power is PPR. The ratio between the focal length f of the optical image capturing system and a focal length fn of each lens with negative refractive power is NPR. The sum of the PPR of all lenses with positive refractive powers is ΣPPR. The sum of the NPR of all lenses with negative refractive powers is ΣNPR. It is helpful to control the total refractive power and the total length of the optical image capturing system when meeting following conditions: $0.5 \leq \Sigma PPR/\Sigma NPR| \leq 15$. Preferably, the following condition may be satisfied: $1 \leq \Sigma PPR/|\Sigma NPR| \leq 3.0$.

The optical image capturing system may further include an image sensing device which is disposed on a first image plane. Half of a diagonal of an effective detection field of the image sensing device (imaging height or the maximum image height of the optical image capturing system) is HOI. The distance on the optical axis from the object side of the first lens to the first image plane is HOS. The following conditions are satisfied: $HOS/HOI \leq 50$ and $0.5 \leq HOS/f \leq 150$. Preferably, the following conditions are satisfied: $1 \leq HOS/HOI \leq 40$ and $1 \leq HOS/f \leq 140$. Hereby, this configuration can keep the miniaturization of the optical image capturing system to collocate with light and thin portable electronic product.

In addition, in the optical image capturing system of the present invention, according to different requirements, at least one aperture may be arranged to reduce stray light and elevate the imaging quality.

In the optical image capturing system of the present invention, the aperture may be a front or middle aperture. Wherein, the front aperture is the aperture set up between a photographed object and the first lens and the middle aperture is the aperture set up between the first lens and the first image plane. In the case that the aperture is the front aperture, it can make the optical image capturing system generate a longer distance between the exit pupil and the image plane thereof, such that the optical image capturing system can accommodate more optical elements and the efficiency of the image sensing device in receiving image can be increased; In the case that the aperture is the middle aperture, it can expand the angle of view of the optical image capturing system, such that the optical image capturing system has an advantage of the wide angle camera lens. The distance from the foregoing aperture to the first image plane is InS. It meets following condition: $0.1 \leq InS/HOS \leq 1.1$. Therefore, the optical image capturing system can be kept miniaturization with the character of wide angle of view at the same time.

In the optical image capturing system of the present invention, the distance from the object side of the first lens to the image side of the sixth lens is InTL. The sum of thicknesses of all lenses with refractive power on the optical axis is ΣTP. The following condition is satisfied: $0.1 \leq ETP/$ InTL≤0.9. Therefore, this configuration can keep the contrast ratio of the optical image capturing system and the yield rate about manufacturing lens at the same time, and provide the proper back focal length to accommodate other elements.

The curvature radius of the object side of the first lens is R1. The curvature radius of the image side of the first lens is R2. The following condition is satisfied: 0.001≤|R1/R2|≤25. Therefore, the first lens may have a suitable magnitude of positive refractive power, so as to prevent the spherical aberration from increasing too fast. Preferably, the following condition may be satisfied: 0.01≤|R1/R2|<12.

The curvature radius of the object side of the sixth lens is R11. The curvature radius of the image side of the sixth lens is R12. It meets the following condition: −7<(R11−R12)/(R11+R12)<50. Hereby, this configuration is beneficial to the correction of the astigmatism generated by the optical image capturing system.

The distance between the first lens and the second lens on the optical axis is IN12. It meets the following condition: IN12/f≤60. Thereby, this configuration is helpful to improve the chromatic aberration of the lens in order to elevate their performance.

The distance between the fifth lens and the sixth lens on the optical axis is IN56. It meets the following condition: IN56/f≤3.0. Therefore, this configuration is helpful to improve the chromatic aberration of the lens in order to elevate their performance.

The thicknesses of the first lens and the second lens on the optical axis are TP1 and TP2, respectively. The following condition is satisfied: 0.1≤(TP1+IN12)/TP2≤10. Therefore, this configuration is helpful to control the sensitivity of the optical image capturing system, and improve their performance.

The thicknesses of the fifth lens and the sixth lens on the optical axis are TP5 and TP6, respectively, and the distance between the foregoing two lens on the optical axis is IN56. The following condition is satisfied: 0.1≤(TP6+IN56)/TP5≤15. Therefore, this configuration is helpful to control the sensitivity of the optical image capturing system, and decrease the total height of the optical image capturing system.

The thicknesses of the second, third and fourth lens on the optical axis are TP2, TP3 and TP4, respectively. The distance between the second lens and the third lens on the optical axis is IN23. The distance between the third lens and the fourth lens on the optical axis is IN34. The distance between the fourth lens and the fifth lens on the optical axis is IN45. The distance between the object side of the first lens and the image side of the sixth lens is InTL. The following condition is satisfied: 0.1≤TP4/(IN34+TP4+IN45)<1. Therefore, this configuration is helpful to slightly correct the aberration of the propagating process of the incident light layer by layer, and decrease the total height of the optical image capturing system.

In the optical image capturing system of the present invention, a distance perpendicular to the optical axis between a critical point C61 on the object side of the sixth lens and the optical axis is HVT61. A distance perpendicular to the optical axis between a critical point C62 on an image side of the sixth lens and the optical axis is HVT62. The distance parallel to the optical axis from an intersection point on the object side of the sixth lens crossing the optical axis to the critical point C61 is SGC61. The distance parallel to the optical axis from an intersection point on the image side of the sixth lens crossing the optical axis to the critical point C62 is SGC62. The following conditions are satisfied: 0 mm≤HVT61≤3 mm; 0 mm<HVT62≤6 mm; 0≤HVT61/HVT62; 0 mm≤|SGC61|≤0.5 mm; 0 mm<|SGC62|≤2 mm, and 0<|SGC62|/(|SGC62|+TP6)≤0.9. Therefore, this configuration may correct the off-axis aberration effectively.

The optical image capturing system of the present invention meets the following condition: 0.2≤HVT62/HOI≤0.9. Preferably, it may meet the following condition: 0.3≤HVT62/HOI≤0.8. Therefore, this configuration is helpful to correct the aberration of surrounding field of view for the optical image capturing system.

The optical image capturing system of the present invention may meet the following condition: 0≤HVT62/HOS≤0.5. Preferably, it may meet the following condition: 0.2≤HVT62/HOS≤0.45. Therefore, this configuration is helpful to correct the aberration of surrounding field of view for the optical image capturing system.

In the optical image capturing system of the present invention, the distance parallel to an optical axis from an inflection point on the object side of the sixth lens that is the first nearest to the optical axis to an intersection point on the object side of the sixth lens crossing the optical axis is expressed as SGI611. The distance parallel to an optical axis from an inflection point on the image side of the sixth lens that is the first nearest to the optical axis to an intersection point on the image side of the sixth lens crossing the optical axis is expressed as SGI621. The following conditions are satisfied: 0<SGI611/(SGI611+TP6)≤0.9 and 0<SGI621/(SGI621+TP6)≤0.9. Preferably, the following conditions are satisfied: 0.1≤SGI611/(SGI611+TP6)≤0.6 and 0.1≤SGI621/(SGI621+TP6)≤0.6.

The distance parallel to the optical axis from the inflection point on the object side of the sixth lens that is the second nearest to the optical axis to an intersection point on the object side of the sixth lens crossing the optical axis is expressed as SGI612. The distance parallel to an optical axis from an inflection point on the image side of the sixth lens that is the second nearest to the optical axis to an intersection point on the image side of the sixth lens crossing the optical axis is expressed as SGI622. The following conditions are satisfied: 0<SGI612/(SGI612+TP6)≤0.9 and 0<SGI622/(SGI622+TP6)≤0.9. Preferably, the following conditions may be satisfied: 0.1≤SGI612/(SGI612+TP6)≤0.6 and 0.1≤SGI622/(SGI622+TP6)≤0.6.

The distance perpendicular to the optical axis between the inflection point on the object side of the sixth lens that is the first nearest to the optical axis and the optical axis is expressed as HIF611. The distance perpendicular to the optical axis between an intersection point on the image side of the sixth lens crossing the optical axis and an inflection point on the image side of the sixth lens that is the first nearest to the optical axis is expressed as HIF621. The following conditions are satisfied: 0.001 mm≤|HIF611|≤5 mm and 0.001 mm≤|HIF621|≤5 mm. Preferably, the following conditions may be satisfied: 0.1 mm 3.5 mm and 1.5 mm≤|HIF621|≤3.5 mm.

The distance perpendicular to the optical axis between the inflection point on the object side of the sixth lens that is the second nearest to the optical axis and the optical axis is expressed as HIF612. The distance perpendicular to the optical axis between an intersection point on the image side of the sixth lens crossing the optical axis and an inflection point on the image side of the sixth lens that is the second nearest to the optical axis is expressed as HIF622. The following conditions are satisfied: 0.001 mm≤|HIF612|≤5 mm and 0.001 mm≤|HIF622|≤5 mm. Preferably, the following conditions may be satisfied: 0.1 mm≤|HIF622|≤3.5 mm and 0.1 mm≤|HIF612|≤3.5 mm.

The distance perpendicular to the optical axis between the inflection point on the object side of the sixth lens that is the third nearest to the optical axis and the optical axis is expressed as HIF613. The distance perpendicular to the optical axis between an intersection point on the image side of the sixth lens crossing the optical axis and an inflection point on the image side of the sixth lens that is the third nearest to the optical axis is expressed as HIF623. The following conditions are satisfied: 0.001 mm≤|HIF613|≤5 mm and 0.001 mm≤|HIF623|≤5 mm. Preferably, the following conditions may be satisfied: 0.1 mm≤|HIF623|≤3.55 mm and 0.1 mm≤|HIF613|≤3.5 mm.

The distance perpendicular to the optical axis between the inflection point on the object side of the sixth lens that is the fourth nearest to the optical axis and the optical axis is expressed as HIF614. The distance perpendicular to the optical axis between an intersection point on the image side of the sixth lens and an inflection point on the image side of the sixth lens that is the fourth nearest to the optical axis is expressed as HIF624. The following conditions are satisfied: 0.001 mm≤|HIF614|≤5 mm and 0.001 mm≤|HIF624|≤5 mm. Preferably, the following conditions may be satisfied: 0.1 mm≤|HIF624|≤3.5 mm and 0.1 mm≤|HIF614|≤3.5 mm.

In one embodiment of the optical image capturing system of the present invention, it can be helpful to correct the chromatic aberration of the optical image capturing system by arranging the lens with high coefficient of dispersion and the lens with low coefficient of dispersion in an interlaced manner.

The equation for the aforementioned aspheric surface is:

$$z = ch^2/[1+[1-(k+1)c^2h^2]^{0.5}] + A_4h^4 + A_6h^6 + A_8h^8 + A_{10}h^{10} + A_{12}h^{12} + A_{14}h^{14} + A_{16}h^{16} + A_{18}h^{18} + A_{20}h^{20} + \ldots \quad (1),$$

where z is a position value of the position along the optical axis and at the height h which reference to the surface apex; k is the conic coefficient, c is the reciprocal of curvature radius, and $A_4$, $A_6$, $A_8$, $A_{10}$, $A_{12}$, $A_{14}$, $A_{16}$, $A_{18}$, and $A_{20}$ are high order aspheric coefficients.

In the optical image capturing system provided by the present invention, the lens may be made of a glass or a plastic material. If the lens is made of plastic material, it can reduce the cost of manufacturing as well as the weight of the lens effectively. If the lens is made of a glass, it can control the heat effect and increase the design space of the configuration of the lens with refractive powers in the optical image capturing system. In addition, the object side and the image side of the first lens through sixth lens may be aspheric, which can gain more control variables and even reduce the number of the used lenses in contrast to the use of the traditional glass lenses in addition to the use of reducing the aberration. Thus, the total height of the optical image capturing system can be reduced effectively.

Furthermore, in the optical image capturing system provided by the present invention, when the surface of lens is a convex surface, the surface of that lens is a convex surface in the vicinity of the optical axis in principle. When the surface of lens is a concave surface, the surface of that lens is a concave surface in the vicinity of the optical axis in principle.

The optical image capturing system of the present invention can be applied to the optical image capturing system with automatic focus based on the demand further and have the characters of a good aberration correction and a good quality of image. Thereby, the optical image capturing system can expand the application aspect.

The optical image capturing system of the present invention can further include a driving module based on the demand. The driving module may be coupled with the lens and enable the movement of the lens. The foregoing driving module may be the voice coil motor (VCM) which is applied to move the lens to focus, or may be the optical image stabilization (OIS) which is applied to reduce the occurrence frequency which lead to the out focus due to the vibration of the camera lens in the process of the photographing.

In the optical image capturing system of the present invention, at least one lens element among the first lens, second lens, third lens, fourth lens, fifth lens and sixth lens may further be a light filtering element for light with wavelength of less than 500 nm based on the design requirements. The light filtering element may be reached by coating film on at least one surface of that lens with certain filtering function, or forming that lens with material that can filter light with short wavelength.

The image plane of the optical image capturing system of the present invention may be selected for a plane or a curved surface based on the requirement further. When the image plane is a curved surface (e.g. a spherical surface with curvature radius), it is helpful to decrease the required incident angle that make the rays focus on the image plane. In addition to the aid of the miniaturization of the length of the optical image capturing system (TTL), it is helpful to elevate the relative illumination at the same time.

According to the above embodiments, the specific embodiments with figures are presented in detail as below.

The First Embodiment

Figure 1B:
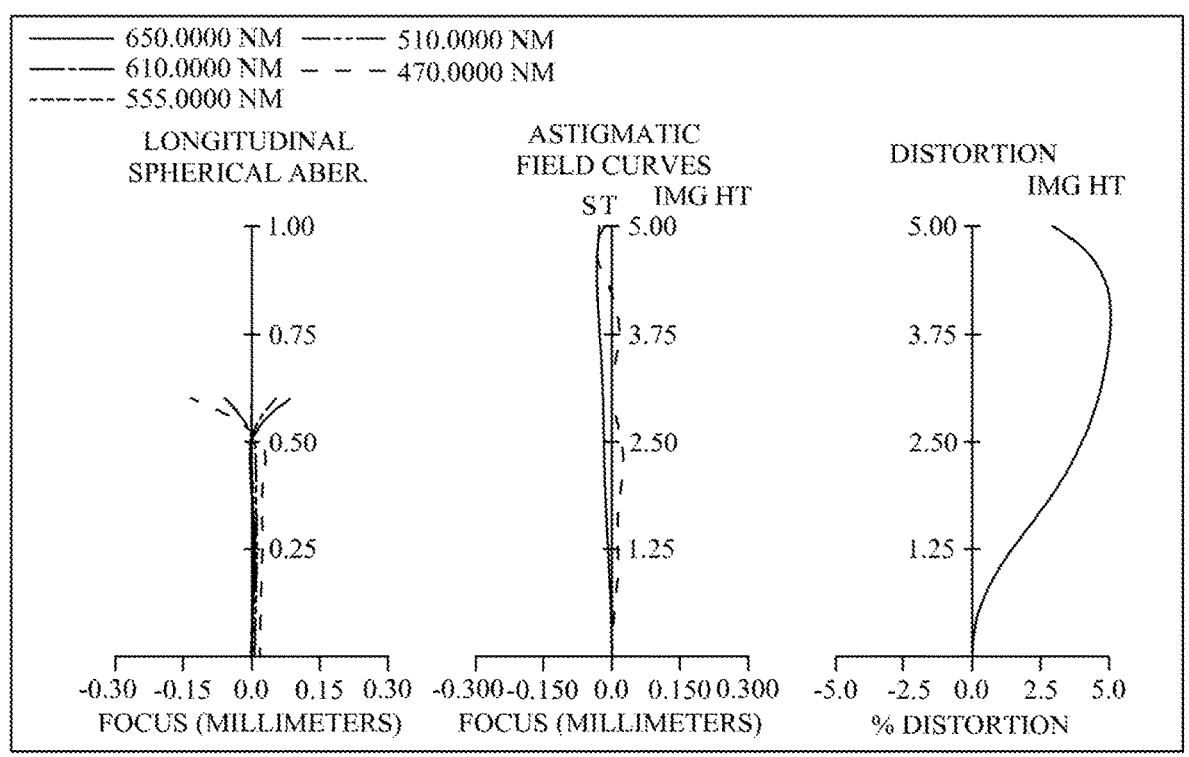
FIG. 1B shows the longitudinal spherical aberration curves, astigmatic field curves, and optical distortion curve of the optical image capturing system in the order from left to right according to the first embodiment of the present invention.
Figure 1C:
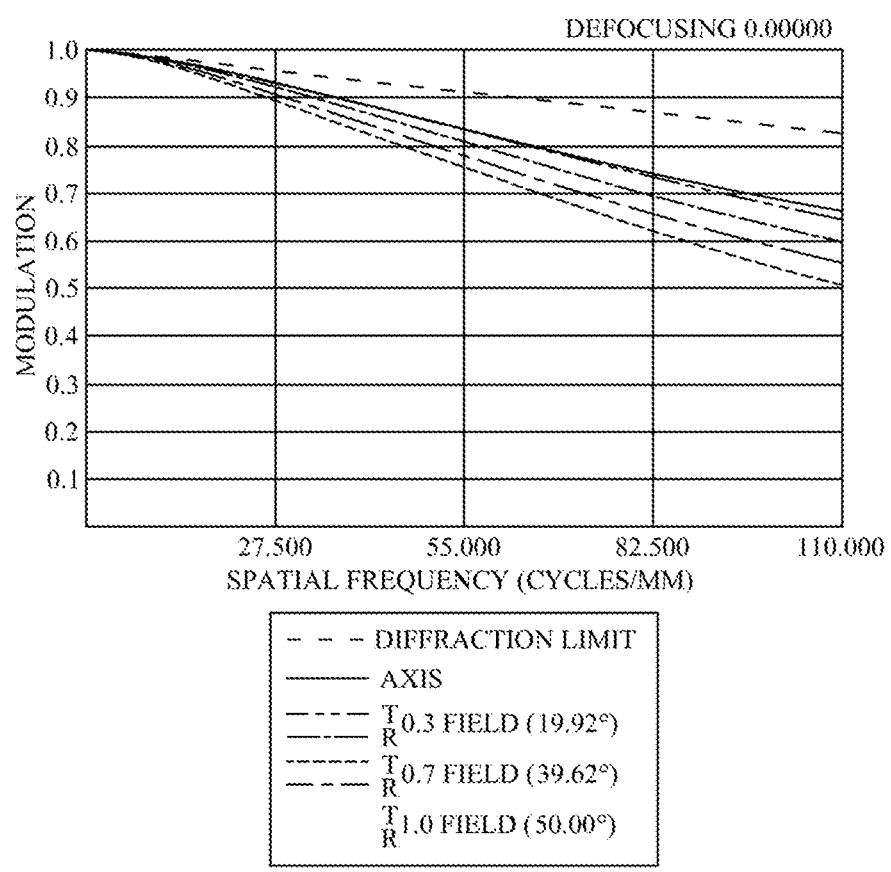
FIG. 1C is a characteristic diagram of modulation transfer of a visible light according to the first embodiment of the present invention.
Figure 1D:
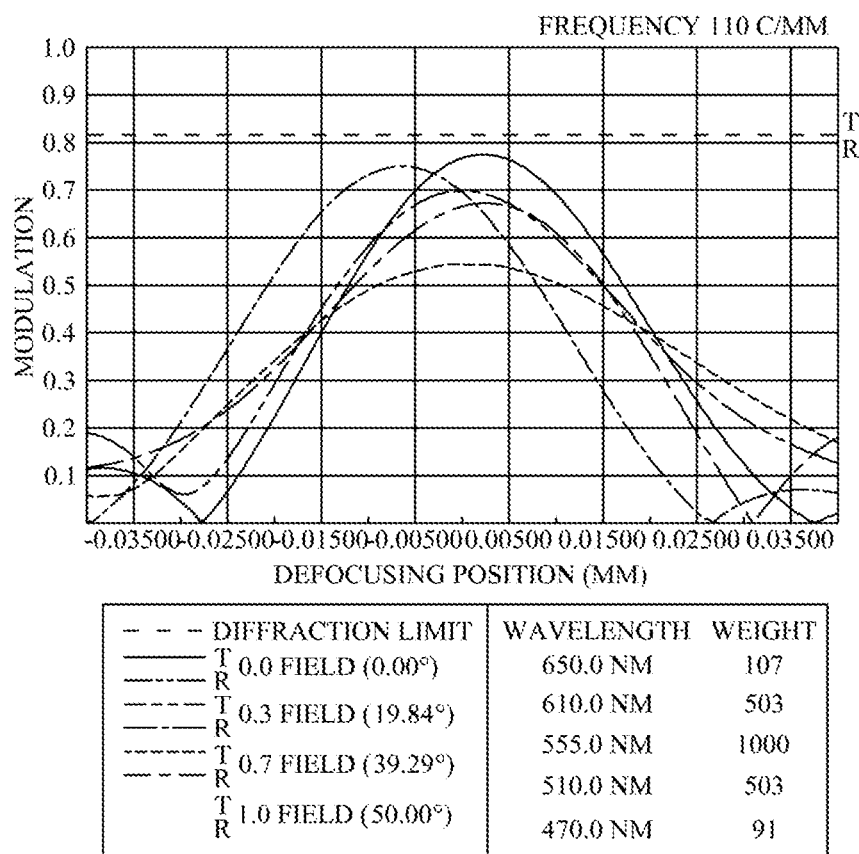
FIG. 1D is a diagram showing the through focus MTF values (Through Focus MTF) of visible light spectrum at the central field of view, 0.3 field of view, and 0.7 field of view of the first embodiment of the present invention.
Figure 1E:
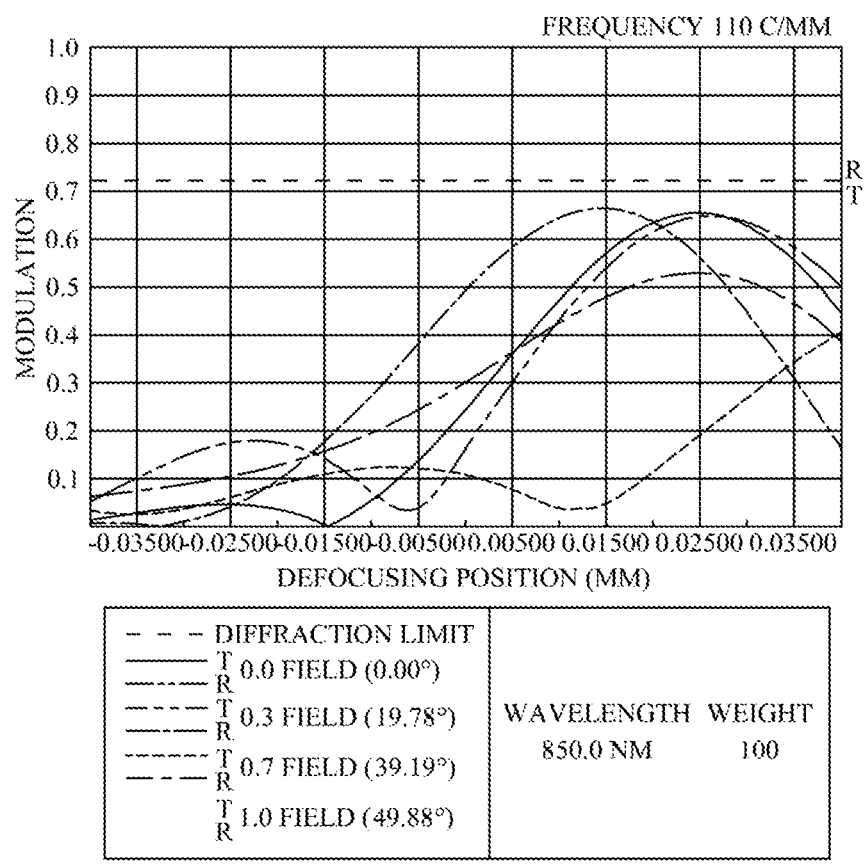
FIG. 1E is a diagram showing the through focus MTF values of infrared light spectrum at the central field of view, 0.3 field of view, and 0.7 field of view of the first embodiment of the present invention.

Please refer to FIG. 1A and FIG. 1B, wherein FIG. 1A is a schematic view of the optical image capturing system according to the first embodiment of the present invention and FIG. 1B shows the longitudinal spherical aberration curves, astigmatic field curves, and optical distortion curve of the optical image capturing system in the order from left to right according to the first embodiment of the present invention. FIG. 1C is a characteristic diagram of modulation transfer of a visible light according to the first embodiment of the present invention. FIG. 1D is a diagram showing the through focus MTF values (Through Focus MTF) of visible light spectrum at the central field of view, 0.3 field of view, and 0.7 field of view of the first embodiment of the present invention. FIG. 1E is a diagram showing the through focus MTF values of infrared light spectrum at the central field of view, 0.3 field of view, and 0.7 field of view of the first embodiment of the present invention. As shown in FIG. 1A, in the order from the object side to the image side, the optical image capturing system 10 includes a first lens 110, an aperture 100, a second lens 120, a third lens 130, a fourth lens 140, a fifth lens 150, a sixth lens 160, an IR-bandstop filter 180, a first image plane 190, and an image sensing device 192.

The first lens 110 has negative refractive power and made of plastic material. The object side 112 of the first lens 110 is a concave surface and an image side 114 of the first lens 110 is a concave surface, and both the object side 112 and the image side 114 are aspheric. The object side 112 thereof has two inflection points. The thickness of the first lens 110 on the optical axis is TP1. The thickness of the first lens 110 at height of ½ entrance pupil diameter (HEP) is expressed as ETP1.

The distance parallel to an optical axis from an inflection point on the object side 112 of the first lens 110 which is the first nearest to the optical axis to an intersection point on the object side 112 of the first lens 110 crossing the optical axis is expressed as SGI111. The distance parallel to an optical axis from an inflection point on the image side 114 of the first lens 110 which is the first nearest to the optical axis to an intersection point on the image side 114 of the first lens 110 crossing the optical axis is expressed as SGI121. The following conditions are satisfied: SGI111=−0.0031 mm, and |SGI111|/(|SGI111|+TP1)=0.0016.

The distance parallel to an optical axis from an inflection point on the object side 112 of the first lens 110 that is the second nearest to the optical axis to an intersection point on the object side 112 of the first lens 110 crossing the optical axis is expressed as SGI112. The distance parallel to an optical axis from an inflection point on the image side 114 of the first lens 110 that is the second nearest to the optical axis to an intersection point on the image side 114 of the first lens 110 crossing the optical axis is expressed as SGI122. The following conditions are satisfied: SGI112=1.3178 mm and |SGI112|/(|SGI112|+TP1)=0.4052.

The distance perpendicular to the optical axis from the inflection point on the object side 112 of the first lens 110 that is the first nearest to the optical axis to an optical axis is expressed as HIF111. The distance perpendicular to the optical axis from the inflection point on the image side 114 of the first lens 110 that is the first nearest to the optical axis to an intersection point on the image side 114 of the first lens 110 crossing the optical axis is expressed as HIF121. The following conditions are satisfied: HIF111=0.5557 mm and HIF111/HOI=0.1111.

The distance perpendicular to the optical axis from the inflection point on the object side 112 of the first lens 110 that is the second nearest to the optical axis to an optical axis is expressed as HIF112. The distance perpendicular to the optical axis from the inflection point on the image side 114 of the first lens 110 that is the second nearest to the optical axis to an intersection point on the image side 114 of the first lens 110 crossing the optical axis is expressed as HIF122. The following conditions are satisfied: HIF112=5.3732 mm and HIF112/HOI=1.0746.

The second lens 120 has positive refractive power and made of plastic material. The object side 122 of the second lens 120 is a convex surface and an image side 124 of the second lens 120 is a convex surface, and both the object side 122 and the image side 124 are aspheric. The object side 122 of the second lens 120 has one inflection point. The thickness of the second lens 120 on the optical axis is TP2. The thickness of the second lens 120 at height of ½ entrance pupil diameter (HEP) is expressed as ETP2.

The distance parallel to an optical axis from an inflection point on the object side 122 of the second lens 120 that is the first nearest to the optical axis to the intersection point on the object side 122 of the second lens 120 crossing the optical axis is expressed as SGI211. The distance parallel to an optical axis from an inflection point on the image side 124 of the second lens 120 that is the first nearest to the optical axis to the intersection point on the image side 124 of the second lens 120 crossing the optical axis is expressed as SGI221. The following conditions are satisfied: SGI211=0.1069 mm, |SGI211|/(|SGI211|+TP2)=0.0412; SGI221=0 mm and |SGI221|/(|SGI221|+TP2)=0.

The distance perpendicular to the optical axis from the inflection point on the object side 122 of the second lens 120 that is the first nearest to the optical axis to the optical axis is expressed as HIF211. The distance perpendicular to the optical axis from the inflection point on the image side 124 of the second lens 120 that is nearest to the optical axis to the intersection point on the image side 124 of the second lens 120 crossing the optical axis is expressed as HIF221. The following conditions are satisfied: HIF211=1.1264 mm; HIF211/HOI=0.2253; HIF221=0 mm and HIF221/HOI=0.

The third lens 130 has negative refractive power and made of plastic material. The object side 132 of the third lens 130 is a concave surface and an image side 134 of the third lens 130 is a convex surface, and both the object side 132 and the image side 134 are aspheric. The object side 132 and the image side 134 both have an inflection point. The thickness of the third lens 130 on the optical axis is TP3. The thickness of the third lens 130 at height of ½ entrance pupil diameter (HEP) is expressed as ETP3.

The distance parallel to an optical axis from an inflection point on the object side 132 of the third lens 130 that is the first nearest to the optical axis to an intersection point on the image side 134 of the third lens 130 crossing the optical axis is expressed as SGI311. The distance parallel to an optical axis from an inflection point on the image side 134 of the third lens 130 that is the first nearest to the optical axis to an intersection point on the image side 134 of the third lens 130 crossing the optical axis is expressed as SGI321. The following conditions are satisfied: SGI311=−0.3041 mm, |SGI311|/(|SGI311|+TP3)=0.4445, SGI321=−0.1172 mm and |SGI321|/(|SGI321|+TP3)=0.2357.

The distance perpendicular to the optical axis between the inflection point on the object side 132 of the third lens 130 that is the first nearest to the optical axis and the optical axis is expressed as HIF311. The distance perpendicular to the optical axis between the inflection point on the image side 134 of the third lens 130 that is the first nearest to the optical axis and the intersection point on the image side 134 of the third lens 130 crossing the optical axis is expressed as HIF321. The following conditions are satisfied: HIF311=1.5907 mm, HIF311/HOI=0.3181; HIF321=1.3380 mm and HIF321/HOI=0.2676.

The fourth lens 140 has positive refractive power and made of plastic material. The object side 142 of the fourth lens 140 is a convex surface and an image side 144 of the fourth lens 140 is a concave surface, and both the object side 142 and the image side 144 are aspheric. The object side 142 thereof has two inflection points, and the image side 144 thereof has one inflection point. The thickness of the fourth lens 140 on the optical axis is TP4. The thickness of the fourth lens 140 at height of ½ entrance pupil diameter (HEP) is expressed as ETP4.

The distance parallel to the optical axis from an inflection point on the object side 142 of the fourth lens 140 that is the first nearest to the optical axis to the intersection point on the object side 142 of the fourth lens 140 crossing the optical axis is expressed as SGI411. The distance parallel to the optical axis from an inflection point on the image side 144 of the fourth lens 140 that is the first nearest to the optical axis to the intersection point on the image side 144 of the fourth lens 140 crossing the optical axis is expressed as SGI421. The following conditions are satisfied: SGI411=0.0070 mm, |SGI411|/(|SGI411|+TP4)=0.0056; SGI421=0.0006 mm and |SGI421|/(|SGI421|+TP4)=0.0005.

The distance parallel to an optical axis from an inflection point on the object side 142 of the fourth lens 140 that is the second nearest to the optical axis to the intersection point on the object side 142 of the fourth lens 140 crossing the optical axis is expressed as SGI412. The distance parallel to an optical axis from an inflection point on the image side 144 of the fourth lens 140 that is the second nearest to the optical axis to the intersection point on the image side 144 of the fourth lens 140 crossing the optical axis is expressed as SGI422. The following conditions are satisfied: SGI412=−0.2078 mm and |SGI412|/(SGI412|+TP4)=0.1439.

The distance perpendicular to the optical axis between the inflection point on the object side 142 of the fourth lens 140 that is the first nearest to the optical axis and the optical axis is expressed as HIF411. The distance perpendicular to the optical axis between the inflection point on the image side 144 of the fourth lens 140 that is the first nearest to the optical axis and the intersection point on the image side 144 of the fourth lens 140 crossing the optical axis is expressed as HIF421. The following conditions are satisfied: HIF411=0.4706 mm, HIF411/HOI=0.0941; HIF421=0.1721 mm and HIF421/HOI=0.0344.

The distance perpendicular to the optical axis between the inflection point on the object side 142 of the fourth lens 140 that is the second nearest to the optical axis and the optical axis is expressed as HIF412. The distance perpendicular to the optical axis between the inflection point on the image side 144 of the fourth lens 140 that is the second nearest to the optical axis and the intersection point on the image side 144 of the fourth lens 140 crossing the optical axis is expressed as HIF422. The following conditions are satisfied: HIF412=2.0421 mm and HIF412/HOI=0.4084.

The fifth lens 150 has positive refractive power and made of plastic material. The object side 152 of the fifth lens 150 is a convex surface and an image side 154 of the fifth lens 150 is a convex surface, and both the object side 152 and the image side 154 are aspheric. The object side 152 thereof has two inflection points and the image side 154 thereof has one inflection point. The thickness of the fifth lens 150 on the optical axis is TP5. The thickness of the fifth lens 150 at height of ½ entrance pupil diameter (HEP) is expressed as ETP5.

The distance parallel to an optical axis from an inflection point on the object side 152 of the fifth lens 150 that is the first nearest to the optical axis to the intersection point on the object side 152 of the fifth lens 150 crossing the optical axis is expressed as SGI511. The distance parallel to an optical axis from an inflection point on the image side 154 of the fifth lens 150 that is the first nearest to the optical axis to the intersection point on the image side 154 of the fifth lens 150 crossing the optical axis is expressed as SGI521. The following conditions are satisfied: SGI511=0.00364 mm, |SGI511|/(|SGI511|+TP5)=0.00338, SGI521=−0.63365 mm and |SGI521|/(|SGI521|+TP5)=0.37154.

The distance parallel to an optical axis from an inflection point on the object side 152 of the fifth lens 150 that is the second nearest to the optical axis to the intersection point on the object side 152 of the fifth lens 150 crossing the optical axis is expressed as SGI512. The distance parallel to an optical axis from an inflection point on the image side 154 of the fifth lens 150 that is the second nearest to the optical axis to the intersection point on the image side 154 of the fifth lens 150 crossing the optical axis is expressed as SGI522. The following conditions are satisfied: SGI512=−0.32032 mm and |SGI512|/(SGI512|+TP5)=0.23009.

The distance parallel to an optical axis from an inflection point on the object side 152 of the fifth lens 150 that is the third nearest to the optical axis to the intersection point on the object side 152 of the fifth lens 150 crossing the optical axis is expressed as SGI513. The distance parallel to an optical axis from an inflection point on the image side 154 of the fifth lens 150 that is the third nearest to the optical axis to the intersection point on the image side 154 of the fifth lens 150 crossing the optical axis is expressed as SGI523.

The following conditions are satisfied: SGI513=0 mm, |SGI513|/(|SGI513|+TP5)=0, SGI523=0 mm and |SGI523|/(|SGI523|+TP5)=0.

The distance parallel to an optical axis from an inflection point on the object side 152 of the fifth lens 150 that is the fourth nearest to the optical axis to the intersection point on the object side 152 of the fifth lens 150 crossing the optical axis is expressed as SGI514. The distance parallel to an optical axis from an inflection point on the image side 154 of the fifth lens 150 that is the fourth nearest to the optical axis to the intersection point on the image side 154 of the fifth lens 150 crossing the optical axis is expressed as SGI524. The following conditions are satisfied: SGI514=0 mm, |SGI514|/(|SGI514|+TP5)=0, SGI524=0 mm and |SGI524|/(|SGI524|+TP5)=0.

The perpendicular distance between the optical axis and the inflection point on the object side 152 of the fifth lens 150 that is the first nearest to the optical axis is expressed as HIF511. The perpendicular distance between the optical axis and the inflection point on the image side 154 of the fifth lens 150 that is the first nearest to the optical axis is expressed as HIF521. The following conditions are satisfied: HIF511=0.28212 mm, HIF511/HOI=0.05642, HIF521=2.13850 mm and HIF521/HOI=0.42770.

The distance perpendicular to the optical axis between the inflection point on the object side 152 of the fifth lens 150 that is the second nearest to the optical axis and the optical axis is expressed as HIF512. The distance perpendicular to the optical axis between the inflection point on the image side 154 of the fifth lens 150 that is the second nearest to the optical axis and the optical axis is expressed as HIF522. The following conditions are satisfied: HIF512=2.51384 mm and HIF512/HOI=0.50277.

The distance perpendicular to the optical axis between the inflection point on the object side 152 of the fifth lens 150 that is the third nearest to the optical axis and the optical axis is expressed as HIF513. The distance perpendicular to the optical axis between the inflection point on the image side 154 of the fifth lens 150 that is the third nearest to the optical axis and the optical axis is expressed as HIF523. The following conditions are satisfied: HIF513=0 mm, HIF513/HOI=0, HIF523=0 mm and HIF523/HOI=0.

The distance perpendicular to the optical axis between the inflection point on the object side 152 of the fifth lens 150 that is the fourth nearest to the optical axis and the optical axis is expressed as HIF514. The distance perpendicular to the optical axis between the inflection point on the image side 154 of the fifth lens 150 that is the fourth nearest to the optical axis and the optical axis is expressed as HIF524. The following conditions are satisfied: HIF514=0 mm, HIF514/HOI=0, HIF524=0 mm and HIF524/HOI=0.

The sixth lens 160 has negative refractive power and made of plastic material. The object side 162 of the sixth lens 160 is a concave surface and an image side 164 of the sixth lens 160 is a concave surface, and the object side 162 thereof has two inflection points and the image side 164 thereof has one inflection point. Therefore, the incident angle of each field of view on the sixth lens can be effectively adjusted and the spherical aberration can be improved. The thickness of the sixth lens 160 on the optical axis is TP6. The thickness of the sixth lens 160 at height of ½ entrance pupil diameter (HEP) is expressed as ETP6.

The distance parallel to an optical axis from an inflection point on the object side 162 of the sixth lens 160 that is the first nearest to the optical axis to the intersection point on the object side 162 of the sixth lens 160 crossing the optical axis is expressed as SGI611. The distance parallel to an optical axis from an inflection point on the image side 164 of the sixth lens 160 that is the first nearest to the optical axis to the intersection point on the image side 164 of the sixth lens 160 crossing the optical axis is expressed as SGI621. The following conditions are satisfied: SGI611=−0.38558 mm, |SGI611|/(|SGI611|+TP6)=0.27212, SGI621=0.12386 mm and |SGI621|/(|SGI621|+TP6)=0.10722.

The distance parallel to an optical axis from an inflection point on the object side 162 of the sixth lens 160 that is the second nearest to the optical axis to an intersection point on the object side 162 of the sixth lens 160 crossing the optical axis is expressed as SGI612. The distance parallel to an optical axis from an inflection point on the image side 164 of the sixth lens 160 that is the second nearest to the optical axis to the intersection point on the image side 164 of the sixth lens 160 crossing the optical axis is expressed as SGI622. The following conditions are satisfied: SGI612=−0.47400 mm, |SGI612|/(|SGI612|+TP6)=0.31488, SGI622=0 mm and |SGI622|/(|SGI622|+TP6)=0.

The distance perpendicular to the optical axis between the inflection point on the object side 162 of the sixth lens 160 that is nearest to the optical axis and the optical axis is expressed as HIF611. The distance perpendicular to the optical axis between the inflection point on the image side 164 of the sixth lens 160 that is the first nearest to the optical axis and the optical axis is expressed as HIF621. The following conditions are satisfied: HIF611=2.24283 mm, HIF611/HOI=0.44857, HIF621=1.07376 mm and HIF621/HOI=0.21475.

The distance perpendicular to the optical axis between the inflection point on the object side 162 of the sixth lens 160 that is the second nearest to the optical axis and the optical axis is expressed as HIF612. The distance perpendicular to the optical axis between the inflection point on the image side 164 of the sixth lens 160 that is the second nearest to the optical axis and the optical axis is expressed as HIF622. The following conditions are satisfied: HIF612=2.48895 mm and HIF612/HOI=0.49779.

The distance perpendicular to the optical axis between the inflection point on the object side 162 of the sixth lens 160 that is the third nearest to the optical axis and the optical axis is expressed as HIF613. The distance perpendicular to the optical axis between the inflection point on the image side 164 of the sixth lens 160 that is the third nearest to the optical axis and the optical axis is expressed HIF623. The following conditions are satisfied: HIF613=0 mm, HIF613/HOI=0, HIF623=0 mm and HIF623/HOI=0.

The distance perpendicular to the optical axis between the inflection point on the object side 162 of the sixth lens 160 that is the fourth nearest to the optical axis and the optical axis is expressed as HIF614. The distance perpendicular to the optical axis between the inflection point on the image side 164 of the sixth lens 160 that is the fourth nearest to the optical axis and the optical axis is expressed as HIF624. The following conditions are satisfied: HIF614=0 mm, HIF614/HOI=0, HIF624=0 mm and HIF624/HOI=0.

In the first embodiment, a distance parallel to the optical axis between the coordinate point of the object side 112 of the first lens 110 at height ½ HEP and the first image plane is ETP. A distance parallel to the optical axis between the coordinate point of the object side 112 of the first lens 110 at height ½ HEP and the coordinate point of the image side 164 of the sixth lens 160 at height ½ HEP is EIN. The following conditions are satisfied: ETL=19.304 mm, EIN=15.733 mm and EIN/ETL=0.815.

The first embodiment meets the following conditions: ETP1=2.371 mm; ETP2=2.134 mm, ETP3=0.497 mm. ETP4=1.111 mm, ETP5=1.783 mm, ETP6=1.404 mm. A sum of ETP1 to ETP6 described above SETP=9.300 mm. TP1=2.064 mm, TP2=2.500 mm, TP3=0.380 mm, TP4=1.186 mm, TP5=2.184 mm and TP6=1.105 mm. A sum of TP1 to TP6 described above STP=9.419 mm. SETP/STP=0.987. SETP/EIN=0.5911.

The first embodiment particularly controls the ratio relation (ETP/TP) between the thickness (ETP) of each lens at height of ½ entrance pupil diameter (HEP) and the thickness (TP) of the lens to which the surface belongs on the optical axis in order to achieve a balance between manufacturability and capability of aberration correction. The following relations are satisfied: ETP1/TP1=1.149, ETP2/TP2=0.854, ETP3/TP3=1.308, ETP4/TP4=0.936, ETP5/TP5=0.817 and ETP6/TP6=1.271.

The first embodiment controls a horizontal distance between each two adjacent lens at height of ½ entrance pupil diameter (HEP) to achieve a balance between the degree of miniaturization for the length of the optical image capturing system HOS, the manufacturability and the capability of aberration correction. The ratio relation (ED/IN) of the horizontal distance (ED) between the two adjacent lens at height of ½ entrance pupil diameter (HEP) to the horizontal distance (IN) between the two adjacent lens on the optical axis is particularly controlled. The following relations are satisfied: a horizontal distance parallel to the optical axis between the first lens and the second lens at height of ½ entrance pupil diameter (HEP) ED12=5.285 mm; a horizontal distance parallel to the optical axis between the second lens and the third lens at height of ½ entrance pupil diameter (HEP) ED23=0.283 mm; a horizontal distance parallel to the optical axis between the third lens and the fourth lens at height of ½ entrance pupil diameter (HEP) ED34=0.330 mm; a horizontal distance parallel to the optical axis between the fourth lens and the fifth lens at height of ½ entrance pupil diameter (HEP) ED45=0.348 mm; a horizontal distance parallel to the optical axis between the fifth lens and the sixth lens at height of ½ entrance pupil diameter (HEP) ED56=0.187 mm. A sum of ED12 to ED56 described above is expressed as SED and SED=6.433 mm.

The horizontal distance between the first lens and the second lens on the optical axis IN12=5.470 mm and ED12/IN12=0.966. The horizontal distance between the second lens and the third lens on the optical axis IN23=0.178 mm and ED23/IN23=1.590. The horizontal distance between the third lens and the fourth lens on the optical axis IN34=0.259 mm and ED34/IN34=1.273. The horizontal distance between the fourth lens and the fifth lens on the optical axis IN45=0.209 mm and ED45/IN45=1.664. The horizontal distance between the fifth lens and the sixth lens on the optical axis IN56=0.034 mm and ED56/IN56=5.557. The sum of IN12 to IN56 described above is expressed as SIN. SIN=6.150 mm. SED/SIN=1.046.

The first embodiment also meets the following relations: ED12/ED23=18.685, ED23/ED34=0.857, ED34/ED45=0.947, ED45/ED56=1.859, IN12/IN23=30.746, IN23/IN34=0.686, IN34/IN45=1.239 and IN45/IN56=6.207.

The horizontal distance parallel to the optical axis between a coordinate point on the image side of the sixth lens at height ½ HEP and the image plane EBL=3.570 mm. The horizontal distance parallel to the optical axis between an intersection point on the image side of the sixth lens crossing the optical axis and the image plane BL=4.032 mm. The embodiment of the present invention may meet the following relation: EBL/BL=0.8854. In the first embodiment, a distance parallel to the optical axis between a coordinate point on the image side of the sixth lens at height ½ HEP and the IR-bandstop filter is EIR=1.950 mm. The distance parallel to the optical axis between an intersection point on the image side of the sixth lens and the IR-bandstop filter PIR=2.121 mm. The following relation is satisfied: EIR/PIR=0.920.

The IR-bandstop filter 180 is made of a glass material. The IR-bandstop filter 180 is disposed between the sixth lens 160 and the first image plane 190, and it does not affect the focal length of the optical image capturing system.

In the optical image capturing system of the first embodiment, the focal length of the optical image capturing system is f, the entrance pupil diameter of the optical image capturing system is HEP, and a half maximum view angle of the optical image capturing system is HAF. The values of the foregoing parameters are shown as below: f=4.075 mm, f/HEP=1.4, HAF=50.001° and tan(HAF)=1.1918.

In the optical image capturing system of the first embodiment, the focal length of the first lens 110 is f1 and the focal length of the sixth lens 160 is f6. The following conditions are satisfied: f1=−7.828 mm, |f/f1|=0.52060, f6=−4.886 and |f1|>|f6|.

In the optical image capturing system of the first embodiment, focal lengths of the second lens 120 to the fifth lens 150 are f2, f3, f4 and f5, respectively. The following conditions are satisfied: |f2|+|f3|+|f4|+|f5|=95.50815 mm, |f1|+|f6|=12.71352 mm and |f2|+|f3|+|f4|+|f5|>|f1|+|f6|.

The ratio of the focal length f of the optical image capturing system to the focal length fp of each lens with positive refractive power is PPR. The ratio of the focal length f of the optical image capturing system to the focal length fn of each lens with negative refractive power is NPR. In the optical image capturing system of the first embodiment, a sum of the PPR of all lens with positive refractive power is ΣPPR=f/f2+f/f4+f/f5=1.63290. The sum of the NPR of all lens with negative refractive powers is ΣNPR=|f/f1|+|f/f3|+|f/f6|=1.51305, ΣPPR/|ΣNPR|=1.07921. The following conditions are also satisfied: |f/f2|=0.69101, |f/f3|=0.15834, |f/f4|=0.06883, |f/f5|=0.87305 and |f/f6|=0.83412.

In the optical image capturing system of the first embodiment, the distance from the object side 112 of the first lens 110 to the image side 164 of the sixth lens 160 is InTL. The distance from the object side 112 of the first lens 110 to the first image plane 190 is HOS. The distance from an aperture 100 to a first image plane 190 is InS. Half of the diagonal length of an effective detection field of the image sensing device 192 is HOI. The distance from the image side 164 of the sixth lens 160 to the image plane 190 is BFL. The following conditions are satisfied: InTL+BFL=HOS, HOS=19.54120 mm, HOI=5.0 mm, HOS/HOI=3.90824, HOS/f=4.7952, InS=11.685 mm and InS/HOS=0.59794.

In the optical image capturing system of the first embodiment, a total thickness of all lenses with refractive power on the optical axis is ΣTP. It meets the following conditions: ΣTP=8.13899 mm and ΣTP/InTL=0.52477. Therefore, it can keep the contrast ratio of the optical image capturing system and the yield rate about manufacturing lens, and provide the proper back focal length to accommodate other elements.

In the optical image capturing system of the first embodiment, the curvature radius of the object side 112 of the first lens 110 is R1. The curvature radius of the image side 114 of the first lens 110 is R2. The following condition is satisfied: |R1/R2|=8.99987. Therefore, the first lens may have a suitable magnitude of positive refractive power, so as to prevent the longitudinal spherical aberration from increasing too fast.

In the optical image capturing system of the first embodiment, the curvature radius of the object side 162 of the sixth lens 160 is R11. The curvature radius of the image side 164 of the sixth lens 160 is R12. The following condition is satisfied: (R11−R12)/(R11+R12)=1.27780. Therefore, it is beneficial to correct the astigmatism generated by the optical image capturing system.

In the optical image capturing system of the first embodiment, the sum of focal lengths of all lenses with positive refractive power is ΣPP. It meets the following conditions: ΣPP=f2+f4+f5=69.770 mm and f5/(f2+f4+f5)=0.067. Hereby, this configuration is helpful to distribute the positive refractive power of a single lens to other lens with positive refractive powers in an appropriate way, so as to suppress the generation of noticeable aberrations in the propagating process of the incident light in the optical system.

In the optical image capturing system of the first embodiment, the sum of focal lengths of all lenses with negative refractive power is ΣNP. It meets the following conditions: ΣNP=f1+f3+f6=−38.451 mm and f6/(f1+f3+f6)=0.127. Hereby, this configuration is helpful to distribute the sixth lens with negative refractive power to other lens with negative refractive powers in an appropriate way, so as to suppress the generation of noticeable aberrations in the propagating process of the incident light in the optical system.

In the optical image capturing system of the first embodiment, the distance between the first lens 110 and the second lens 120 on the optical axis is IN12. It meets the following conditions: IN12=6.418 mm and IN12/f=1.57491. Therefore, it is helpful to improve the chromatic aberration of the lens in order to elevate their performance.

In the optical image capturing system of the first embodiment, a distance between the fifth lens 150 and the sixth lens 160 on the optical axis is IN56. It meets the following conditions: IN56=0.025 mm and IN56/f=0.00613. Therefore, it is helpful to improve the chromatic aberration of the lens in order to elevate their performance.

In the optical image capturing system of the first embodiment, the thicknesses of the first lens 110 and the second lens 120 on the optical axis are TP1 and TP2, respectively. The following conditions are satisfied: TP1=1.934 mm, TP2=2.486 mm and (TP1+IN12)/TP2=3.36005. Therefore, it is helpful to control the sensitivity generated by the optical image capturing system and elevate their performance.

In the optical image capturing system of the first embodiment, the thicknesses of the fifth lens 150 and the sixth lens 160 on the optical axis are TP5 and TP6, respectively. The distance between the aforementioned two lenses on the optical axis is IN56. The following conditions are satisfied: TP5=1.072 mm, TP6=1.031 mm and (TP6+IN56)/TP5=0.98555. Therefore, it is helpful to control the sensitivity generated by the optical image capturing system and reduce the total height of the optical image capturing system.

In the optical image capturing system of the first embodiment, the distance between the third lens 130 and the fourth lens 140 on the optical axis is IN34. The distance between the fourth lens 140 and the fifth lens 150 on the optical axis is IN45. The following conditions are satisfied: IN34=0.401 mm, IN45=0.025 mm and TP4/(IN34+TP4+IN45)=0.74376. Therefore, this configuration is helpful to slightly correct the aberration of the propagating process of the incident light layer by layer and decrease the total height of the optical image capturing system.

In the optical image capturing system of the first embodiment, the distance parallel to an optical axis from a maximum effective half diameter position on the object side 152 of the fifth lens 150 to an intersection point on the object side 152 of the fifth lens 150 crossing the optical axis is InRS51. The distance parallel to an optical axis from a maximum effective half diameter position on the image side 154 of the fifth lens 150 to an intersection point on the image side 154 of the fifth lens 150 crossing the optical axis is InRS52. The thickness of the fifth lens 150 is TP5. The following conditions are satisfied: InRS51=−0.34789 mm, InRS52=−0.88185 mm, |InRS51|/TP5=0.32458 and |InRS52|/TP5=0.82276. Hereby, this configuration is favorable to the manufacturing and forming of lens and keeping the miniaturization of the optical image capturing system effectively.

In the optical image capturing system of the first embodiment, the perpendicular distance between a critical point C51 on the object side 152 of the fifth lens 150 and the optical axis is HVT51. The perpendicular distance between a critical point C52 on the image side 154 of the fifth lens 150 and the optical axis is HVT52. The following conditions are satisfied: HVT51=0.515349 mm and HVT52=0 mm.

In the optical image capturing system of the first embodiment, the distance parallel to an optical axis from a maximum effective half diameter position on the object side 162 of the sixth lens 160 to an intersection point on the object side 162 of the sixth lens 160 crossing the optical axis is InRS61. The distance parallel to an optical axis from a maximum effective half diameter position on the image side 164 of the sixth lens 160 to an intersection point on the image side 164 of the sixth lens 160 is InRS62. The thickness of the sixth lens 160 is TP6. The following conditions are satisfied: InRS61=−0.58390 mm, InRS62=0.41976 mm, |InRS61|/TP6=0.56616 and |InRS62|/TP6=0.40700. Hereby, this configuration is favorable to the manufacturing and forming of lens and keeping the miniaturization of the optical image capturing system effectively.

In the optical image capturing system of the first embodiment, the perpendicular distance between a critical point C61 on the object side 162 of the sixth lens 160 and the optical axis is HVT61. The perpendicular distance between a critical point C62 on the image side 164 of the sixth lens 160 and the optical axis is HVT62. The following conditions are satisfied: HVT61=0 mm and HVT62=0 mm.

In the optical image capturing system of the first embodiment, the following condition may be satisfied: HVT51/HOI=0.1031. Therefore, it is helpful to correct the aberration of surrounding field of view of the optical image capturing system.

In the optical image capturing system of the first embodiment, the following condition may be satisfied: HVT51/HOS=0.02634. Therefore, it is helpful to correct the aberration of surrounding field of view of the optical image capturing system.

In the optical image capturing system of the first embodiment, the second lens 120, the third lens 130 and the sixth lens 160 have negative refractive powers. The coefficient of dispersion of the second lens is NA2. The coefficient of dispersion of the third lens is NA3. The coefficient of dispersion of the sixth lens 160 is NA6. The following condition is satisfied: NA6/NA2≤1. Therefore, it is helpful to correct the chromatic aberration of the optical image capturing system.

In the optical image capturing system of the first embodiment, TV distortion and optical distortion for image formation in the optical image capturing system are TDT and ODT, respectively. The following conditions are satisfied: |TDT|=2.124% and |ODT|=5.076%.

In the first embodiment of the present invention, the rays of any field of view can be further divided into sagittal ray and tangential ray, and the spatial frequency of 110 cycles/mm serves as the benchmark for evaluating the focus shifts and the values of MTF. The focus shifts where the through focus MTF values of the visible sagittal ray at the central field of view, 0.3 field of view, and 0.7 field of view of the optical image capturing system are at their respective maxima are expressed as VSFS0, VSFS3, and VSFS7 (unit of measurement: mm), respectively. The values of VSFS0, VSFS3, and VSFS7 equal to 0.000 mm, −0.005 mm, and 0.000 mm, respectively. The maximum values of the through focus MTF of the visible sagittal ray at the central field of view, 0.3 field of view, and 0.7 field of view are expressed as VSMTF0, VSMTF3, and VSMTF7, respectively. The values of VSMTF0, VSMTF3, and VSMTF7 equal to 0.886, 0.885, and 0.863, respectively. The focus shifts where the through focus MTF values of the visible tangential ray at the central field of view, 0.3 field of view, and 0.7 field of view of the optical image capturing system are at their respective maxima are expressed as VTFS0, VTFS3, and VTFS7 (unit of measurement: mm), respectively. The values of VTFS0, VTFS3, and VTFS7 equal to 0.000 mm, 0.001 mm, and −0.005 mm, respectively. The maximum values of the through focus MTF of the visible tangential ray at the central field of view, 0.3 field of view, and 0.7 field of view are expressed as VTMTF0, VTMTF3, and VTMTF7, respectively. The values of VTMTF0, VTMTF3, and VTMTF7 equal to 0.886, 0.868, and 0.796, respectively. The average focus shift (position) of both the aforementioned focus shifts of the visible sagittal ray at three fields of view and focus shifts of the visible tangential ray at three fields of view is expressed as AVFS (unit of measurement: mm), which meets the absolute value |(VSFS0+VSFS3+VSFS7+VTFS0+VTFS3+VTFS7)/6|=10.000 mm|.

The focus shifts where the through focus MTF values of the infrared sagittal ray at the central field of view, 0.3 field of view, and 0.7 field of view of the optical image capturing system are at their respective maxima, are expressed as ISFS0, ISFS3, and ISFS7 (unit of measurement: mm), respectively. The values of ISFS0, ISFS3, and ISFS7 equal to 0.025 mm, 0.020 mm, and 0.020 mm, respectively. The average focus shift (position) of the aforementioned focus shifts of the infrared sagittal ray at three fields of view is expressed as AISFS (unit of measurement: mm). The maximum values of the through focus MTF of the infrared sagittal ray at the central field of view, 0.3 field of view, and 0.7 field of view are expressed as ISMTF0, ISMTF3, and ISMTF7, respectively. The values of ISMTF0, ISMTF3, and ISMTF7 equal to 0.787, 0.802, and 0.772, respectively. The focus shifts where the through focus MTF values of the infrared tangential ray at the central field of view, 0.3 field of view, and 0.7 field of view of the optical image capturing system are at their respective maxima are expressed as ITFS0, ITFS3, and ITFS7 (unit of measurement: mm), respectively. The values of ITFS0, ITFS3, and ITFS7 equal to 0.025, 0.035, and 0.035, respectively. The average focus shift (position) of the aforementioned focus shifts of the infrared tangential ray at three fields of view is expressed as AITFS (unit of measurement: mm). The maximum values of the through focus MTF of the infrared tangential ray at the central field of view, 0.3 field of view, and 0.7 field of view are expressed as ITMTF0, ITMTF3, and ITMTF7, respectively. The values of ITMTF0, ITMTF3, and ITMTF7 equal to 0.787, 0.805, and 0.721, respectively. The average focus shift (position) of both of the aforementioned focus shifts of the infrared sagittal ray at the three fields of view and focus shifts of the infrared tangential ray at the three fields of view is expressed as AIFS (unit of measurement: mm), which equals to the absolute value of |(ISFS0+ISFS3+ISFS7+ITFS0+ITFS3+ITFS7)/6|=|0.02667 mm|.

The focus shift (difference) of the focal points of visible light and the focus shift (difference) of the focal points of infrared light at their respective central fields of view (RGB/IR) of the entire optical image capturing system (i.e. wavelength of 850 nm versus wavelength of 555 nm, unit of measurement: mm) is expressed as FS, which meets the absolute value |(VSFS0+VTFS0)/2−(ISFS0+ITFS0)/2|=|0.025 mm|; The difference (focus shift) between the average focus shift of visible light in the three fields of view and the average focus shift of infrared light in the three fields of view (RGB/IR) of the entire optical image capturing system is expressed as AFS (i.e. wavelength of 850 nm versus wavelength of 555 nm, unit of measurement: mm), which may meet the absolute value of |AIFS−AVFS|=|0.02667 mm|.

In the optical image capturing system of the first embodiment, contrast transfer rates of modulation transfer with spatial frequencies of 55 cycles/mm of visible light at the optical axis, 0.3 HOI and 0.7 HOI on the image plane are respectively expressed as MTFE0, MTFE3 and MTFE7. The following relations are satisfied: MTFE0 is about 0.84, MTFE3 is about 0.84 and MTFE7 is about 0.75. The contrast transfer rates of modulation transfer with spatial frequencies of 110 cycles/mm of visible light at the optical axis, 0.3 HOI and 0.7 HOI on the image plane are respectively expressed as MTFQ0, MTFQ3 and MTFQ7. The following relations are satisfied: MTFQ0 is about 0.66, MTFQ3 is about 0.65 and MTFQ7 is about 0.51. The contrast transfer rates of modulation transfer with spatial frequencies of 220 cycles/mm (MTF values) at the optical axis, 0.3 HOI and 0.7 HOI on the image plane are respectively expressed as MTFH0, MTFH3 and MTFH7. The following relations are satisfied: MTFH0 is about 0.17, MTFH3 is about 0.07 and MTFH7 is about 0.14.

In the optical image capturing system of the first embodiment, when infrared light at wavelength 850 nm focus on the image plane, contrast transfer rates of modulation transfer with a spatial frequency (55 cycles/mm) (MTF values) of the image at the optical axis, 0.3 HOI and 0.7 HOI on the image plane are respectively expressed as MTFI0, MTFI3 and MTFI7. The following relations are satisfied: MTFI0 is about 0.81, MTFI3 is about 0.8 and MTFI7 is about 0.15.

Table 1 and Table 2 below should be incorporated into the reference of the present embodiment.

TABLE 1

Lens Parameters for the First Embodiment
f(focal length) = 4.075 mm; f/HEP = 1.4;
HAF(half angle of view) = 50.000 deg

| Surface No. | | Curvature Radius | Thickness(mm) | Material |
|---|---|---|---|---|
| 0 | Object | Plane | Plane | |
| 1 | Lens 1 | −40.99625704 | 1.934 | Plastic |
| 2 | | 4.555209289 | 5.923 | |
| 3 | Aperture | Plane | 0.495 | |
| 4 | Lens 2 | 5.333427366 | 2.486 | Plastic |
| 5 | | −6.781659971 | 0.502 | |
| 6 | Lens 3 | −5.697794287 | 0.380 | Plastic |
| 7 | | −8.883957518 | 0.401 | |
| 8 | Lens 4 | 13.19225664 | 1.236 | Plastic |
| 9 | | 21.55681832 | 0.025 | |
| 10 | Lens 5 | 8.987806345 | 1.072 | Plastic |
| 11 | | −3.158875374 | 0.025 | |
| 12 | Lens 6 | −29.46491425 | 1.031 | Plastic |
| 13 | | 3.593484273 | 2.412 | |
| 14 | IR-bandstop Filter | Plane | 0.200 | |
| 15 | | Plane | 1.420 | |
| 16 | First Image Plane | Plane | | |

| Surface No. | Refractive Index | Coefficient of Dispersion | Focal Length |
|---|---|---|---|
| 0 | | | |
| 1 | 1.515 | 56.55 | −7.828 |
| 2 | | | |
| 3 | | | |
| 4 | 1.544 | 55.96 | 5.897 |
| 5 | | | |
| 6 | 1.642 | 22.46 | −25.738 |
| 7 | | | |
| 8 | 1.544 | 55.96 | 59.205 |
| 9 | | | |
| 10 | 1.515 | 56.55 | 4.668 |
| 11 | | | |
| 12 | 1.642 | 22.46 | −4.886 |
| 13 | | | |
| 14 | 1.517 | 64.13 | |
| 15 | | | |
| 16 | | | |

Reference Wavelength = 555 nm;
Shield Position: The 1st surface with effective aperture radius = 5.800 mm;
The 3rd surface with effective aperture radius = 1.570 mm;
The 5th surface with the effective aperture radius = 1.950 mm

TABLE 2

Aspheric Coefficients of the First Embodiment
Table 2: Aspheric Coefficients

| Surface No | 1 | 2 | 4 | 5 |
|---|---|---|---|---|
| k | 4.310876E+01 | −4.707622E+00 | 2.616025E+00 | 2.445397E+00 |
| A4 | 7.054243E−03 | 1.714312E−02 | −8.377541E−03 | −1.789549E−02 |
| A6 | −5.233264E−04 | −1.502232E−04 | −1.838068E−03 | −3.657520E−03 |
| A8 | 3.077890E−05 | −1.359611E−04 | 1.233332E−03 | −1.131622E−03 |
| A10 | −1.260650E−06 | 2.680747E−05 | −2.390895E−03 | 1.390351E−03 |
| A12 | 3.319093E−08 | −2.017491E−06 | 1.998555E−03 | −4.152857E−04 |
| A14 | −5.051600E−10 | 6.604615E−08 | −9.734019E−04 | 5.487286E−05 |
| A16 | 3.380000E−12 | −1.301630E−09 | 2.478373E−04 | −2.919339E−06 |

TABLE 2-continued

Aspheric Coefficients of the First Embodiment
Table 2: Aspheric Coefficients

| Surface No | 6 | 7 | 8 | 9 |
|---|---|---|---|---|
| k   | 5.645686E+00  | −2.117147E+01 | −5.287220E+00 | 6.200000E+01  |
| A4  | −3.379055E−03 | −1.370959E−02 | −2.937377E−02 | −1.359965E−01 |
| A6  | −1.225453E−03 | 6.250200E−03  | 2.743532E−03  | 6.628518E−02  |
| A8  | −5.979572E−03 | −5.854426E−03 | −2.457574E−03 | −2.129167E−02 |
| A10 | 4.556449E−03  | 4.049451E−03  | 1.874319E−03  | 4.396344E−03  |
| A12 | −1.177175E−03 | −1.314592E−03 | −6.013661E−04 | −5.542899E−04 |
| A14 | 1.370522E−04  | 2.143097E−04  | 8.792480E−05  | 3.768879E−05  |
| A16 | −5.974015E−06 | −1.399894E−05 | −4.770527E−06 | −1.052467E−06 |

| Surface No | 10 | 11 | 12 | 13 |
|---|---|---|---|---|
| k   | −2.114008E+01 | −7.699904E+00 | −6.155476E+01 | −3.120467E−01 |
| A4  | −1.263831E−01 | −1.927804E−02 | −2.492467E−02 | −3.521844E−02 |
| A6  | 6.965399E−02  | 2.478376E−03  | −1.835360E−03 | 5.629654E−03  |
| A8  | −2.116027E−02 | 1.438785E−03  | 3.201343E−03  | −5.466925E−04 |
| A10 | 3.819371E−03  | −7.013749E−04 | −8.990757E−04 | 2.231154E−05  |
| A12 | −4.040283E−04 | 1.253214E−04  | 1.245343E−04  | 5.548990E−07  |
| A14 | 2.280473E−05  | −9.943196E−06 | −8.788363E−06 | −9.396920E−08 |
| A16 | −5.165452E−07 | 2.898397E−07  | 2.494302E−07  | 2.728360E−09  |

Table 1 is the detailed structural data for the first embodiment in FIG. 1A, wherein the unit for the curvature radius, the thickness, the distance, and the focal length is millimeters (mm). Surfaces 0-16 illustrate the surfaces from the object side to the image side in the optical image capturing system. Table 2 shows the aspheric coefficients of the first embodiment, where k is the conic coefficient in the aspheric surface equation, and $A_1$-$A_{20}$ are respectively the first to the twentieth order aspheric surface coefficients. Besides, the tables in the following embodiments correspond to their respective schematic views and the diagrams of aberration curves, and definitions of the parameters in these tables are similar to those in the Table 1 and the Table 2, so the repetitive details will not be given here.

Second Embodiment

Figure 2A:
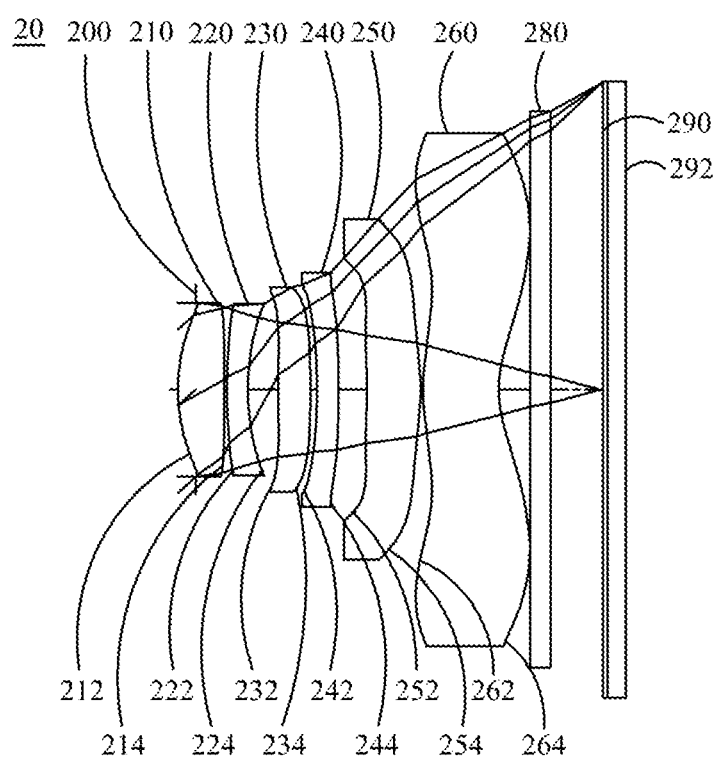
FIG. 2A is a schematic view of the optical image capturing system according to the second embodiment of the present invention.
Figure 2B:
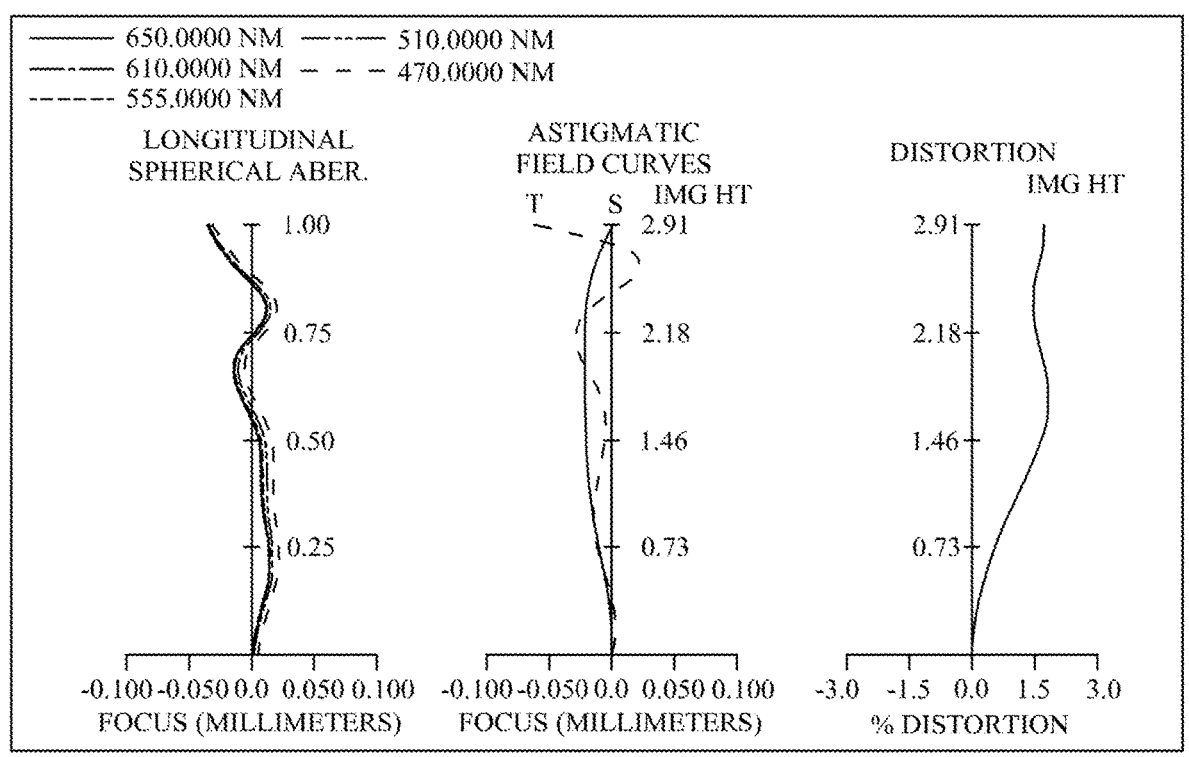
FIG. 2B shows the longitudinal spherical aberration curves, astigmatic field curves, and optical distortion curve of the optical image capturing system in the order from left to right according to the second embodiment of the present invention.
Figure 2C:
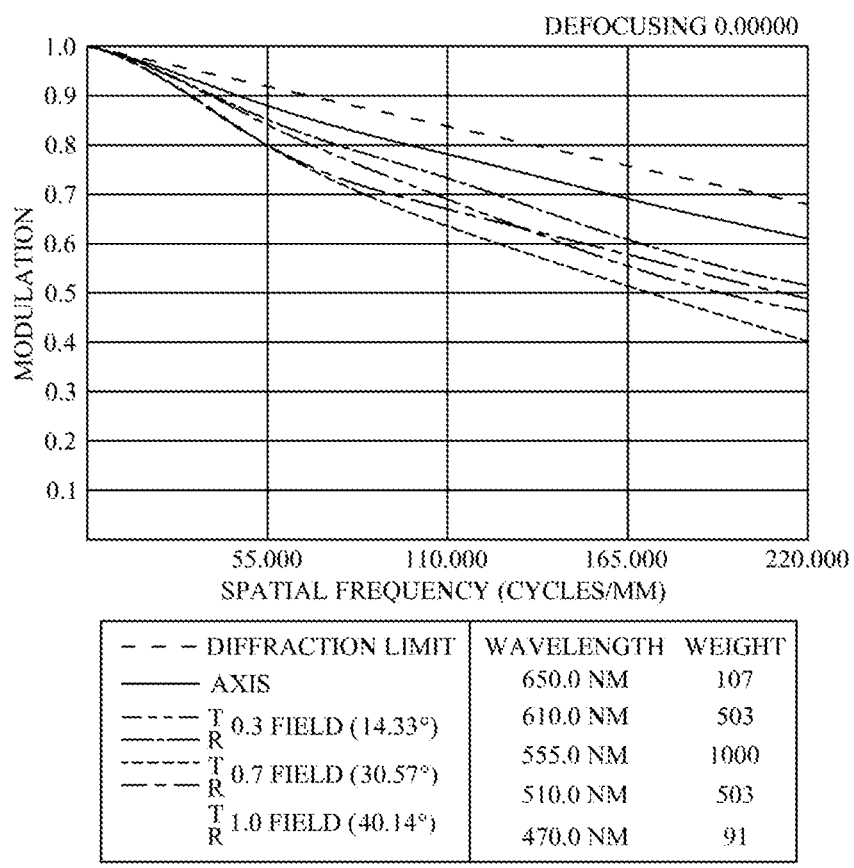
FIG. 2C is a characteristic diagram of modulation transfer of a visible light according to the second embodiment of the present invention.
Figure 2D:
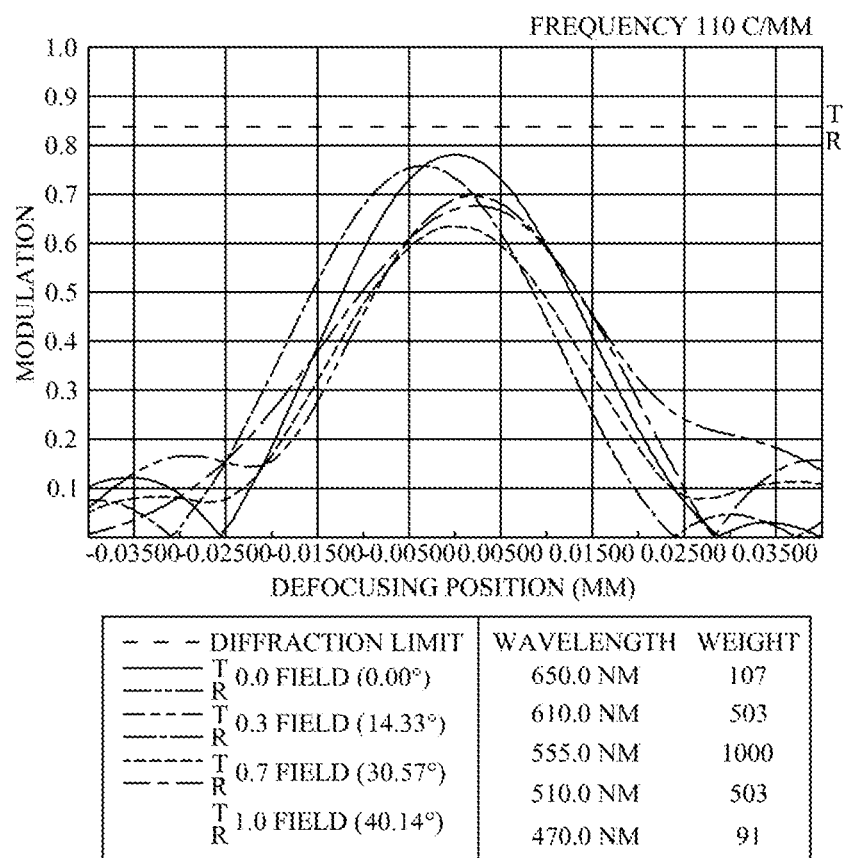
FIG. 2D is a diagram showing the through focus MTF values (Through Focus MTF) of visible light spectrum at the central field of view, 0.3 field of view, and 0.7 field of view of the second embodiment of the present invention.
Figure 2E:
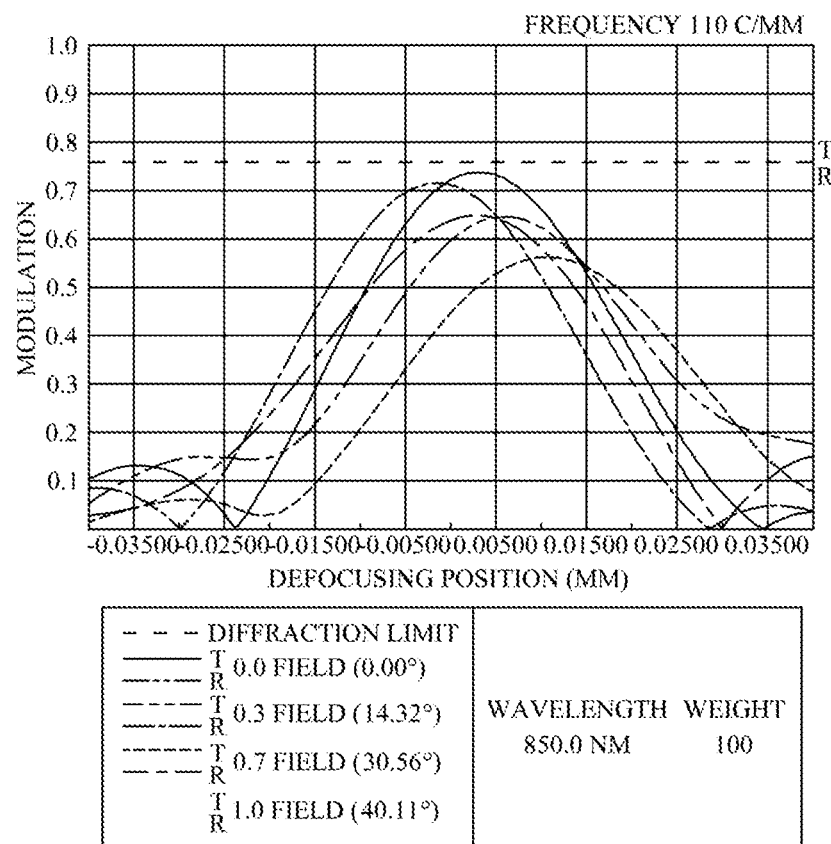
FIG. 2E is a diagram showing the through focus MTF values of infrared light spectrum at the central field of view, 0.3 field of view, and 0.7 field of view of the second embodiment of the present invention.

Please refer to FIG. 2A and FIG. 2B. FIG. 2A is a schematic view of the optical image capturing system according to the second embodiment of the present invention. FIG. 2B shows the longitudinal spherical aberration curves, astigmatic field curves, and optical distortion curve of the optical image capturing system of the second embodiment, in the order from left to right. FIG. 2C is a characteristic diagram of modulation transfer of a visible light according to the second embodiment of the present invention. FIG. 2D is a diagram showing the through focus MTF values (Through Focus MTF) of visible light spectrum at the central field of view, 0.3 field of view, and 0.7 field of view of the second embodiment of the present invention. FIG. 2E is a diagram showing the through focus MTF values of infrared light spectrum at the central field of view, 0.3 field of view, and 0.7 field of view of the second embodiment of the present invention. As shown in FIG. 2A, in the order from the object side to the image side, the optical image capturing system 20 includes an aperture 200, a first lens 210, a second lens 220, a third lens 230, a fourth lens 240, a fifth lens 250, a sixth lens 260, an IR-bandstop filter 280, a first image plane 290, and an image sensing device 292.

The first lens 210 has positive refractive power and is made of plastic material. The object side 212 of the first lens 210 is a convex surface and the image side 214 of the first lens 210 is a concave surface, and both the object side 212 and the image side 214 thereof are aspheric. The object side 212 thereof has one inflection point.

The second lens 220 has negative refractive power and is made of plastic material. The object side 222 of the second lens 220 is a convex surface and the image side 224 of the second lens 220 is a concave surface, and both the object side 222 and an image side 224 thereof are aspheric.

The third lens 230 has positive refractive power and is made of plastic material. The object side 232 of the third lens 230 is a convex surface and the image side 234 of the third lens 230 is a convex surface, and both the object side 232 and an image side 234 thereof are aspheric. The object side 232 thereof has one inflection point.

The fourth lens 240 has negative refractive power and is made of plastic material. The object side 242 of the fourth lens 240 is a concave surface and the image side 244 of the fourth lens 240 is a convex surface, and both the object side 242 and an image side 244 thereof are aspheric. The image side 244 thereof has one inflection point.

The fifth lens 250 has positive refractive power and is made of plastic material. The object side 252 of the fifth lens 250 is a concave surface and the image side 254 of the fifth lens 250 is a convex surface, and both the object side 252 and an image side 254 thereof are aspheric. The object side 252 thereof has three inflection points and the image side 254 thereof has two inflection points.

The sixth lens 260 has negative refractive power and is made of plastic material. The object side 262 of the sixth lens 260 is a convex surface and the image side 264 of the sixth lens 260 is a concave surface, and both of the object side 262 and an image side 264 are aspheric. Both of the object side 262 and the image side 264 thereof have two inflection points. Hereby, this configuration is beneficial to shorten the back focal length of the optical image capturing system so as to maintain the characteristics of miniaturization. Besides, the incident angle of the off-axis rays can be reduced effectively, thereby further correcting the off-axis aberration.

The IR-bandstop filter 280 may be made of glass material and is disposed between the sixth lens 260 and the image plane 290. The IR-bandstop filter 280 does not affect the focal length of the optical image capturing system.

Table 3 and Table 4 below should be incorporated into the reference of the present embodiment

TABLE 3

Lens Parameters for the Second Embodiment
f(focal length) = 3.368 mm; f/HEP = 2.063;
HAF(half angle of view) = 40.144 deg

| Surface No | | Curvature Radius | Thickness(mm) | Material | Refractive Index | Coefficient of Dispersion | Focal Length |
|---|---|---|---|---|---|---|---|
| 0 | Object | 1E+18 | 600 | | | | |
| 1 | Aperture | 1E+18 | −0.180 | | | | |
| 2 | Lens 1 | 1.564539817 | 0.476 | Plastic | 1.545 | 55.961 | 2.810 |
| 3 | | −73.1611794 | 0.026 | | | | |
| 4 | | 1E+18 | 0.001 | | | | |
| 5 | Lens 2 | 4.62577311 | 0.216 | Plastic | 1.661 | 20.364 | −5.953 |
| 6 | | 2.09695674 | 0.310 | | | | |
| 7 | Lens 3 | 13.72957828 | 0.328 | Plastic | 1.545 | 55.961 | 11.282 |
| 8 | | −11.0890768 | 0.068 | | | | |
| 9 | Lens 4 | −6.509577853 | 0.221 | Plastic | 1.661 | 20.364 | −13.639 |
| 10 | | −23.18499747 | 0.293 | | | | |
| 11 | Lens 5 | −4.851273347 | 0.552 | Plastic | 1.545 | 55.961 | 6.880 |
| 12 | | −2.202766432 | 0.024 | | | | |
| 13 | Lens 6 | 1.937999661 | 0.781 | Plastic | 1.545 | 55.961 | −6.488 |
| 14 | | 1.074479495 | 0.319 | | | | |
| 15 | IR-bandstop Filter | 1E+18 | 0.210 | BK_7 | 1.517 | 64.13 | |
| 16 | | 1E+18 | 0.535 | | | | |
| 17 | First Image Plane | 1E+18 | 0.000 | | | | |

Reference Wavelength = 555 nm;
Shield Position: The 4th surface with effective aperture radius = 0.781 mm

TABLE 4

The Aspheric Coefficients of the Second Embodiment
Table 4: Aspheric Coefficients

| Surface No | 2 | 3 | 5 | 6 |
|---|---|---|---|---|
| k | −4.639413E+00 | −2.412026E+02 | −2.557575E+02 | −8.653395E+00 |
| A4 | 1.123398E−01 | −1.544275E−01 | 8.451399E−02 | −3.903192E−04 |
| A6 | 4.520397E−01 | 7.161176E−01 | −3.190782E−01 | 1.843480E−01 |
| A8 | −5.767593E+00 | −2.501097E+00 | 1.991367E+00 | 3.132851E−01 |
| A10 | 3.133013E+01 | 6.105178E+00 | −5.144727E+00 | −1.645577E+00 |
| A12 | −9.380926E+01 | −1.049809E+01 | 5.956260E+00 | 2.551497E+00 |
| A14 | 1.565552E+02 | 9.943464E+00 | −2.569475E+00 | −1.775449E+00 |
| A16 | −1.368735E+02 | −3.784557E+00 | 5.766548E−02 | 5.580049E−01 |
| A18 | 4.879626E+01 | 0.000000E+00 | 0.000000E+00 | 0.000000E+00 |

| Surface No. | 7 | 8 | 9 | 10 |
|---|---|---|---|---|
| k | −2.230561E+02 | −2.346627E+02 | −1.717632E+01 | 1.569084E+02 |
| A4 | −8.638990E−02 | −5.319229E−02 | −7.187784E−02 | −5.341929E−02 |
| A6 | −9.402738E−02 | −1.264433E−01 | −2.697338E−02 | −6.527893E−02 |
| A8 | 1.991996E−01 | 1.170523E−01 | 4.036800E−02 | 5.570129E−02 |
| A10 | −9.317210E−01 | −4.949762E−01 | 5.132508E−03 | 2.277314E−02 |
| A12 | 2.877313E+00 | 1.183988E+00 | 6.734529E−03 | −6.769219E−03 |
| A14 | −3.967151E+00 | −1.174118E+00 | 1.595413E−02 | −6.321601E−03 |
| A16 | 1.907195E+00 | 3.521511E−01 | −5.589796E−02 | 2.507604E−03 |
| A18 | 0.000000E+00 | 0.000000E+00 | 0.000000E+00 | 0.000000E+00 |

| Surface No. | 11 | 12 | 13 | 14 |
|---|---|---|---|---|
| k | 2.351728E+00 | −1.329509E+01 | −1.360256E+01 | −4.832305E+00 |
| A4 | 3.800355E−01 | 7.314641E−02 | −8.771928E−02 | −7.804043E−02 |
| A6 | −6.356742E−01 | 1.629252E−01 | 4.091362E−03 | 2.843241E−02 |
| A8 | 7.705235E−01 | −3.577719E−01 | 5.082828E−03 | −8.644451E−03 |
| A10 | −9.078969E−01 | 2.778607E−01 | 1.844333E−04 | 1.522441E−03 |
| A12 | 7.465530E−01 | −1.163752E−01 | −4.628812E−04 | −1.135188E−04 |
| A14 | −3.610123E−01 | 2.582661E−02 | 8.171055E−05 | −2.125353E−06 |
| A16 | 7.414226E−02 | −2.362872E−03 | −4.485533E−06 | 5.683336E−07 |
| A18 | 0.000000E+00 | 0.000000E+00 | 0.000000E+00 | 0.000000E+00 |

In the second embodiment, the presentation of the aspheric surface equation is similar to that in the first embodiment. Furthermore, the definitions of parameters in following tables are similar to those in the first embodiment, so the repetitive details will not be given here.

The following values for the conditions can be obtained from the data in Table 3 and Table 4.

| Second Embodiment (Primary Reference Wavelength = 587.5 nm) | | | | | |
|---|---|---|---|---|---|
| MTFE0 | MTFE3 | MTFE7 | MTFQ0 | MTFQ3 | MTFQ7 |
| 0.88 | 0.84 | 0.8 | 0.78 | 0.69 | 0.64 |
| ETP1 | ETP2 | ETP3 | ETP4 | ETP5 | ETP6 |
| 0.231 | 0.318 | 0.283 | 0.256 | 0.485 | 0.891 |
| ETP1/TP1 | ETP2/TP2 | ETP3/TP3 | ETP4/TP4 | ETP5/TP5 | ETP6/TP6 |
| 0.485 | 1.473 | 0.863 | 1.162 | 0.879 | 1.140 |
| ETL | EBL | EIN | EIR | PIR | EIN/ETL |
| 4.153 | 0.868 | 3.286 | 0.123 | 0.319 | 0.791 |
| SETP/EIN | EIR/PIR | SETP | STP | SETP/STP | BL |
| 0.750 | 0.385 | 2.464 | 2.574 | 0.958 | 1.064 |
| ED12 | ED23 | ED34 | ED45 | ED56 | EBL/BL |
| 0.138 | 0.101 | 0.067 | 0.329 | 0.188 | 0.8158 |
| SED | SIN | SED/SIN | ED12/ED23 | ED23/ED34 | ED34/ED45 |
| 0.821 | 0.721 | 1.139 | 1.364 | 1.517 | 0.203 |
| ED12/IN12 | ED23/IN23 | ED34/IN34 | ED45/IN45 | ED56/IN56 | ED45/ED56 |
| 5.178 | 0.326 | 0.982 | 1.123 | 7.860 | 1.752 |
| $\|f/f1\|$ | $\|f/f2\|$ | $\|f/f3\|$ | $\|f/f4\|$ | $\|f/f5\|$ | $\|f/f6\|$ |
| 1.19826 | 0.56565 | 0.29848 | 0.24690 | 0.48950 | 0.51908 |
| ΣPPR | ΣNPR | ΣPPR/ ⎮ΣNPR⎮ | IN12/f | IN56/f | TP4/ (IN34 + TP4 + IN45) |
| 2.23314 | 1.08473 | 2.05872 | 0.00790 | 0.00709 | 0.37968 |
| $\|f1/f2\|$ | $\|f2/f3\|$ | (TP1 + IN12)/TP2 | | (TP6 + IN56)/TP5 | |
| 0.47206 | 0.52768 | 2.32454 | | 1.45868 | |
| HOS | InTL | HOS/HOI | InS/HOS | ODT % | TDT % |
| 4.35855 | 3.29458 | 1.49727 | 0.95866 | 1.83985 | 0.37873 |
| HVT51 | HVT52 | HVT61 | HVT62 | HVT62/HOI | HVT62/HOS |
| 0 | 0 | 0.93190 | 1.50905 | 0.51840 | 0.34623 |
| TP2/TP3 | TP3/TP4 | InRS61 | InRS62 | ⎮InRS61⎮/TP6 | ⎮InRS62⎮/TP6 |
| 0.65826 | 1.48733 | −0.07292 | 0.04155 | 0.09335 | 0.05319 |
| PSTA | PLTA | NSTA | NLTA | SSTA | SLTA |
| −0.001 mm | −0.002 mm | 0.005 mm | 0.002 mm | −0.007 mm | −0.008 mm |
| VSFS0 | VSFS3 | VSFS7 | VTFS0 | VTFS3 | VTFS7 |
| −0.000 | −0.005 | −0.000 | −0.000 | −0.000 | −0.000 |
| VSMTF0 | VSMTF3 | VSMTF7 | VTMTF0 | VTMTF3 | VTMTF7 |
| 0.782 | 0.754 | 0.670 | 0.782 | 0.690 | 0.636 |
| ISFS0 | ISFS3 | ISFS7 | ITFS0 | ITFS3 | ITFS7 |
| 0.005 | −0.000 | 0.005 | 0.005 | 0.005 | 0.010 |
| ISMTF0 | ISMTF3 | ISMTF7 | ITMTF0 | ITMTF3 | ITMTF7 |
| 0.729 | 0.709 | 0.640 | 0.729 | 0.642 | 0.560 |
| FS | AIFS | AVFS | AFS | | |
| 0.005 | 0.005 | −0.001 | 0.006 | | |

The following values for the conditional expressions can be obtained from the data in Table 3 and Table 4.

| Values Related to Inflection Point of Second Embodiment (Primary Reference Wavelength = 555 nm) | | | | | | |
|---|---|---|---|---|---|---|
| HIF111 | 0.7236 | HIF111/ HOI | 0.2486 | SGI111 | 0.1658 | ⎮SGI111⎮/ (⎮SGI111⎮+TP1) | 0.2584 |
| HIF311 | 0.2376 | HIF311/ HOI | 0.0816 | SGI311 | 0.0017 | ⎮SGI311⎮/ (⎮SGI311⎮+TP3) | 0.0052 |
| HIF421 | 0.8695 | HIF421/ HOI | 0.2987 | SGI421 | −0.0541 | ⎮SGI421⎮/ (⎮SGI421⎮+TP4) | 0.1970 |
| HIF511 | 0.2415 | HIF511/ HOI | 0.0830 | SGI511 | −0.0048 | ⎮SGI511⎮/ (⎮SGI511⎮+TP5) | 0.0087 |
| HIF512 | 0.6267 | HIF512/ HOI | 0.2153 | SGI512 | −0.0088 | ⎮SGI512⎮/ (⎮SGI512⎮+TP5) | 0.0158 |
| HIF513 | 1.2279 | HIF513/ HOI | 0.4218 | SGI513 | −0.2159 | ⎮SGI513⎮/ (⎮SGI513⎮+TP5) | 0.2812 |
| HIF521 | 0.4468 | HIF521/ HOI | 0.1535 | SGI521 | −0.0370 | ⎮SGI521⎮/ (⎮SGI521⎮+TP5) | 0.0628 |
| HIF522 | 0.8230 | HIF522/ HOI | 0.2827 | SGI522 | −0.0773 | ⎮SGI522⎮/ (⎮SGI522⎮+TP5) | 0.1228 |
| HIF611 | 0.4707 | HIF611/ HOI | 0.1617 | SGI611 | 0.0450 | ⎮SGI611⎮/ (⎮SGI611⎮+TP6) | 0.0545 |

-continued

| Values Related to Inflection Point of Second Embodiment (Primary Reference Wavelength = 555 nm) | | | | | | |
|---|---|---|---|---|---|---|
| HIF612 | 1.4878 | HIF612/HOI | 0.5111 | SGI612 | 0.0033 | \|SGI612\|/(\|SGI612\|+TP6) | 0.0042 |
| HIF621 | 0.6296 | HIF621/HOI | 0.2163 | SGI621 | 0.1356 | \|SGI621\|/(\|SGI621\|+TP6) | 0.1479 |
| HIF622 | 2.3270 | HIF622/HOI | 0.7994 | SGI622 | 0.0909 | \|SGI622\|/(\|SGI622\|+TP6) | 0.1042 |

Third Embodiment

Figure 3A:
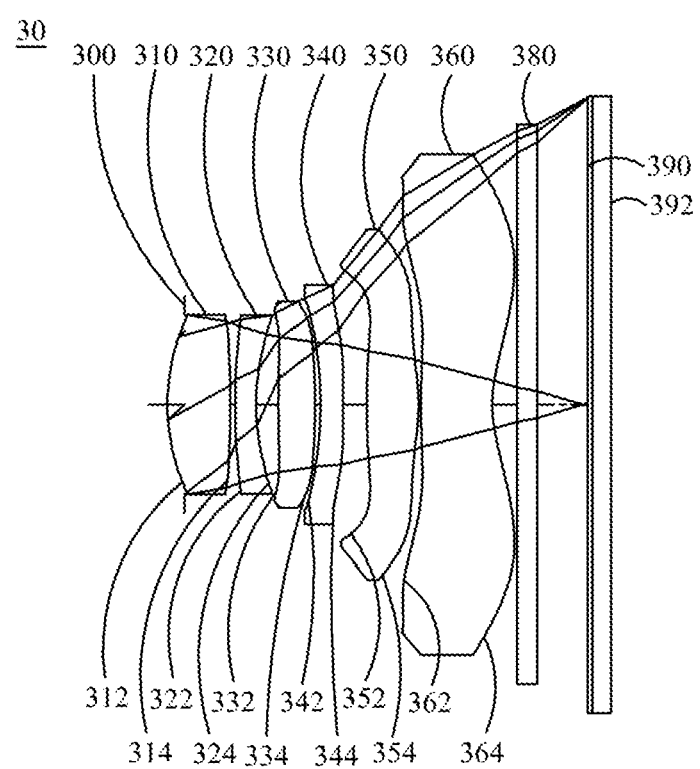
FIG. 3A is a schematic view of the optical image capturing system according to the third embodiment of the present invention.
Figure 3B:
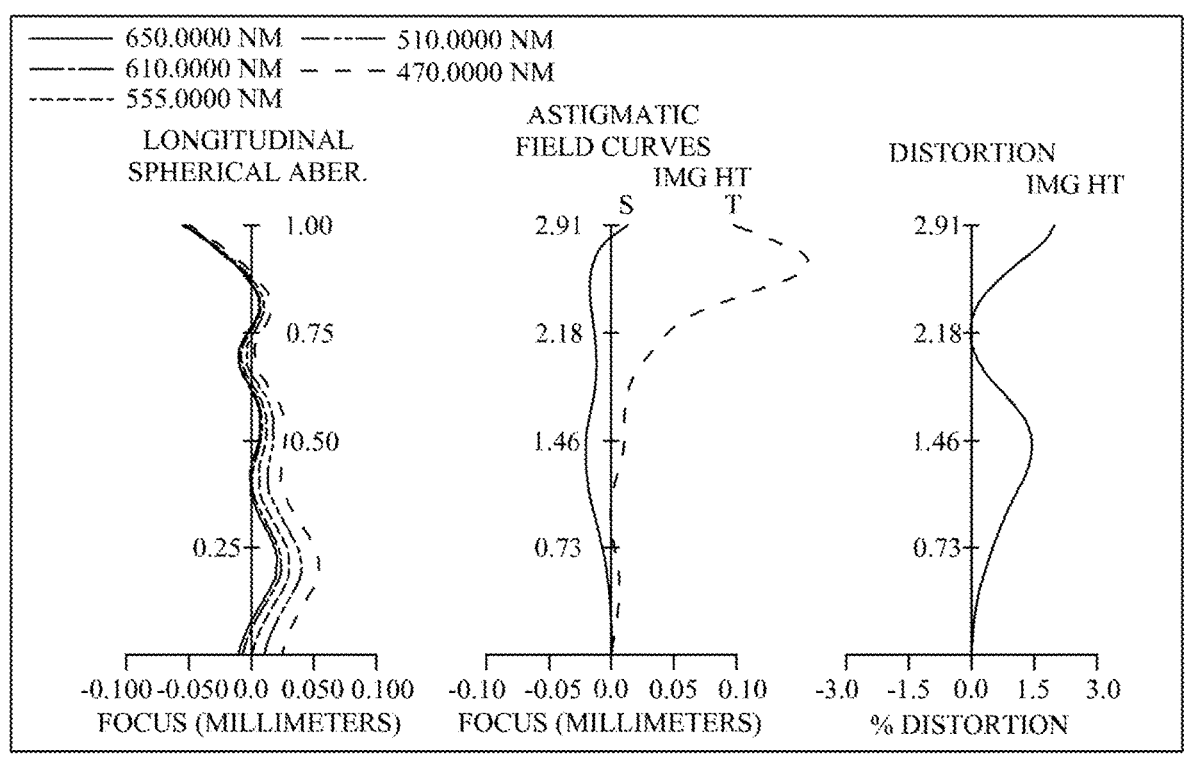
FIG. 3B shows the longitudinal spherical aberration curves, astigmatic field curves, and optical distortion curve of the optical image capturing system in the order from left to right according to the third embodiment of the present invention.
Figure 3C:
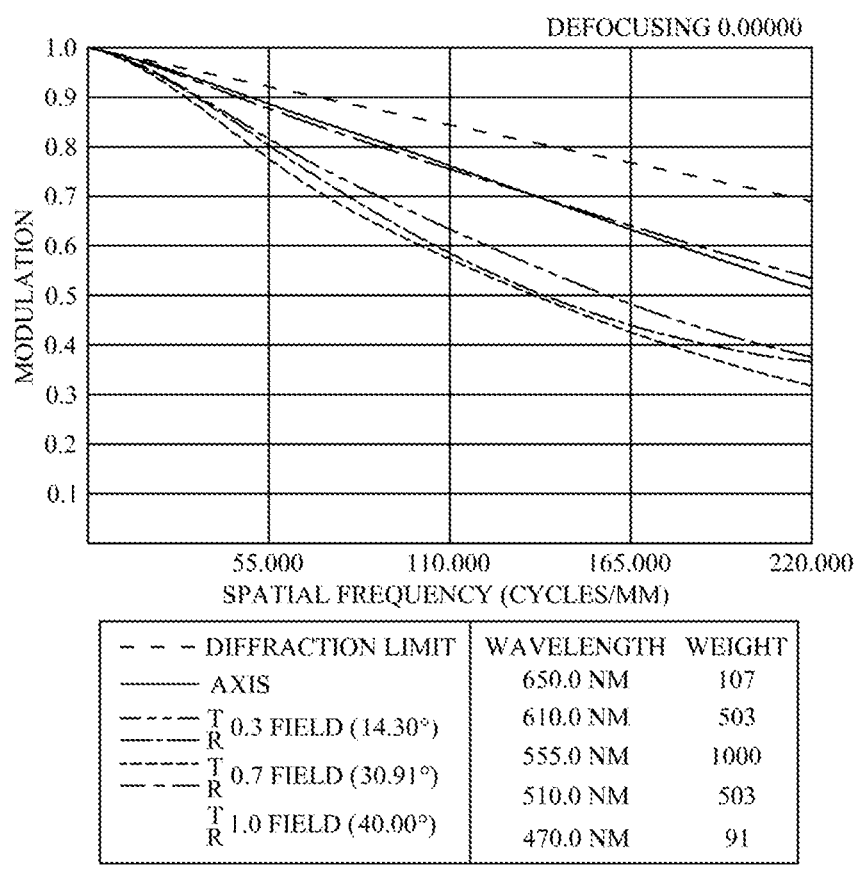
FIG. 3C is a characteristic diagram of modulation transfer of a visible light according to the third embodiment of the present invention.
Figure 3D:
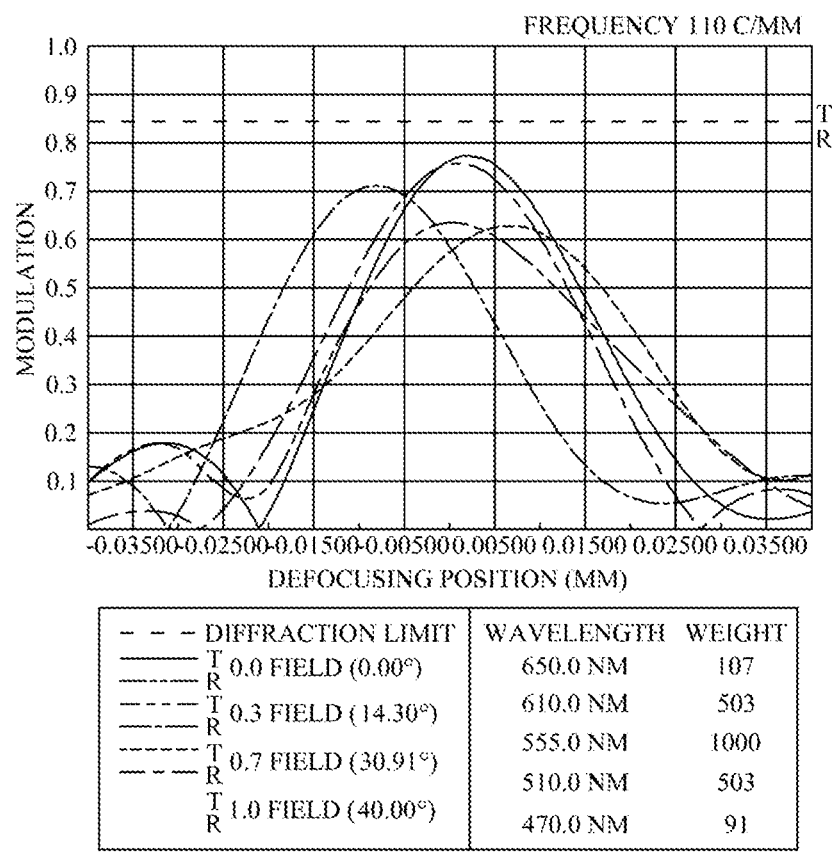
FIG. 3D is a diagram showing the through focus MTF values (Through Focus MTF) of visible light spectrum at the central field of view, 0.3 field of view, and 0.7 field of view of the third embodiment of the present invention.
Figure 3E:
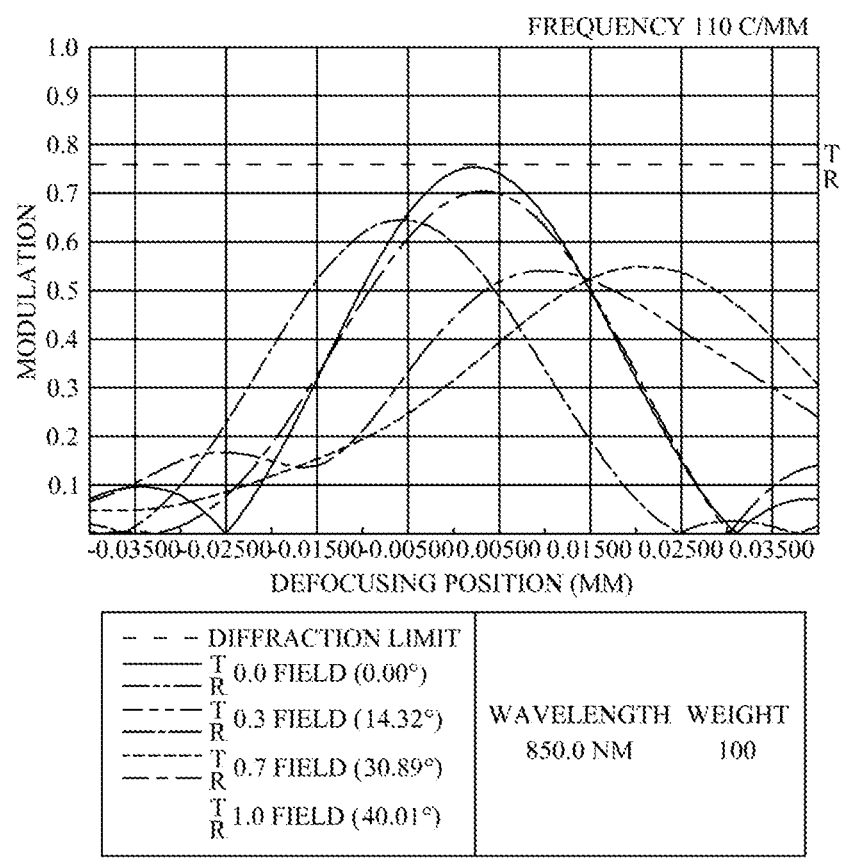
FIG. 3E is a diagram showing the through focus MTF values of infrared light spectrum at the central field of view, 0.3 field of view, and 0.7 field of view of the third embodiment of the present invention.

Please refer to FIG. 3A and FIG. 3B. FIG. 3A is a schematic view of the optical image capturing system according to the third embodiment of the present invention. FIG. 3B shows the longitudinal spherical aberration curves, astigmatic field curves, and optical distortion curve of the optical image capturing system, in the order from left to right, according to the third embodiment of the present invention. FIG. 3C is a characteristic diagram of modulation transfer of a visible light according to the third embodiment of the present invention. FIG. 3D is a diagram showing the through focus MTF values (Through Focus MTF) of visible light spectrum at the central field of view, 0.3 field of view, and 0.7 field of view of the third embodiment of the present invention. FIG. 3E is a diagram showing the through focus MTF values of infrared light spectrum at the central field of view, 0.3 field of view, and 0.7 field of view of the third embodiment of the present invention. As shown in FIG. 3A, in the order from the object side to the image side, the optical image capturing system 30 includes an aperture 300, a first lens 310, a second lens 320, a third lens 330, a fourth lens 340, a fifth lens 350, a sixth lens 360, an IR-bandstop filter 380, a first image plane 390, and an image sensing device 392.

The first lens 310 has positive refractive power and is made of plastic material. The object side 312 of the first lens 310 is a convex surface and the image side 314 of the first lens 310 is a convex surface, and both of the object side 312 and the image side 314 thereof are aspheric. The object side 312 thereof has two inflection points.

The second lens 320 has negative refractive power and is made of plastic material. The object side 322 of the second lens 320 is a convex surface and the image side 324 of the second lens 320 is a concave surface, and both the object side 322 and the image side 324 thereof are aspheric.

The third lens 330 has positive refractive power and is made of plastic material. The object side 332 of the third lens 330 is a convex surface and the image side 334 of the third lens 330 is a convex surface, and both the object side 332 and the image side 334 thereof are aspheric. The object side 332 thereof has two inflection points.

The fourth lens 340 has negative refractive power and is made of plastic material. The object side 342 of the fourth lens 340 is a concave surface and the image side 344 of the fourth lens 340 is a convex surface, and both the object side 342 and the image side 344 thereof are aspheric. The image side 344 thereof has two inflection points.

The fifth lens 350 has positive refractive power and is made of plastic material. The object side 352 of the fifth lens 350 is a convex surface and the image side 354 of the fifth lens 350 is a convex surface, and both of the object side 352 and an image side 354 thereof are aspheric. The object side 352 thereof has two inflection points and the image side 354 thereof has four inflection points.

The sixth lens element 360 has negative refractive power and is made of plastic material. The object side 362 of the sixth lens 360 is a convex surface and the image side 364 of the sixth lens 360 is a concave surface, and both of the object side 362 and the image side 364 thereof are aspheric. Both of the object side 362 and the image side 364 thereof have two inflection points. Hereby, this configuration is beneficial to shorten the back focal length of the optical image capturing system so as to maintain the characteristics of miniaturization. Besides, the incident angle of the off-axis rays can be reduced effectively, thereby further correcting the off-axis aberration.

The IR-bandstop filter 380 is made of a glass material and is disposed between the sixth lens 360 and the first image plane 390, without affecting the focal length of the optical image capturing system.

Table 5 and Table 6 below should be incorporated into the reference of the present embodiment.

TABLE 5

Lens Parameters for the Third Embodiment
f(focal length) = 3.374 mm; f/HEP = 2;
HAF(half angle of view) = 40.003 deg

| Surface No | | Curvature Radius | Thickness (mm) | Material |
|---|---|---|---|---|
| 0 | Object | 1E+18 | 600 | |
| 1 | Aperture | 1E+18 | −0.180 | |
| 2 | Lens1 | 1.690092184 | 0.660 | Plastic |
| 3 | | −8.15314335 | 0.025 | |
| 4 | | 1E+18 | 0.025 | |
| 5 | Lens2 | 5.190992477 | 0.220 | Plastic |
| 6 | | 1.86515683 | 0.233 | |
| 7 | Lens3 | 9.204820832 | 0.383 | Plastic |
| 8 | | −3.997237901 | 0.058 | |
| 9 | Lens4 | −2.736552713 | 0.238 | Plastic |
| 10 | | −12.67561437 | 0.252 | |
| 11 | Lens5 | 30.46121566 | 0.538 | Plastic |
| 12 | | −1.802880208 | 0.025 | |
| 13 | Lens6 | 5.649291418 | 0.750 | Plastic |
| 14 | | 1.162919319 | 0.255 | |
| 15 | IR-bandstop Filter | 1E+18 | 0.210 | BK_7 |
| 16 | | 1E+18 | 0.535 | |
| 17 | First Image Plane | 1E+18 | 0.000 | |

| Surface No | Refractive Index | Coefficient of Dispersion | Focal Length |
|---|---|---|---|
| 0 | | | |
| 1 | | | |
| 2 | 1.545 | 55.961 | 2.625 |
| 3 | | | |
| 4 | | | |
| 5 | 1.661 | 20.364 | −4.482 |
| 6 | | | |
| 7 | 1.545 | 55.961 | 5.155 |
| 8 | | | |
| 9 | 1.661 | 20.364 | −5.282 |
| 10 | | | |
| 11 | 1.545 | 55.961 | 3.134 |

TABLE 5-continued

Lens Parameters for the Third Embodiment
f(focal length) = 3.374 mm; f/HEP = 2;
HAF(half angle of view) = 40.003 deg

| | | | |
|---|---|---|---|
| 12 | | | |
| 13 | 1.545 | 55.961 | -2.849 |
| 14 | | | |
| 15 | 1.517 | 64.13 | |
| 16 | | | |
| 17 | | | |

Reference Wavelength = 555 nm;
Shield Position: The 4th surface with effective aperture radius = 0.781 mm

TABLE 6

The Aspheric Coefficients of the Third Embodiment
Table 6: Aspheric Coefficients

| Surface No | 2 | 3 | 5 | 6 |
|---|---|---|---|---|
| k | -5.086561E+00 | -9.000000E+01 | -9.000000E+01 | -9.141939E+00 |
| A4 | 1.683185E-02 | 1.298829E-02 | 1.140856E-02 | 2.445225E-02 |
| A6 | 1.629293E+00 | 1.512140E-01 | 2.626583E-01 | 2.119708E-01 |
| A8 | -1.344254E+01 | -1.294202E+00 | -1.193374E+00 | -8.025584E-01 |
| A10 | 5.780856E+01 | 4.239930E+00 | 3.448805E+00 | 2.230138E+00 |
| A12 | -1.429796E+02 | -8.110871E+00 | -6.620208E+00 | -3.926827E+00 |
| A14 | 2.034422E+02 | 8.053081E+00 | 6.827646E+00 | 3.452655E+00 |
| A16 | -1.548131E+02 | -3.182988E+00 | -2.786712E+00 | -1.096992E+00 |
| A18 | 4.879626E+01 | 0.000000E+00 | 0.000000E+00 | 0.000000E+00 |

| Surface No | 7 | 8 | 9 | 10 |
|---|---|---|---|---|
| k | -9.000000E+01 | -9.000000E+01 | -1.717632E+01 | 9.000000E+01 |
| A4 | -4.137424E-03 | 3.490510E-01 | 4.345401E-01 | 1.393442E-01 |
| A6 | -2.865263E-01 | -1.245527E+00 | -2.117967E+00 | -1.274870E+00 |
| A8 | 6.363971E-01 | 6.124852E-01 | 3.344849E+00 | 2.685790E+00 |
| A10 | -2.173782E+00 | 3.108069E+00 | -6.422735E-01 | -2.982568E+00 |
| A12 | 5.022421E+00 | -7.012874E+00 | -3.974229E+00 | 2.146736E+00 |
| A14 | -6.476197E+00 | 5.707740E+00 | 4.436791E+00 | -9.602409E-01 |
| A16 | 3.393065E+00 | -1.644883E+00 | -1.511903E+00 | 1.957581E-01 |
| A18 | 0.000000E+00 | 0.000000E+00 | 0.000000E+00 | 0.000000E+00 |

| Surface No | 11 | 12 | 13 | 14 |
|---|---|---|---|---|
| k | 2.351728E+00 | -1.329509E+01 | -1.761969E+01 | -6.333086E+00 |
| A4 | 2.952250E-01 | 1.348259E-01 | -1.546808E-01 | -1.068010E-01 |
| A6 | -6.660374E-01 | 1.945600E-01 | 1.102837E-01 | 7.150418E-02 |
| A8 | 8.226003E-01 | -5.347928E-01 | -8.333717E-02 | -4.059653E-02 |
| A10 | -9.244654E-01 | 4.678846E-01 | 4.371791E-02 | 1.318196E-02 |
| A12 | 7.465530E-01 | -2.154575E-01 | -1.246781E-02 | -2.366826E-03 |
| A14 | -3.610123E-01 | 5.182437E-02 | 1.791850E-03 | 2.214671E-04 |
| A16 | 7.414226E-02 | -5.072018E-03 | -1.029632E-04 | -8.444419E-06 |
| A18 | 0.000000E+00 | 0.000000E+00 | 0.000000E+00 | 0.000000E+00 |

In the third embodiment, the presentation of the aspheric surface equation is similar to that in the first embodiment. Besides, the definitions of parameters in following tables are similar to those in the first embodiment, so the repetitive details will not be given here.

The following values for the conditional expressions can be obtained from the data in Table 5 and Table 6.

| Third Embodiment (Primary Reference Wavelength = 555 nm) | | | | | |
|---|---|---|---|---|---|
| MTFE0 | MTFE3 | MTFE7 | MTFQ0 | MTFQ3 | MTFQ7 |
| 0.89 | 0.82 | 0.78 | 0.76 | 0.64 | 0.57 |
| ETP1 | ETP2 | ETP3 | ETP4 | ETP5 | ETP6 |
| 0.396 | 0.334 | 0.316 | 0.273 | 0.435 | 0.918 |
| ETP1/TP1 | ETP2/TP2 | ETP3/TP3 | ETP4/TP4 | ETP5/TP5 | ETP6/TP6 |
| 0.600 | 1.517 | 0.824 | 1.150 | 0.807 | 1.224 |
| ETL | EBL | EIN | EIR | PIR | EIN/ETL |
| 4.197 | 0.828 | 3.369 | 0.083 | 0.255 | 0.803 |
| SETP/EIN | EIR/PIR | SETP | STP | SETP/STP | BL |
| 0.793 | 0.324 | 2.672 | 2.789 | 0.958 | 1.000 |
| ED12 | ED23 | ED34 | ED45 | ED56 | EBL/BL |
| 0.164 | 0.028 | 0.045 | 0.358 | 0.101 | 0.828 |

-continued

| Third Embodiment (Primary Reference Wavelength = 555 nm) | | | | | |
|---|---|---|---|---|---|
| SED | SIN | SED/SIN | ED12/ED23 | ED23/ED34 | ED34/ED45 |
| 0.697 | 0.618 | 1.128 | 5.890 | 0.618 | 0.126 |
| ED12/IN12 | ED23/IN23 | ED34/IN34 | ED45/IN45 | ED56/IN56 | ED45/ED56 |
| 3.288 | 0.120 | 0.784 | 1.420 | 4.049 | 3.540 |
| \|f/f1\| | \|f/f2\| | \|f/f3\| | \|f/f4\| | \|f/f5\| | \|f/f6\| |
| 1.28561 | 0.75282 | 0.65465 | 0.63886 | 1.07661 | 1.18451 |
| ΣPPR | ΣNPR | ΣPPR/ ΣNPR | IN12/f | IN56/f | TP4/ (IN34 + TP4 + IN45) |
| 3.65573 | 1.93733 | 1.88699 | 0.01482 | 0.00741 | 0.43405 |
| \|f1/f2\| | \|f2/f3\| | (TP1 + IN12)/TP2 | | (TP6 + IN56)/TP5 | |
| 0.58557 | 0.86960 | 3.22760 | | 1.43895 | |
| HOS | InTL | HOS/HOI | InS/HOS | ODT % | TDT % |
| 4.40702 | 3.40725 | 1.51392 | 0.95912 | 2.00037 | 2.01486 |
| HVT51 | HVT52 | HVT61 | HVT62 | HVT62/HOI | HVT62/HOS |
| 0.793499 | 0 | 0.60191 | 1.29479 | 0.44479 | 0.29380 |
| TP2/TP3 | TP3/TP4 | InRS61 | InRS62 | \|InRS61\|/TP6 | \|InRS62\|/TP6 |
| 0.57388 | 1.61266 | −0.18652 | −0.20290 | 0.24875 | 0.27061 |
| PSTA | PLTA | NSTA | NLTA | SSTA | SLTA |
| 0.000 mm | −0.002 mm | −0.006 mm | −0.009 mm | −0.019 mm | −0.020 mm |
| VSFS0 | VSFS3 | VSFS7 | VTFS0 | VTFS3 | VTFS7 |
| −0.000 | −0.010 | −0.000 | −0.000 | −0.000 | 0.005 |
| VSMTF0 | VSMTF3 | VSMTF7 | VTMTF0 | VTMTF3 | VTMTF7 |
| 0.762 | 0.703 | 0.755 | 0.762 | 0.634 | 0.624 |
| ISFS0 | ISFS3 | ISFS7 | ITFS0 | ITFS3 | ITFS7 |
| −0.000 | −0.005 | 0.005 | −0.000 | 0.010 | 0.020 |
| ISMTF0 | ISMTF3 | ISMTF7 | ITMTF0 | ITMTF3 | ITMTF7 |
| 0.743 | 0.645 | 0.698 | 0.743 | 0.541 | 0.549 |
| FS | AIFS | AVFS | AFS | | |
| 0.000 | 0.005 | −0.001 | 0.006 | | |

The following values for the conditional expressions can be obtained from the data in Table 5 and Table 6.

| Values Related to Inflection Point of Third Embodiment (Primary Reference Wavelength = 555 nm) | | | | | | |
|---|---|---|---|---|---|---|
| HIF111 | 0.8067 | HIF111/HOI | 0.2771 | SGI111 | 0.1911 | \|SGI111\|/(\|SGI111\|+TP1) | 0.2245 |
| HIF112 | 0.8217 | HIF112/HOI | 0.2823 | SGI112 | 0.1977 | \|SGI112\|/(\|SGI112\|+TP1) | 0.2305 |
| HIF311 | 0.3421 | HIF311/HOI | 0.1175 | SGI311 | 0.0057 | \|SGI311\|/(\|SGI311\|+TP3) | 0.0147 |
| HIF312 | 0.8243 | HIF312/HOI | 0.2832 | SGI312 | −0.0236 | \|SGI312\|/(\|SGI312\|+TP3) | 0.0580 |
| HIF421 | 0.7778 | HIF421/HOI | 0.2672 | SGI421 | −0.0593 | \|SGI421\|/(\|SGI421\|+TP4) | 0.1996 |
| HIF511 | 0.5757 | HIF511/HOI | 0.1978 | SGI511 | 0.0207 | \|SGI511\|/(\|SGI511\|+TP5) | 0.0370 |
| HIF512 | 1.2347 | HIF512/HOI | 0.4242 | SGI512 | −0.1919 | \|SGI512\|/(\|SGI512\|+TP5) | 0.2628 |
| HIF521 | 0.3830 | HIF521/HOI | 0.1316 | SGI521 | −0.0329 | \|SGI521\|/(\|SGI521\|+TP5) | 0.0576 |
| HIF522 | 0.8308 | HIF522/HOI | 0.2854 | SGI522 | −0.0716 | \|SGI522\|/(\|SGI522\|+TP5) | 0.1173 |
| HIF523 | 1.5257 | HIF523/HOI | 0.5241 | SGI523 | −0.3099 | \|SGI523\|/(\|SGI523\|+TP5) | 0.3653 |
| HIF524 | 1.5741 | HIF524/HOI | 0.5407 | SGI524 | −0.3480 | \|SGI524\|/(\|SGI524\|+TP5) | 0.3926 |
| HIF611 | 0.3241 | HIF611/HOI | 0.1113 | SGI611 | 0.0076 | \|SGI611\|/(\|SGI611\|+TP6) | 0.0100 |
| HIF612 | 1.3376 | HIF612/HOI | 0.4595 | SGI612 | −0.0981 | \|SGI612\|/(\|SGI612\|+TP6) | 0.1157 |
| HIF621 | 0.5652 | HIF621/HOI | 0.1942 | SGI621 | 0.1008 | \|SGI621\|/(\|SGI621\|+TP6) | 0.1185 |
| HIF622 | 2.3340 | HIF622/HOI | 0.8018 | SGI622 | −0.1808 | \|SGI622\|/(\|SGI622\|+TP6) | 0.1942 |

Fourth Embodiment

Figure 4A:
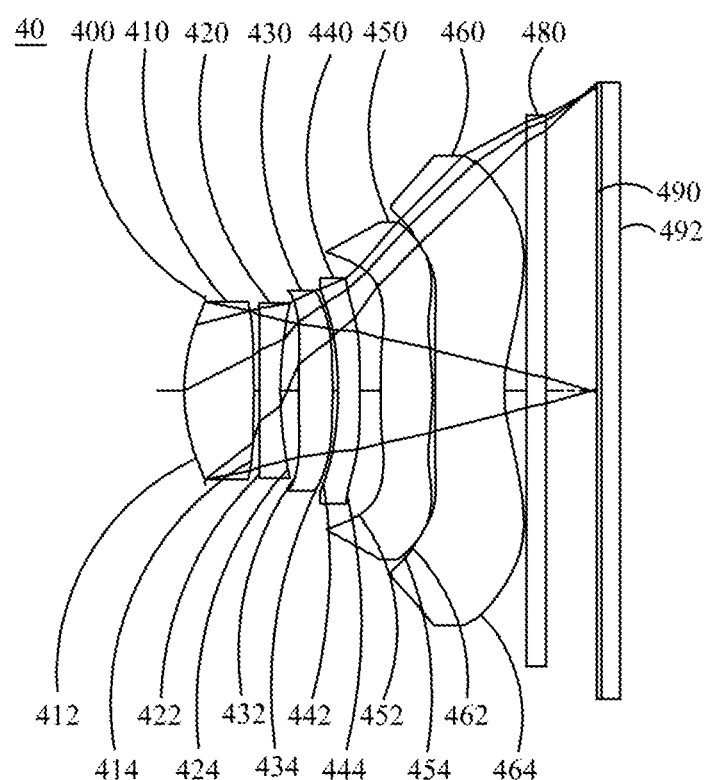
FIG. 4A is a schematic view of the optical image capturing system according to the fourth embodiment of the present invention.
Figure 4B:
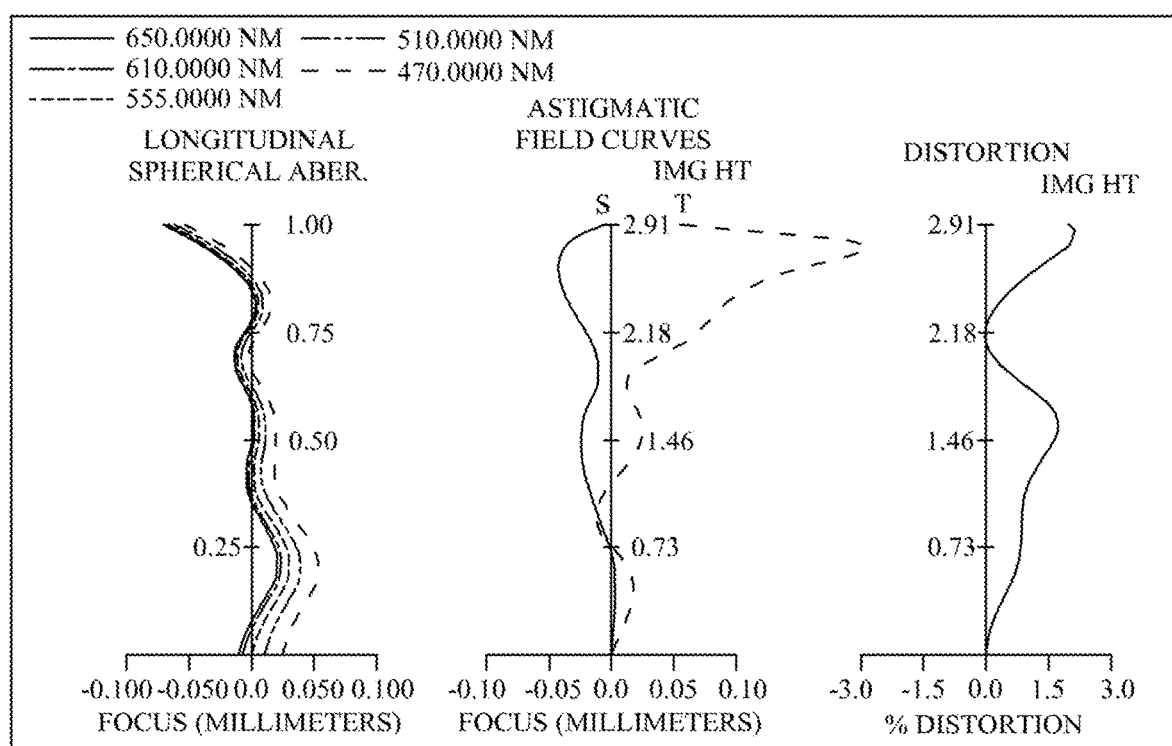
FIG. 4B shows the longitudinal spherical aberration curves, astigmatic field curves, and optical distortion curve of the optical image capturing system in the order from left to right according to the fourth embodiment of the present invention.
Figure 4C:
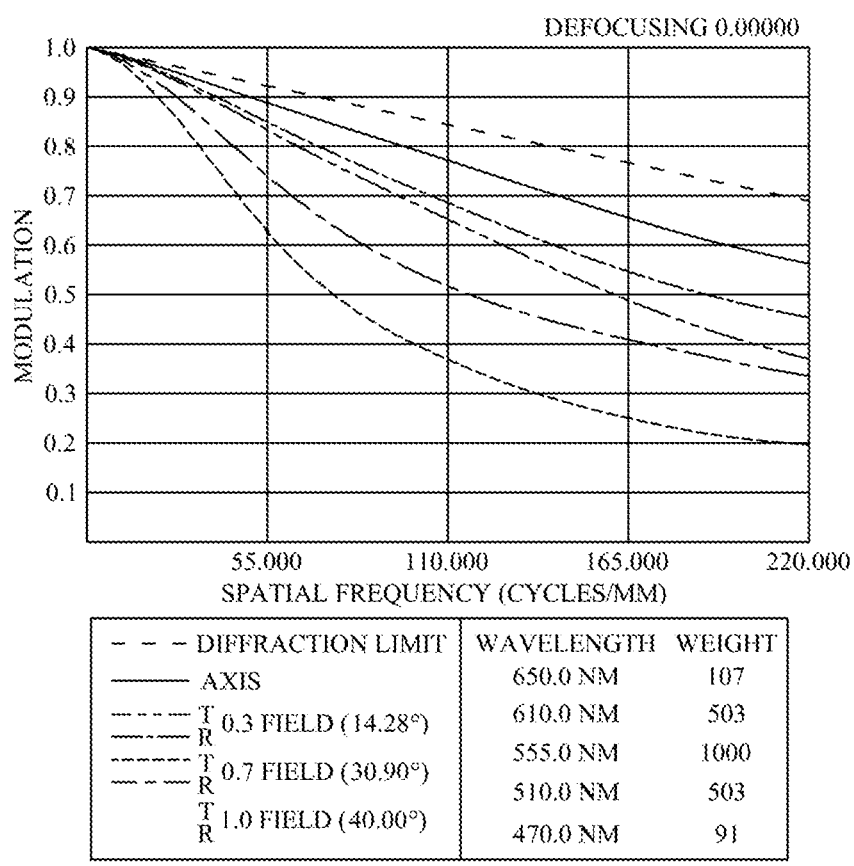
FIG. 4C is a characteristic diagram of modulation transfer of a visible light according to the fourth embodiment of the present invention.
Figure 4D:
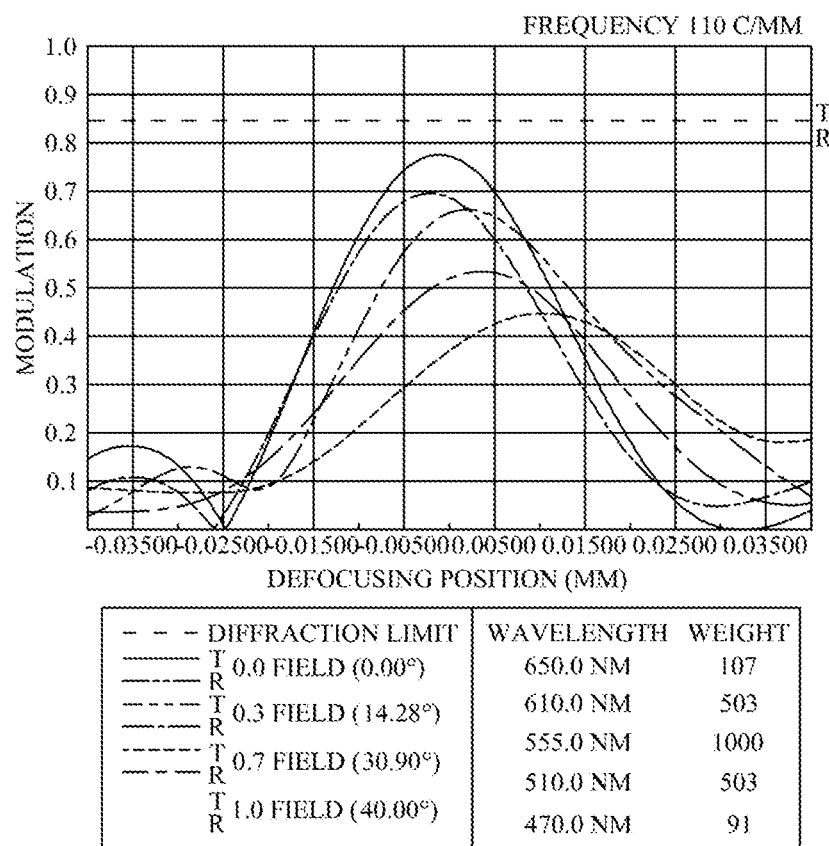
FIG. 4D is a diagram showing the through focus MTF values (Through Focus MTF) of visible light spectrum at the central field of view, 0.3 field of view, and 0.7 field of view of the fourth embodiment of the present invention.
Figure 4E:
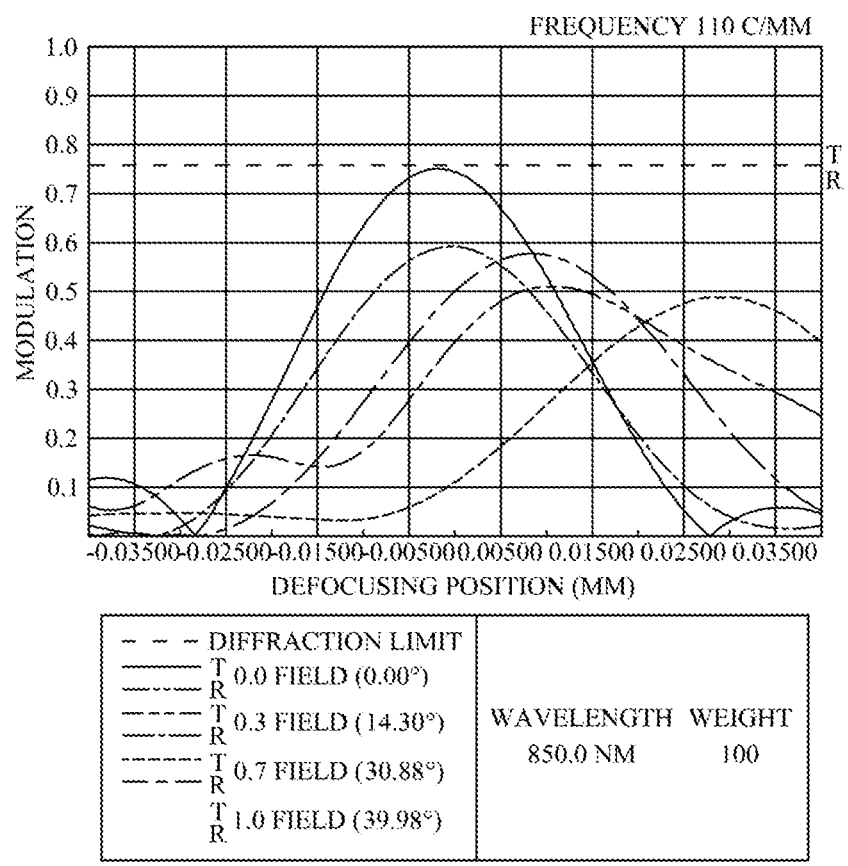
FIG. 4E is a diagram showing the through focus MTF values of infrared light spectrum at the central field of view, 0.3 field of view, and 0.7 field of view of the fourth embodiment of the present invention.

Please refer to FIG. 4A and FIG. 4B. FIG. 4A is a schematic view of the optical image capturing system according to the fourth embodiment of the present invention. FIG. 4B shows the longitudinal spherical aberration curves, astigmatic field curves, and optical distortion curve of the optical image capturing system, in the order from left to right, according to the fourth embodiment of the present invention. FIG. 4C is a characteristic diagram of modulation transfer of a visible light according to the fourth embodiment of the present invention. FIG. 4D is a diagram showing the through focus MTF values (Through Focus MTF) of visible light spectrum at the central field of view, 0.3 field of view, and 0.7 field of view of the fourth embodiment of the present invention. FIG. 4E is a diagram showing the through focus MTF values of infrared light spectrum at the central field of view, 0.3 field of view, and 0.7 field of view of the fourth embodiment of the present invention. As shown in FIG. 4A, in the order from the object side to the image side, the optical image capturing system 40 includes an aperture 400, a first lens 410, a second lens 420, a third lens 430, a fourth lens 440, a fifth lens 450, a sixth lens 460, an IR-bandstop filter 480, a first image plane 490, and an image sensing device 492.

The first lens 410 has positive refractive power and is made of plastic material. The object side 412 of the first lens 410 is a convex surface and the image side 414 of the first lens 410 is a convex surface, and both the object side 412 and the image side 414 thereof are aspheric.

The second lens 420 has negative refractive power and is made of plastic material. The object side 422 of the second lens 420 is a concave surface and the image side 424 of the second lens 420 is a concave surface, and both the object side 422 and an image side 424 thereof are aspheric. The object side 422 thereof has three inflection points and the image side 424 thereof has one inflection point.

The third lens 430 has positive refractive power and is made of plastic material. The object side 432 of the third lens 430 is a convex surface and the image side 434 of the third lens 430 is a convex surface, and both the object side 432 and the image side 434 thereof are aspheric. The object side 432 thereof has one inflection point.

The fourth lens 440 has negative refractive power and is made of plastic material. The object side 442 of the fourth lens 440 is a concave surface and the image side 444 of the fourth lens 440 is a convex surface, and both the object side 442 and an image side 444 thereof are aspheric. The image side 444 thereof has one inflection point.

The fifth lens 450 has positive refractive power and is made of plastic material. The object side 452 of the fifth lens 450 is a convex surface and the image side 454 of the fifth lens 450 is a convex surface, and both the object side 452 and the image side 454 thereof are aspheric. The object side 452 thereof has one inflection point and the image side 454 thereof has two inflection points.

The sixth lens 460 has negative refractive power and is made of plastic material. The object side 462 of the sixth lens 460 is a convex surface and the image side 464 of the sixth lens 460 is a concave surface, and both the object side 462 and an image side 464 thereof are aspheric. The object side 462 thereof has three inflection points and the image side 464 thereof has one inflection point. Hereby, this configuration is beneficial to shorten the back focal length of the optical image capturing system so as to maintain the characteristics of miniaturization. Besides, the incident angle of the off-axis rays can be reduced effectively, thereby further correcting the off-axis aberration.

The IR-bandstop filter 480 is made of a glass material and is disposed between the sixth lens 460 and the first image plane 490. The IR-bandstop filter 480 does not affect the focal length of the optical image capturing system.

Table 7 and Table 8 below should be incorporated into the reference of the present embodiment.

TABLE 7

Lens Parameters for the Fourth Embodiment
f(focal length) = 3.374 mm; f/HEP = 2.0;
HAF(half angle of view) = 40.003 deg

| Surface No | | Curvature Radius | Thickness (mm) | Material |
|---|---|---|---|---|
| 0 | Object | 1E+18 | 600 | |
| 1 | Aperture | 1E+18 | −0.180 | |
| 2 | Lens 1 | 1.625643966 | 0.737 | Plastic |
| 3 | | −8.127007945 | 0.028 | |
| 4 | | 1E+18 | 0.032 | |
| 5 | Lens 2 | −56.91569953 | 0.220 | Plastic |
| 6 | | 3.348671033 | 0.193 | |
| 7 | Lens 3 | 12.36535883 | 0.360 | Plastic |
| 8 | | −3.462435196 | 0.055 | |
| 9 | Lens 4 | −2.500463776 | 0.231 | Plastic |
| 10 | | −11.24005723 | 0.220 | |
| 11 | Lens 5 | 9.136908699 | 0.550 | Plastic |
| 12 | | −2.197841176 | 0.025 | |
| 13 | Lens 6 | 8.347759022 | 0.734 | Plastic |
| 14 | | 1.243110759 | 0.231 | |
| 15 | IR-bandstop Filter | 1E+18 | 0.210 | BK_7 |
| 16 | | 1E+18 | 0.535 | |
| 17 | First Image Plane | 1E+18 | 0.000 | |

| Surface No | Refractive Index | Coefficient of Dispersion | Focal Length |
|---|---|---|---|
| 0 | | | |
| 1 | | | |
| 2 | 1.545 | 55.961 | 2.548 |
| 3 | | | |
| 4 | | | |
| 5 | 1.661 | 20.364 | −4.734 |
| 6 | | | |
| 7 | 1.545 | 55.961 | 4.992 |
| 8 | | | |
| 9 | 1.661 | 20.364 | −4.872 |
| 10 | | | |
| 11 | 1.545 | 55.961 | 3.300 |
| 12 | | | |
| 13 | 1.545 | 55.961 | −2.775 |
| 14 | | | |
| 15 | 1.517 | 64.13 | |
| 16 | | | |
| 17 | | | |

Reference Wavelength = 555 nm;
Shield Position: The 4th surface with effective aperture radius = 0.781 mm

TABLE 8

The Aspheric Coefficients of the Fourth Embodiment
Table 8: Aspheric Coefficients

| Surface No | 2 | 3 | 5 | 6 |
|---|---|---|---|---|
| k | −5.306550E+00 | −8.999980E+01 | −8.999913E+01 | −3.492046E+00 |
| A4 | 4.173123E−02 | 3.389871E−02 | 5.302686E−02 | −2.505547E−02 |
| A6 | 1.593094E+00 | 8.186047E−02 | 1.685576E−01 | 2.341086E−01 |
| A8 | −1.331027E+01 | −1.703933E+00 | −1.888199E+00 | −1.226172E+00 |
| A10 | 5.740836E+01 | 6.668887E+00 | 7.328443E+00 | 3.998047E+00 |
| A12 | −1.422335E+02 | −1.380183E+01 | −1.551377E+01 | −7.245899E+00 |
| A14 | 2.027130E+02 | 1.430928E+01 | 1.641736E+01 | 6.471657E+00 |
| A16 | −1.545280E+02 | −5.789836E+00 | −6.685550E+00 | −2.233827E+00 |

TABLE 8-continued

The Aspheric Coefficients of the Fourth Embodiment
Table 8: Aspheric Coefficients

| A18 | 4.879626E+01 | 0.000000E+00 | 0.000000E+00 | 0.000000E+00 |
|---|---|---|---|---|
| Surface No | 7 | 8 | 9 | 10 |
| k | −8.999847E+01 | −9.000000E+01 | −1.717913E+01 | 9.000000E+01 |
| A4 | −5.802474E−02 | 4.388798E−01 | 7.027616E−01 | 2.786536E−01 |
| A6 | −8.483951E−02 | −1.950955E+00 | −3.846775E+00 | −2.381800E+00 |
| A8 | −5.431841E−01 | 9.962997E−01 | 6.650072E+00 | 5.215612E+00 |
| A10 | 1.763769E+00 | 5.878190E+00 | −2.320916E+00 | −5.451983E+00 |
| A12 | −2.301461E+00 | −1.340616E+01 | −6.481666E+00 | 2.970133E+00 |
| A14 | 1.522299E+00 | 1.171338E+01 | 8.091793E+00 | −7.935455E−01 |
| A16 | −5.214374E−01 | −3.823035E+00 | −2.863014E+00 | 8.753981E−02 |
| A18 | 0.000000E+00 | 0.000000E+00 | 0.000000E+00 | 0.000000E+00 |
| Surface No | 11 | 12 | 13 | 14 |
| k | 2.351728E+00 | −1.329982E+01 | −9.000000E+01 | −5.053998E+00 |
| A4 | 3.100754E−01 | 1.486271E−01 | −2.853280E−01 | −2.095684E−01 |
| A6 | −1.051451E+00 | 4.674700E−01 | 5.825779E−01 | 1.967954E−01 |
| A8 | 1.268129E+00 | −1.007661E+00 | −3.817785E−01 | −1.113431E−01 |
| A10 | −1.076988E+00 | 8.109375E−01 | −5.096388E−02 | 3.457500E−02 |
| A12 | 7.465530E−01 | −3.468022E−01 | 1.378681E−01 | −6.219302E−03 |
| A14 | −3.610123E−01 | 7.845773E−02 | −4.901357E−02 | 6.412707E−04 |
| A16 | 7.414226E−02 | −7.401223E−03 | 5.527505E−03 | −3.067664E−05 |
| A18 | 0.000000E+00 | 0.000000E+00 | 0.000000E+00 | 0.000000E+00 |

In the fourth embodiment, the form of the aspheric surface equation is similar to that in the first embodiment. Furthermore, the definitions of parameters in following tables are similar to those in the first embodiment, so the repetitive details will not be given here.

The following values for the conditional expressions can be obtained from the data in Table 7 and Table 8.

| Fourth Embodiment (Primary Reference Wavelength = 555 nm) | | | | | |
|---|---|---|---|---|---|
| MTFE0 | MTFE3 | MTFE7 | MTFQ0 | MTFQ3 | MTFQ7 |
| 0.89 | 0.84 | 0.63 | 0.77 | 0.65 | 0.37 |
| ETP1 | ETP2 | ETP3 | ETP4 | ETP5 | ETP6 |
| 0.452 | 0.323 | 0.282 | 0.275 | 0.511 | 0.882 |
| ETP1/TP1 | ETP2/TP2 | ETP3/TP3 | ETP4/TP4 | ETP5/TP5 | ETP6/TP6 |
| 0.613 | 1.470 | 0.783 | 1.188 | 0.930 | 1.201 |
| ETL | EBL | EIN | EIR | PIR | EIN/ETL |
| 4.139 | 0.821 | 3.318 | 0.076 | 0.231 | 0.802 |
| SETP/EIN | EIR/PIR | SETP | STP | SETP/STP | BL |
| 0.821 | 0.328 | 2.725 | 2.832 | 0.962 | 0.976 |
| ED12 | ED23 | ED34 | ED45 | ED56 | EBL/BL |
| 0.120 | 0.046 | 0.040 | 0.329 | 0.058 | 0.8412 |
| SED | SIN | SED/SIN | ED12/ED23 | ED23/ED34 | ED34/ED45 |
| 0.593 | 0.553 | 1.073 | 2.582 | 1.162 | 0.122 |
| ED12/IN12 | ED23/IN23 | ED34/IN34 | ED45/IN45 | ED56/IN56 | ED45/ED56 |
| 1.990 | 0.240 | 0.730 | 1.495 | 2.329 | 5.646 |
| \|f/f1\| | \|f/f2\| | \|f/f3\| | \|f/f4\| | \|f/f5\| | \|f/f6\| |
| 1.32413 | 0.71267 | 0.67584 | 0.69243 | 1.02241 | 1.21571 |
| ΣPPR | ΣNPR | ΣPPR/\|ΣNPR\| | IN12/f | IN56/f | TP4/(IN34 + TP4 + IN45) |
| 3.71482 | 1.92838 | 1.92639 | 0.01786 | 0.00741 | 0.45729 |
| \|f1/f2\| | \|f2/f3\| | (TP1 + IN12)/TP2 | | (TP6 + IN56)/TP5 | |
| 0.53822 | 0.94831 | 3.62301 | | 1.38092 | |
| HOS | InTL | HOS/HOI | InS/HOS | ODT % | TDT % |
| 4.36144 | 3.38500 | 1.49826 | 0.95869 | 2.15325 | 2.16080 |
| HVT51 | HVT52 | HVT61 | HVT62 | HVT62/HOI | HVT62/HOS |
| 0.672298 | 0 | 0.92227 | 1.27494 | 0.43797 | 0.29232 |
| TP2/TP3 | TP3/TP4 | InRS61 | InRS62 | \|InRS61\|/TP6 | \|InRS62\|/TP6 |
| 0.61110 | 1.55546 | −0.36108 | −0.43640 | 0.49196 | 0.59457 |
| PSTA | PLTA | NSTA | NLTA | SSTA | SLTA |
| −0.003 mm | 0.002 mm | −0.027 mm | −0.030 mm | −0.015 mm | −0.019 mm |
| VSFS0 | VSFS3 | VSFS7 | VTFS0 | VTFS3 | VTFS7 |
| −0.000 | −0.000 | 0.005 | −0.000 | −0.000 | 0.010 |

-continued

| Fourth Embodiment (Primary Reference Wavelength = 555 nm) | | | | | |
|---|---|---|---|---|---|
| VSMTF0 | VSMTF3 | VSMTF7 | VTMTF0 | VTMTF3 | VTMTF7 |
| 0.771 | 0.685 | 0.530 | 0.771 | 0.653 | 0.446 |
| ISFS0 | ISFS3 | ISFS7 | ITFS0 | ITFS3 | ITFS7 |
| −0.000 | −0.000 | 0.010 | −0.000 | 0.010 | 0.030 |
| ISMTF0 | ISMTF3 | ISMTF7 | ITMTF0 | ITMTF3 | ITMTF7 |
| 0.745 | 0.592 | 0.575 | 0.745 | 0.511 | 0.488 |
| FS | AIFS | AVFS | AFS | | |
| 0.000 | 0.008 | 0.003 | 0.006 | | |

The following values for the conditional expressions can be obtained from the data in Table 7 and Table 8.

| Values Related to Inflection Point of Fourth Embodiment (Primary Reference Wavelength = 555 nm) | | | | | | |
|---|---|---|---|---|---|---|
| HIF211 | 0.1577 | HIF211/HOI | 0.0542 | SGI211 | −0.0002 | \|SGI211\|/(\|SGI211\|+TP2) | 0.0008 |
| HIF212 | 0.5178 | HIF212/HOI | 0.1779 | SGI212 | 0.0008 | \|SGI212\|/(\|SGI212\|+TP2) | 0.0036 |
| HIF213 | 0.7653 | HIF213/HOI | 0.2629 | SGI213 | −0.0008 | \|SGI213\|/(\|SGI213\|+TP2) | 0.0038 |
| HIF221 | 0.7506 | HIF221/HOI | 0.2578 | SGI221 | 0.0812 | \|SGI221\|/(\|SGI221\|+TP2) | 0.2695 |
| HIF311 | 0.2749 | HIF311/HOI | 0.0944 | SGI311 | 0.0026 | \|SGI311\|/(\|SGI311\|+TP3) | 0.0073 |
| HIF421 | 0.8047 | HIF421/HOI | 0.2764 | SGI421 | −0.0831 | \|SGI421\|/(\|SGI421\|+TP4) | 0.2641 |
| HIF511 | 0.4602 | HIF511/HOI | 0.1581 | SGI511 | 0.0177 | \|SGI511\|/(\|SGI511\|+TP5) | 0.0312 |
| HIF521 | 0.3366 | HIF521/HOI | 0.1156 | SGI521 | −0.0217 | \|SGI521\|/(\|SGI521\|+TP5) | 0.0380 |
| HIF522 | 0.8421 | HIF522/HOI | 0.2893 | SGI522 | −0.0261 | \|SGI522\|/(\|SGI522\|+TP5) | 0.0453 |
| HIF611 | 0.2008 | HIF611/HOI | 0.0690 | SGI611 | 0.0020 | \|SGI611\|/(\|SGI611\|+TP6) | 0.0027 |
| HIF612 | 0.5166 | HIF612/HOI | 0.1775 | SGI612 | 0.0036 | \|SGI612\|/(\|SGI612\|+TP6) | 0.0049 |
| HIF613 | 0.8120 | HIF613/HOI | 0.2790 | SGI613 | 0.0068 | \|SGI613\|/(\|SGI613\|+TP6) | 0.0092 |
| HIF621 | 0.5228 | HIF621/HOI | 0.1796 | SGI621 | 0.0830 | \|SGI621\|/(\|SGI621\|+TP6) | 0.1015 |

Fifth Embodiment

Figure 5A:
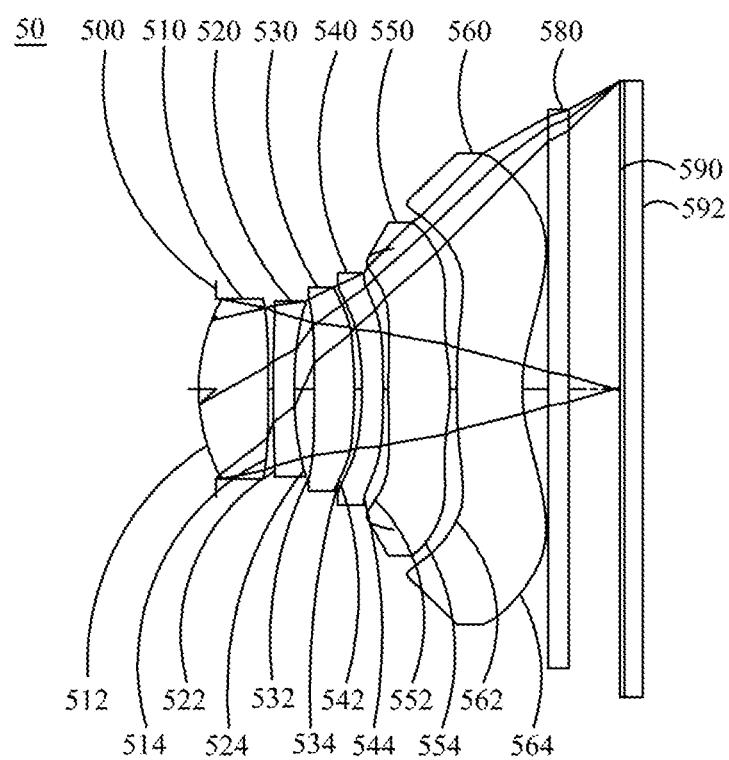
FIG. 5A is a schematic view of the optical image capturing system according to the fifth embodiment of the present invention.
Figure 5B:
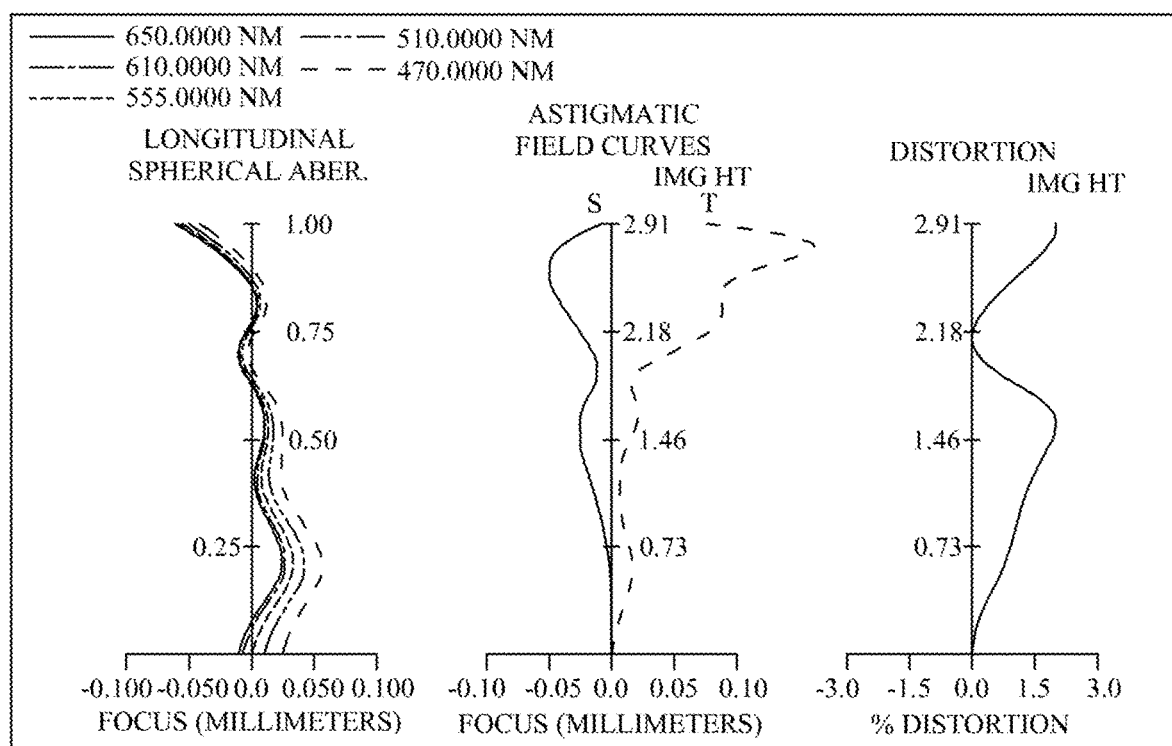
FIG. 5B shows the longitudinal spherical aberration curves, astigmatic field curves, and optical distortion curve of the optical image capturing system in the order from left to right according to the fifth embodiment of the present invention.
Figure 5C:
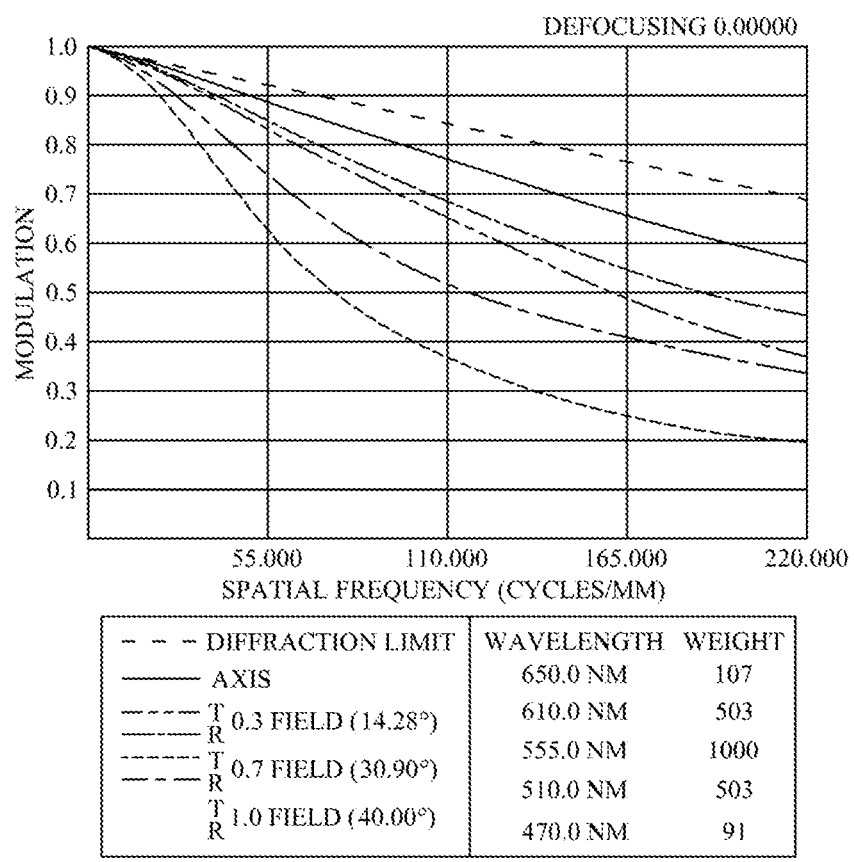
FIG. 5C is a characteristic diagram of modulation transfer of a visible light according to the fifth embodiment of the present invention.
Figure 5D:
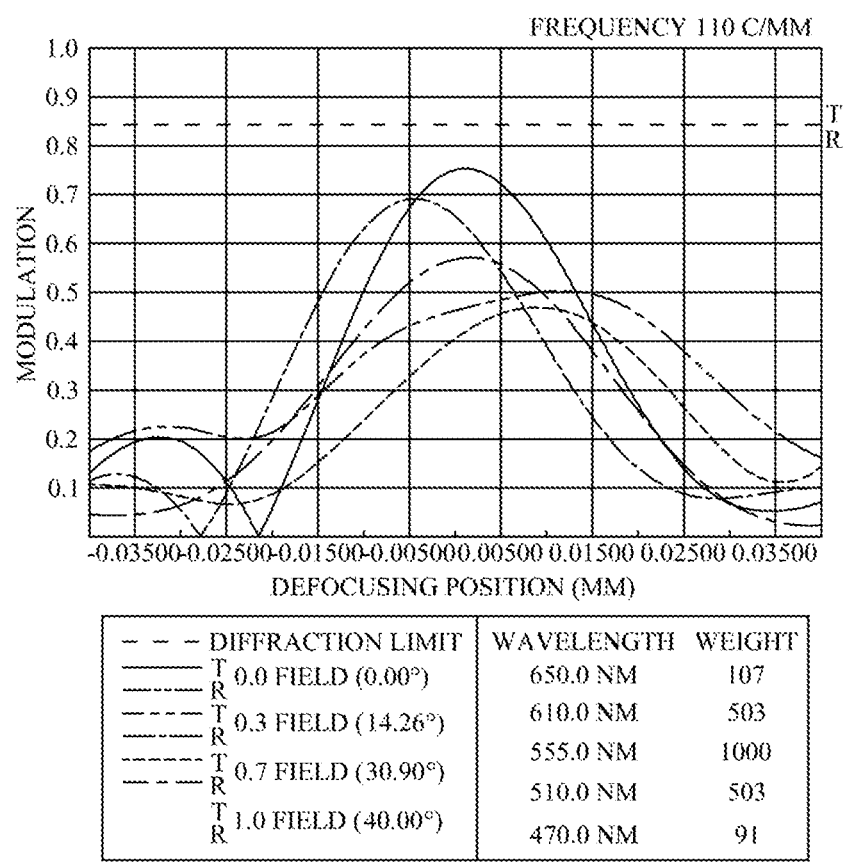
FIG. 5D is a diagram showing the through focus MTF values (Through Focus MTF) of visible light spectrum at the central field of view, 0.3 field of view, and 0.7 field of view of the fifth embodiment of the present invention.
Figure 5E:
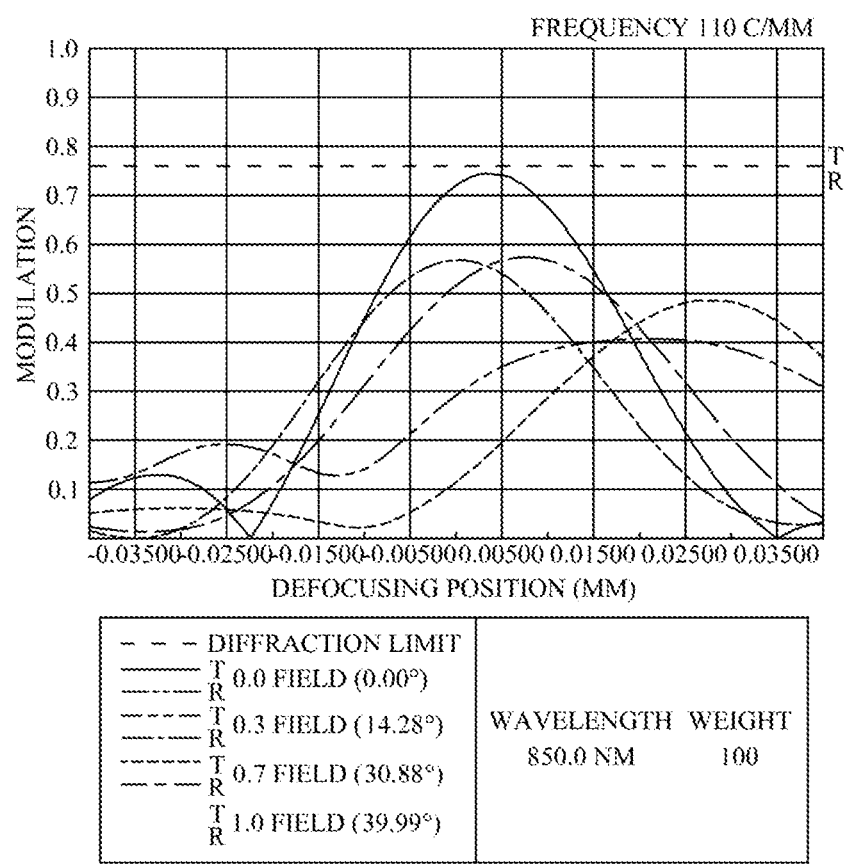
FIG. 5E is a diagram showing the through focus MTF values of infrared light spectrum at the central field of view, 0.3 field of view, and 0.7 field of view of the fifth embodiment of the present invention.

Please refer to FIG. 5A and FIG. 5B. FIG. 5A is a schematic view of the optical image capturing system according to the fifth embodiment of the present invention. FIG. 5B shows the longitudinal spherical aberration curves, astigmatic field curves, and optical distortion curve of the optical image capturing system, in the order from left to right, according to the fifth embodiment of the present invention. FIG. 5C is a characteristic diagram of modulation transfer of a visible light according to the fifth embodiment of the present invention. FIG. 5D is a diagram showing the through focus MTF values (Through Focus MTF) of visible light spectrum at the central field of view, 0.3 field of view, and 0.7 field of view of the fifth embodiment of the present invention. FIG. 5E is a diagram showing the through focus MTF values of infrared light spectrum at the central field of view, 0.3 field of view, and 0.7 field of view of the fifth embodiment of the present invention. As shown in FIG. 5A, in the order from the object side to an image side, the optical image capturing system 50 includes an aperture 500, a first lens 510, a second lens 520, a third lens 530, a fourth lens 540, a fifth lens 550, a sixth lens 560, an IR-bandstop filter 580, a first image plane 590, and an image sensing device 592.

The first lens 510 has positive refractive power and is made of plastic material. The object side 512 of the first lens 510 is a convex surface and the image side 514 of the first lens 510 is a convex surface, and both the object side 512 and the image side 514 thereof are aspheric.

The second lens 520 has negative refractive power and is made of plastic material. The object side 522 of the second lens 520 is a concave surface and the image side 524 of the second lens 520 is a concave surface, and both the object side 522 and the image side 524 thereof are aspheric. The object side 522 thereof has three inflection points.

The third lens 530 has positive refractive power and is made of plastic material. The object side 532 of the third lens 530 is a concave surface and the image side 534 of the third lens 530 is a convex surface, and both object side 532 and image side 534 thereof are aspheric. The image side 534 thereof has two inflection points.

The fourth lens 540 has negative refractive power and is made of plastic material. The object side 542 of the fourth lens 540 is a concave surface and the image side 544 of the fourth lens 540 is a convex surface, and both object side 542 and image side 544 thereof are aspheric. The object side 542 thereof has two inflection points and the image side 544 thereof has one inflection point.

The fifth lens 550 has positive refractive power and is made of plastic material. The object side 552 of the fifth lens 550 is a convex surface and the image side 554 of the fifth lens 550 is a convex surface, and both object side 552 and image side 554 thereof are aspheric. Both of the object side 552 and the image side 554 have two inflection points.

The sixth lens 560 has negative refractive power and is made of plastic material. The object side 562 of the sixth lens 560 is a convex surface and the image side 564 of the sixth lens 560 is a concave surface, and both object side 562 and image side 564 thereof are aspheric. Both of the object side 562 and the image side 564 thereof have one inflection point. Hereby, this configuration is beneficial to shorten the back focal length of the optical image capturing system so as to maintain the characteristics of miniaturization. Besides, the incident angle of the off-axis rays can be reduced effectively, thereby further correcting the off-axis aberration.

The IR-bandstop filter 580 is made of a glass material and is disposed between the sixth lens 560 and the first image plane 590 without affecting the focal length of the optical image capturing system.

Table 9 and Table 10 below should be incorporated into the reference of the present embodiment.

TABLE 9

Lens Parameters for the Fifth Embodiment
f(focal length) = 3.375 mm; f/HEP = 2.0;
HAF(half angle of view) = 40.004 deg

| Surface No | | Curvature Radius | Thickness (mm) | Material |
|---|---|---|---|---|
| 0 | Object | 1E+18 | 600 | |
| 1 | Aperture | 1E+18 | −0.180 | |
| 2 | Lens 1 | 1.563727253 | 0.727 | Plastic |
| 3 | | −8.203357734 | 0.025 | |
| 4 | | 1E+18 | 0.025 | |
| 5 | Lens 2 | −208.673956 | 0.220 | Plastic |
| 6 | | 3.415802645 | 0.209 | |
| 7 | Lens 3 | −116.6792053 | 0.417 | Plastic |

TABLE 9-continued

Lens Parameters for the Fifth Embodiment
f(focal length) = 3.375 mm; f/HEP = 2.0;
HAF(half angle of view) = 40.004 deg

| 8 | | −3.006048844 | 0.080 | |
| 9 | Lens 4 | −2.17636866 | 0.220 | Plastic |
| 10 | | −13.96692913 | 0.058 | |
| 11 | Lens 5 | 26.56953957 | 0.642 | Plastic |
| 12 | | −1.469350747 | 0.074 | |
| 13 | Lens 6 | 18.16934198 | 0.680 | Plastic |
| 14 | | 1.280299338 | 0.273 | |
| 15 | IR-bandstop Filter | 1E+18 | 0.210 | BK_7 |
| 16 | | 1E+18 | 0.535 | |
| 17 | First Image Plane | 1E+18 | 0.000 | |

| Surface No | Refractive Index | Coefficient of Dispersion | Focal Length |
|---|---|---|---|
| 0 | | | |
| 1 | | | |
| 2 | 1.545 | 55.961 | 2.469 |
| 3 | | | |
| 4 | | | |
| 5 | 1.661 | 20.364 | −5.036 |
| 6 | | | |
| 7 | 1.545 | 55.961 | 5.641 |
| 8 | | | |
| 9 | 1.661 | 20.364 | −3.894 |
| 10 | | | |
| 11 | 1.545 | 55.961 | 2.570 |
| 12 | | | |
| 13 | 1.545 | 55.961 | −2.558 |
| 14 | | | |
| 15 | 1.517 | 64.13 | |
| 16 | | | |
| 17 | | | |

Reference Wavelength = 555 nm;
Shield Position: The 4th surface with effective aperture radius = 0.781 mm

TABLE 10

The Aspheric Coefficients of the Fifth Embodiment
Table 10: Aspheric Coefficients

| Surface No | 2 | 3 | 5 | 6 |
|---|---|---|---|---|
| k | −4.749946E+00 | −8.999961E+01 | −9.000000E+01 | 3.024648E+00 |
| A4 | 4.169464E−02 | 1.457609E−01 | 2.245409E−01 | 7.586790E−02 |
| A6 | 1.618582E+00 | −5.217571E−01 | −7.109316E−01 | −3.407285E−01 |
| A8 | −1.342365E+01 | 6.127682E−01 | 1.584356E+00 | 1.101842E+00 |
| A10 | 5.778089E+01 | 1.054226E+00 | −1.082396E+00 | −1.430905E+00 |
| A12 | −1.429165E+02 | −6.060495E+00 | −4.053578E+00 | 1.568167E−01 |
| A14 | 2.033382E+02 | 8.776262E+00 | 8.376484E+00 | 8.801680E−01 |
| A16 | −1.547559E+02 | −4.192468E+00 | −4.403611E+00 | −3.345910E−01 |
| A18 | 4.879626E+01 | 0.000000E+00 | 0.000000E+00 | 0.000000E+00 |

| Surface No | 7 | 8 | 9 | 10 |
|---|---|---|---|---|
| k | −8.999848E+01 | −9.000000E+01 | −1.720212E+01 | 8.999998E+01 |
| A4 | 7.274299E−03 | 2.905656E−01 | 4.671341E−01 | −1.011453E−02 |
| A6 | −6.158337E−01 | −1.642978E+00 | −2.973139E+00 | −1.230538E+00 |
| A8 | 1.505122E+00 | 2.390582E+00 | 7.412091E+00 | 3.352622E+00 |
| A10 | −2.604475E+00 | −2.515093E+00 | −1.244095E+01 | −4.639224E+00 |
| A12 | 4.112776E+00 | 1.715054E+00 | 1.270785E+01 | 3.416839E+00 |
| A14 | −4.216562E+00 | 1.817587E−01 | −6.385007E+00 | −1.163975E+00 |
| A16 | 1.692722E+00 | −5.832983E−01 | 1.094694E+00 | 1.283498E−01 |
| A18 | 0.000000E+00 | 0.000000E+00 | 0.000000E+00 | 0.000000E+00 |

| Surface No | 11 | 12 | 13 | 14 |
|---|---|---|---|---|
| k | 2.351728E+00 | −7.315167E+00 | −8.955261E+01 | −1.825055E+00 |
| A4 | 3.610865E−02 | 4.451778E−01 | 3.277828E−01 | −2.644370E−01 |
| A6 | −2.529346E−01 | −2.191254E−01 | −8.016780E−01 | 1.936720E−01 |
| A8 | 3.667953E−01 | −2.588109E−01 | 1.084798E+00 | −9.074869E−02 |
| A10 | −7.338559E−01 | 3.363546E−01 | −9.065120E−01 | 2.254366E−02 |

TABLE 10-continued

The Aspheric Coefficients of the Fifth Embodiment
Table 10: Aspheric Coefficients

| | | | | |
|---|---|---|---|---|
| A12 | 7.465530E−01 | −1.669320E−01 | 4.183307E−01 | −2.948037E−03 |
| A14 | −3.610123E−01 | 4.109807E−02 | −9.776963E−02 | 2.016179E−04 |
| A16 | 7.414226E−02 | −4.188205E−03 | 9.051419E−03 | −7.155418E−06 |
| A18 | 0.000000E+00 | 0.000000E+00 | 0.000000E+00 | 0.000000E+00 |

In the fifth embodiment, the form of the aspheric surface equation is similar to that in the first embodiment. Furthermore, the definitions of parameters in following tables are similar to those in the first embodiment, so the repetitive details will not be given here.

The following values for the conditional expressions can be obtained from the data in Table 9 and Table 10:

| Fifth Embodiment (Primary Reference Wavelength = 555 nm) | | | | | |
|---|---|---|---|---|---|
| MTFE0 | MTFE3 | MTFE7 | MTFQ0 | MTFQ3 | MTFQ7 |
| 0.89 | 0.84 | 0.63 | 0.77 | 0.65 | 0.37 |
| ETP1 | ETP2 | ETP3 | ETP4 | ETP5 | ETP6 |
| 0.439 | 0.328 | 0.319 | 0.289 | 0.623 | 0.799 |
| ETP1/TP1 | ETP2/TP2 | ETP3/TP3 | ETP4/TP4 | ETP5/TP5 | ETP6/TP6 |
| 0.604 | 1.489 | 0.765 | 1.312 | 0.970 | 1.176 |
| ETL | EBL | EIN | EIR | PIR | EIN/ETL |
| 4.161 | 0.843 | 3.318 | 0.098 | 0.273 | 0.797 |
| SETP/EIN | EIR/PIR | SETP | STP | SETP/STP | BL |
| 0.843 | 0.359 | 26.165 | 26.201 | 0.999 | 1.018 |
| ED12 | ED23 | ED34 | ED45 | ED56 | EBL/BL |
| 0.128 | 0.021 | 0.045 | 0.146 | 0.182 | 0.8281 |
| SED | SIN | SED/SIN | ED12/ED23 | ED23/ED34 | ED34/ED45 |
| 0.522 | 0.471 | 1.107 | 6.001 | 0.476 | 0.305 |
| ED12/IN12 | ED23/IN23 | ED34/IN34 | ED45/IN45 | ED56/IN56 | ED45/ED56 |
| 2.553 | 0.102 | 0.558 | 2.544 | 2.445 | 0.807 |
| |f/f1| | |f/f2| | |f/f3| | |f/f4| | |f/f5| | |f/f6| |
| 1.36681 | 0.67018 | 0.59827 | 0.86676 | 1.31338 | 1.31948 |
| ΣPPR | ΣNPR | ΣPPR/|ΣNPR| | IN12/f | IN56/f | TP4/(IN34 + TP4 + IN45) |
| 3.54695 | 2.58793 | 1.37058 | 0.01482 | 0.02200 | 0.61490 |
| |f1/f2| | |f2/f3| | (TP1 + IN12)/TP2 | | (TP6 + IN56)/TP5 | |
| 0.49033 | 0.89270 | 3.53154 | | 1.17449 | |
| HOS | InTL | HOS/HOI | InS/HOS | ODT % | TDT % |
| 4.39440 | 3.37680 | 1.50958 | 0.95900 | 2.00955 | 2.00953 |
| HVT51 | HVT52 | HVT61 | HVT62 | HVT62/HOI | HVT62/HOS |
| 0.509509 | 0 | 0.96581 | 1.31721 | 0.45249 | 0.29975 |
| TP2/TP3 | TP3/TP4 | InRS61 | InRS62 | |InRS61|/TP6 | |InRS62|/TP6 |
| 0.52733 | 1.89634 | −0.38166 | −0.40944 | 0.56156 | 0.60245 |
| PSTA | PLTA | NSTA | NLTA | SSTA | SLTA |
| −0.002 mm | 0.005 mm | −0.019 mm | −0.023 mm | −0.014 mm | −0.020 mm |
| VSFS0 | VSFS3 | VSFS7 | VTFS0 | VTFS3 | VTFS7 |
| −0.000 | −0.005 | −0.000 | −0.000 | 0.010 | 0.010 |
| VSMTF0 | VSMTF3 | VSMTF7 | VTMTF0 | VTMTF3 | VTMTF7 |
| 0.750 | 0.691 | 0.569 | 0.751 | 0.501 | 0.469 |
| ISFS0 | ISFS3 | ISFS7 | ITFS0 | ITFS3 | ITFS7 |
| 0.005 | −0.000 | 0.010 | 0.005 | 0.020 | 0.030 |
| ISMTF0 | ISMTF3 | ISMTF7 | ITMTF0 | ITMTF3 | ITMTF7 |
| 0.741 | 0.567 | 0.567 | 0.741 | 0.407 | 0.482 |
| FS | AIFS | AVFS | AFS | | |
| 0.005 | 0.011 | 0.003 | 0.009 | | |

The following values for the conditional expressions can be obtained from the data in Table 9 and Table 10.

| Values Related to Inflection Point of Fifth Embodiment (Primary Reference Wavelength = 555 nm) | | | | | |
|---|---|---|---|---|---|
| HIF211 | 0.04246 | HIF211/HOI | 0.01459 | SGI211 | −0.00000 | |SGI211|/(|SGI211|+TP2) | 0.00002 |
| HIF212 | 0.58316 | HIF212/HOI | 0.20033 | SGI212 | 0.01081 | |SGI212|/(|SGI212|+TP2) | 0.04683 |
| HIF213 | 0.73492 | HIF213/HOI | 0.25246 | SGI213 | 0.01707 | |SGI213|/(|SGI213|+TP2) | 0.07199 |

-continued

Values Related to Inflection Point of Fifth Embodiment
(Primary Reference Wavelength = 555 nm)

| | | | | | | | |
|---|---|---|---|---|---|---|---|
| HIF321 | 0.82286 | HIF321/HOI | 0.28267 | SGI321 | −0.14068 | \|SGI321\|/(\|SGI321\|+TP3) | 0.25217 |
| HIF322 | 0.91215 | HIF322/HOI | 0.31335 | SGI322 | −0.18584 | \|SGI322\|/(\|SGI322\|+TP3) | 0.30817 |
| HIF411 | 0.81250 | HIF411/HOI | 0.27911 | SGI411 | −0.16960 | \|SGI411\|/(\|SGI411\|+TP4) | 0.43531 |
| HIF412 | 0.94002 | HIF412/HOI | 0.32292 | SGI412 | −0.23452 | \|SGI412\|/(\|SGI412\|+TP4) | 0.51597 |
| HIF421 | 0.89689 | HIF421/HOI | 0.30810 | SGI421 | −0.14344 | \|SGI421\|/(\|SGI421\|+TP4) | 0.39467 |
| HIF511 | 0.35357 | HIF511/HOI | 0.12146 | SGI511 | 0.00249 | \|SGI511\|/(\|SGI511\|+TP5) | 0.00387 |
| HIF512 | 1.07720 | HIF512/HOI | 0.37004 | SGI512 | −0.16003 | \|SGI512\|/(\|SGI512\|+TP5) | 0.19956 |
| HIF521 | 0.31817 | HIF521/HOI | 0.10930 | SGI521 | −0.02791 | \|SGI521\|/(\|SGI521\|+TP5) | 0.04166 |
| HIF522 | 0.79380 | HIF522/HOI | 0.27269 | SGI522 | −0.05403 | \|SGI522\|/(\|SGI522\|+TP5) | 0.07764 |
| HIF611 | 0.68145 | HIF611/HOI | 0.23410 | SGI611 | 0.03744 | \|SGI611\|/(\|SGI611\|+TP6) | 0.05221 |
| HIF621 | 0.61160 | HIF621/HOI | 0.21010 | SGI621 | 0.11130 | \|SGI621\|/(\|SGI621\|+TP6) | 0.14072 |

Sixth Embodiment

Figure 6A:
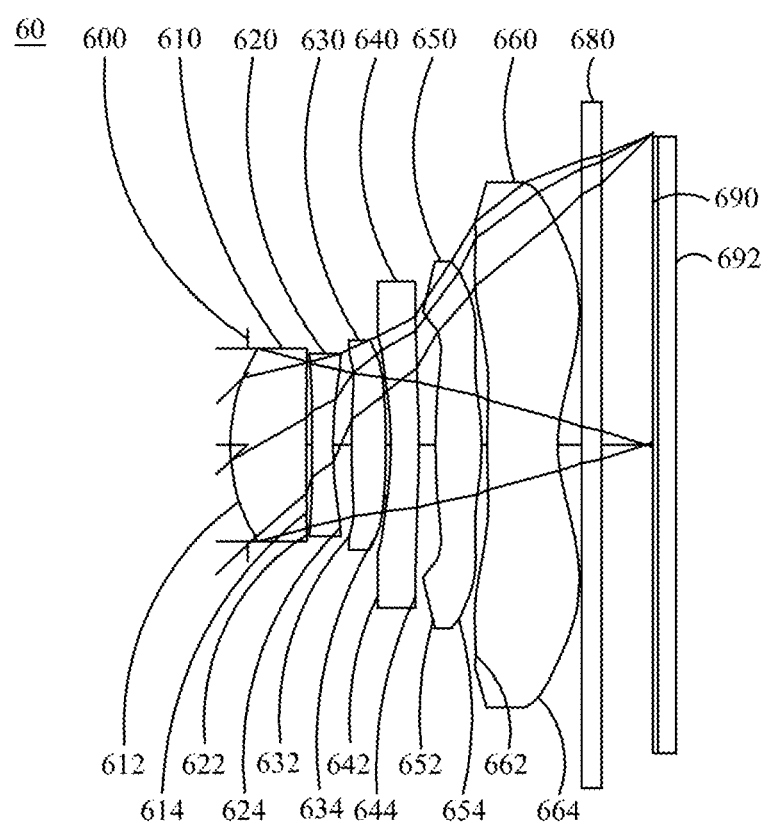
FIG. 6A is a schematic view of the optical image capturing system according to the sixth embodiment of the present invention.
Figure 6B:
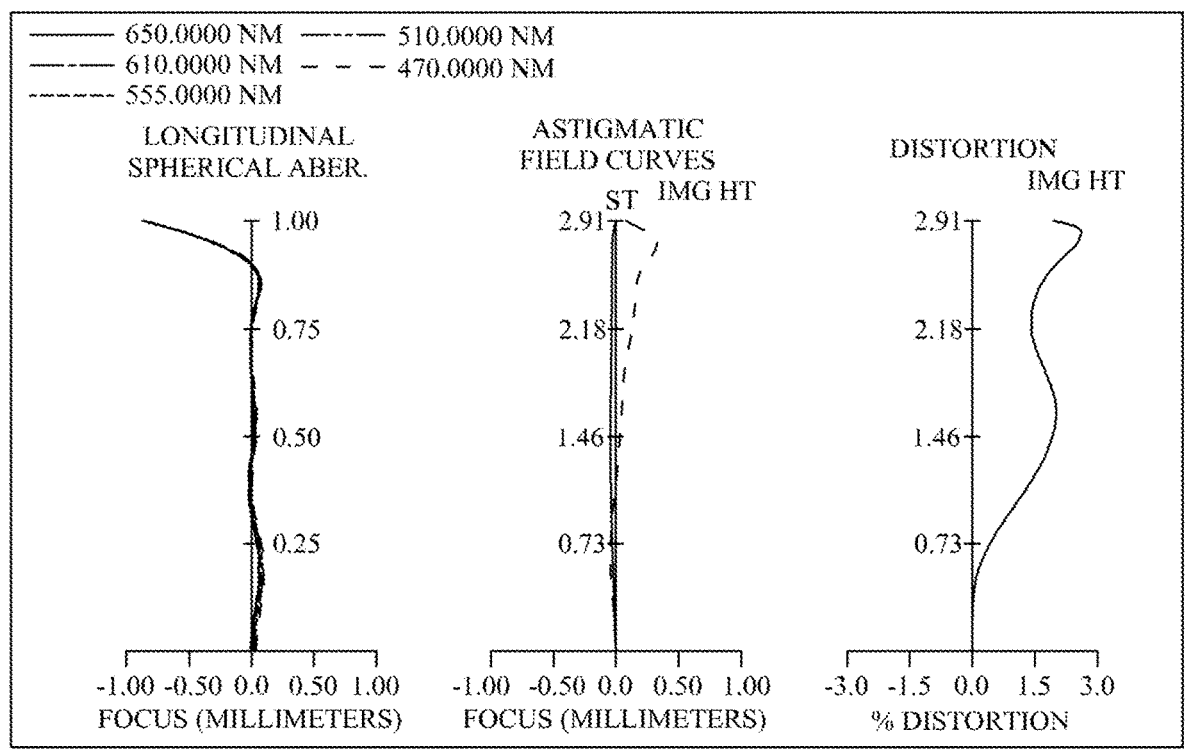
FIG. 6B shows the longitudinal spherical aberration curves, astigmatic field curves, and optical distortion curve of the optical image capturing system in the order from left to right according to the sixth embodiment of the present invention.
Figure 6C:
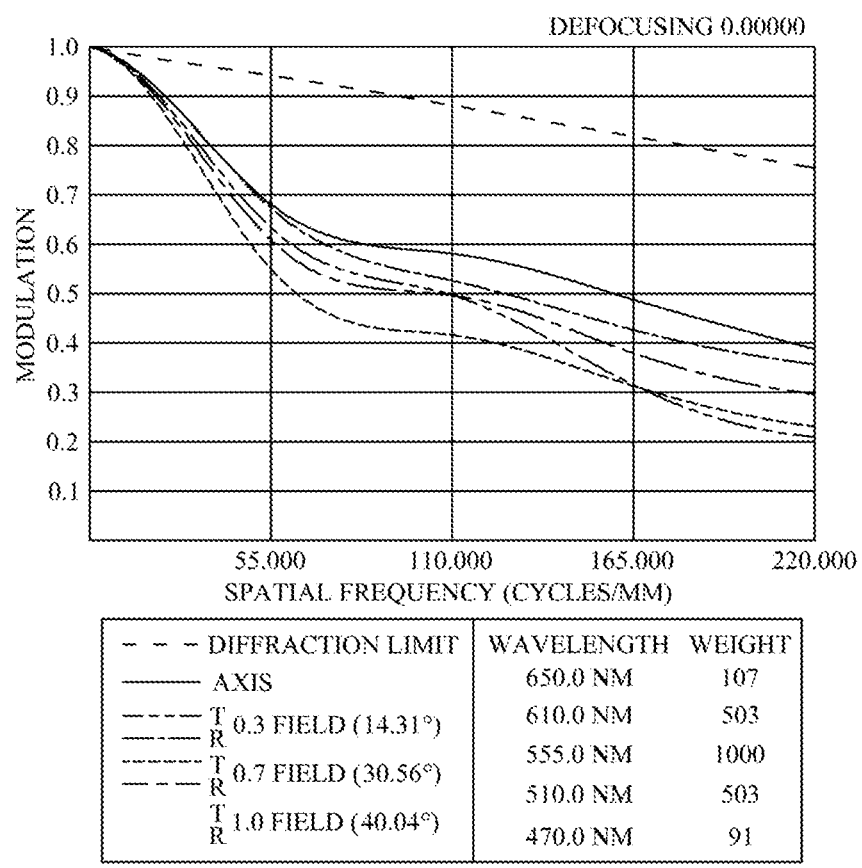
FIG. 6C is a characteristic diagram of modulation transfer of a visible light according to the sixth embodiment of the present invention.
Figure 6D:
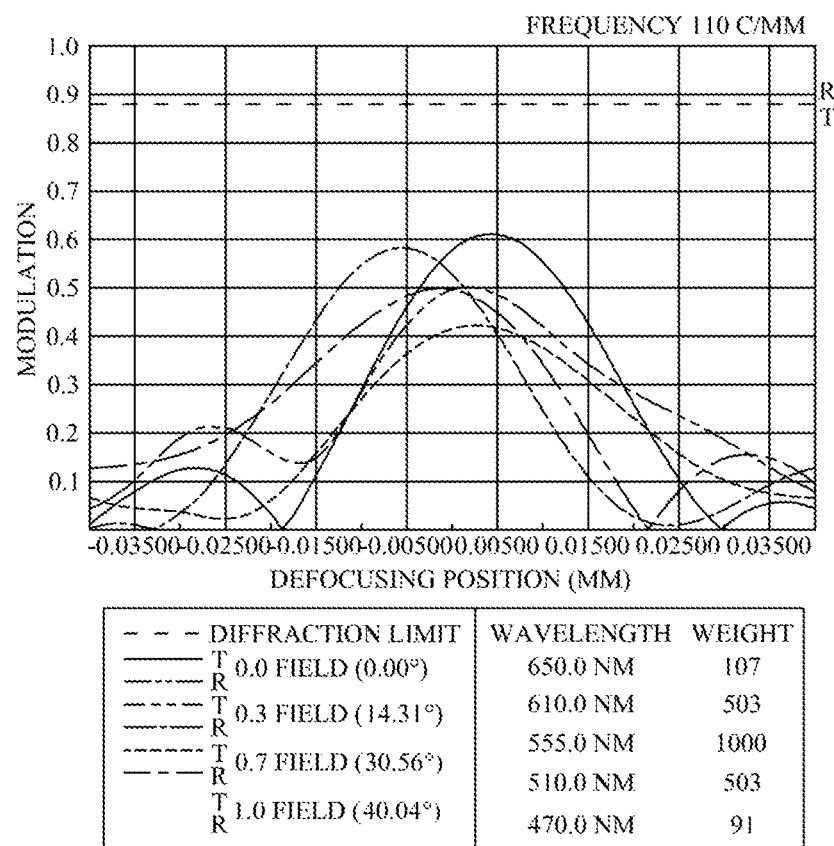
FIG. 6D is a diagram showing the through focus MTF values (Through Focus MTF) of visible light spectrum at the central field of view, 0.3 field of view, and 0.7 field of view of the sixth embodiment of the present invention.
Figure 6E:
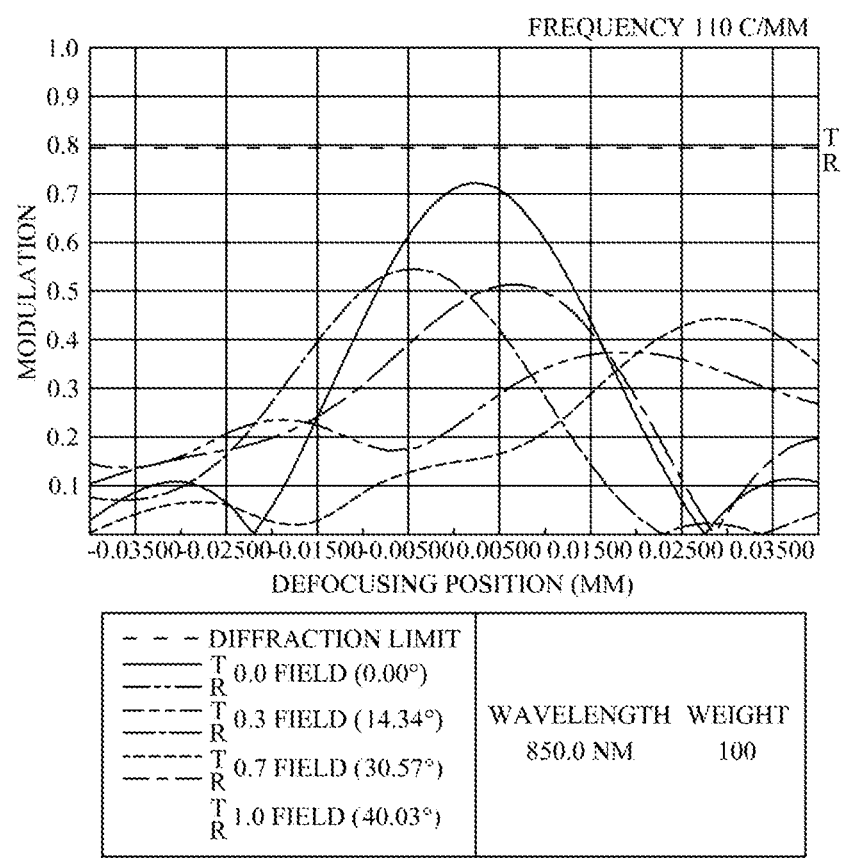
FIG. 6E is a diagram showing the through focus MTF values of infrared light spectrum at the central field of view, 0.3 field of view, and 0.7 field of view of the sixth embodiment of the present invention.

Please refer to FIGS. 6A to 6E. FIG. 6A is a schematic view of the optical image capturing system according to the sixth embodiment of the present invention. FIG. 6B shows the longitudinal spherical aberration curves, astigmatic field curves, and optical distortion curve of the optical image capturing system, in the order from left to right, according to the sixth embodiment of the present invention. FIG. 6C is a characteristic diagram of modulation transfer of a visible light according to the sixth embodiment of the present invention. FIG. 6D is a diagram showing the through focus MTF values (Through Focus MTF) of visible light spectrum at the central field of view, 0.3 field of view, and 0.7 field of view of the sixth embodiment of the present invention. FIG. 6E is a diagram showing the through focus MTF values of infrared light spectrum at the central field of view, 0.3 field of view, and 0.7 field of view of the sixth embodiment of the present invention. As shown in FIG. 6A, in the order from the object side to an image side, the optical image capturing system 60 includes an aperture 600, a first lens 610, a second lens 620, a third lens 630, a fourth lens 640, a fifth lens 650, a sixth lens 660, an IR-bandstop filter 680, a first image plane 690, and an image sensing device 692.

The first lens 610 has positive refractive power and is made of plastic material. The object side 612 of the first lens 610 is a convex surface and the image side 614 of the first lens 610 is a concave surface, and both object side 612 and image side 614 are thereof aspheric. The image side 614 thereof has one inflection point.

The second lens 620 has negative refractive power and is made of plastic material. The object side 622 of the second lens 620 is a convex surface and the image side 624 of the second lens 620 is a concave surface, and both object side 622 and image side 624 thereof are aspheric. Both of the object side 622 and the image side 624 thereof have one inflection point.

The third lens 630 has positive refractive power and is made of plastic material. The object side 632 of the third lens 630 is a convex surface and the image side 634 of the third lens 630 is a convex surface, and both object side 632 and image side 634 thereof are aspheric. The object side 632 thereof has two inflection points and the image side 634 thereof has three inflection points.

The fourth lens 640 has negative refractive power and is made of plastic material. The object side 642 of the fourth lens 640 is a concave surface and the image side 644 of the fourth lens 640 is a concave surface, and both object side 642 and image side 644 thereof are aspheric. Both of the object side 642 and the image side 644 thereof have two inflection points.

The fifth lens 650 has positive refractive power and is made of plastic material. The object side 652 of the fifth lens 650 is a convex surface and the image side 654 of the fifth lens 650 is a convex surface, and both object side 652 and image side 654 thereof are aspheric. Both of the object side 652 and the image side 654 thereof have two inflection points.

The sixth lens 660 has negative refractive power and is made of plastic material. The object side 662 of the sixth lens 660 is a convex surface and the image side 664 of the sixth lens 660 is a concave surface, and both object side 662 and image side 664 thereof are aspheric. The object side 662 thereof has three inflection points and the image side 664 thereof has one inflection point. Hereby, this configuration is beneficial to shorten the back focal length of the optical image capturing system so as to maintain the characteristics of miniaturization. Besides, the incident angle of the off-axis rays can be reduced effectively, thereby further correcting the off-axis aberration.

The IR-bandstop filter 680 is made of a glass material and is disposed between the sixth lens 660 and the first image plane 690, without affecting the focal length of the optical image capturing system.

Table 11 and Table 12 below should be incorporated into the reference of the present embodiment.

TABLE 11

Lens Parameters for the Sixth Embodiment
f(focal length) = 3.359 mm; f/HEP = 1.8;
HAF(half of angle of view) = 40.097 deg

| Surface No | | Curvature Radius | Thickness (mm) | Material |
|---|---|---|---|---|
| 0 | Object | 1E+18 | 600 | |
| 1 | Aperture | 1E+18 | −0.180 | |
| 2 | Lens 1 | 1.562229251 | 0.791 | Plastic |
| 3 | | 193.1885551 | 0.035 | |
| 4 | | 1E+18 | 0.025 | |
| 5 | Lens 2 | 42.87519315 | 0.220 | Plastic |
| 6 | | 3.276077986 | 0.190 | |
| 7 | Lens 3 | 5.399932862 | 0.357 | Plastic |
| 8 | | −3.220899713 | 0.052 | |
| 9 | Lens 4 | −2.298724515 | 0.292 | Plastic |
| 10 | | 29.53686068 | 0.175 | |
| 11 | Lens 5 | 7.203489682 | 0.478 | Plastic |
| 12 | | −1.960337412 | 0.059 | |
| 13 | Lens 6 | 5.739017518 | 0.737 | Plastic |
| 14 | | 1.230778185 | 0.247 | |
| 15 | IR-bandstop filter | 1E+18 | 0.210 | BK_7 |
| 16 | | 1E+18 | 0.533 | |
| 17 | First Image Plane | 1E+18 | 0.002 | |

TABLE 11-continued

Lens Parameters for the Sixth Embodiment
f(focal length) = 3.359 mm; f/HEP = 1.8;
HAF(half of angle of view) = 40.097 deg

| Surface No | Refractive Index | Coefficient of Dispersion | Focal Length |
|---|---|---|---|
| 0 | | | |
| 1 | | | |
| 2 | 1.545 | 55.961 | 2.888 |
| 3 | | | |
| 4 | | | |
| 5 | 1.661 | 20.364 | −5.376 |
| 6 | | | |
| 7 | 1.545 | 55.961 | 3.760 |
| 8 | | | |
| 9 | 1.661 | 20.364 | −3.213 |
| 10 | | | |
| 11 | 1.545 | 55.961 | 2.883 |
| 12 | | | |
| 13 | 1.545 | 55.961 | −3.054 |
| 14 | | | |
| 15 | 1.517 | 64.13 | |
| 16 | | | |
| 17 | | | |

Reference Wavelength = 555 nm;
Shield Position: The 4th surface with effective aperture radius = 0.781 mm

TABLE 12

The Aspheric Coefficients of the Sixth Embodiment
Table 12: Aspheric Coefficients

| Surface No | 2 | 3 | 5 | 6 |
|---|---|---|---|---|
| k | −3.504250E+00 | −8.999991E+01 | −9.000000E+01 | −3.337141E+01 |
| A4 | −1.525735E−01 | 7.818262E−02 | 7.217693E−02 | 8.988141E−02 |
| A6 | 4.000338E+00 | 4.495921E−02 | −1.908648E−01 | −9.861006E−02 |
| A8 | −2.783056E+01 | −8.328362E−01 | −3.739793E−02 | −5.925520E−01 |
| A10 | 1.038154E+02 | 2.520049E+00 | 1.193630E+00 | 2.511142E+00 |
| A12 | −2.222169E+02 | −4.353526E+00 | −3.448300E+00 | −4.273820E+00 |
| A14 | 2.732853E+02 | 3.856800E+00 | 3.819727E+00 | 3.196034E+00 |
| A16 | −1.795114E+02 | −1.458967E+00 | −1.624986E+00 | −8.608841E−01 |
| A18 | 4.879626E+01 | 0.000000E+00 | 0.000000E+00 | 0.000000E+00 |

| Surface No | 7 | 8 | 9 | 10 |
|---|---|---|---|---|
| k | −8.999990E+01 | −9.000000E+01 | −1.717832E+01 | 9.000000E+01 |
| A4 | 1.883584E−01 | 6.888508E−01 | 6.923352E−01 | −2.457467E−02 |
| A6 | −1.477857E+00 | −3.541090E+00 | −3.990279E+00 | −8.085671E−01 |
| A8 | 5.107785E+00 | 7.560343E+00 | 9.928806E+00 | 2.063184E+00 |
| A10 | −1.291297E+01 | −8.865953E+00 | −1.234384E+01 | −2.203517E+00 |
| A12 | 1.963235E+01 | 5.646110E+00 | 7.630301E+00 | 1.228184E+00 |
| A14 | −1.618358E+01 | −2.036642E+00 | −1.900165E+00 | −3.595346E−01 |
| A16 | 5.578364E+00 | 4.495961E−01 | 1.102486E−05 | 4.560930E−02 |
| A18 | 0.000000E+00 | 0.000000E+00 | 0.000000E+00 | 0.000000E+00 |

| Surface No | 11 | 12 | 13 | 14 |
|---|---|---|---|---|
| k | 2.351728E+00 | −1.329509E+01 | −1.093743E+01 | −5.933499E+00 |
| A4 | 1.618331E−01 | 1.097328E−01 | −1.681136E−01 | −9.506911E−02 |
| A6 | −4.290954E−01 | 2.173627E−01 | 2.010666E−02 | 3.684148E−02 |
| A8 | 6.779881E−01 | −4.275786E−01 | 5.725123E−02 | −1.106723E−02 |
| A10 | −8.945901E−01 | 3.029816E−01 | −3.564299E−02 | 1.228429E−03 |
| A12 | 7.465530E−01 | −1.156208E−01 | 9.574105E−03 | 1.340858E−04 |
| A14 | −3.610123E−01 | 2.383414E−02 | −1.268167E−03 | −3.573191E−05 |
| A16 | 7.414226E−02 | −2.078937E−03 | 6.731096E−05 | 1.678916E−06 |
| A18 | 0.000000E+00 | 0.000000E+00 | 0.000000E+00 | 0.000000E+00 |

In the sixth embodiment, the form of the aspheric surface equation is similar to that in the first embodiment. Furthermore, the definitions of parameters in following tables are similar to those in the first embodiment, so the repetitive details will not be given here.

The following values for the conditional expressions can be obtained from the data in Table 11 and Table 12:

| Sixth Embodiment (Primary Reference Wavelength = 555 nm) | | | | | |
|---|---|---|---|---|---|
| MTFE0 | MTFE3 | MTFE7 | MTFQ0 | MTFQ3 | MTFQ7 |
| 0.68 | 0.64 | 0.55 | 0.58 | 0.5 | 0.42 |
| ETP1 | ETP2 | ETP3 | ETP4 | ETP5 | ETP6 |
| 0.421 | 0.384 | 0.259 | 0.359 | 0.363 | 0.951 |
| ETP1/TP1 | ETP2/TP2 | ETP3/TP3 | ETP4/TP4 | ETP5/TP5 | ETP6/TP6 |
| 0.533 | 1.745 | 0.724 | 1.232 | 0.760 | 1.289 |
| ETL | EBL | EIN | EIR | PIR | EIN/ETL |
| 4.084 | 0.804 | 3.280 | 0.059 | 0.247 | 0.803 |
| SETP/EIN | EIR/PIR | SETP | STP | SETP/STP | BL |
| 0.835 | 0.239 | 26.165 | 26.201 | 0.999 | 0.986 |
| ED12 | ED23 | ED34 | ED45 | ED56 | EBL/BL |
| 0.023 | 0.066 | 0.090 | 0.270 | 0.093 | 0.8154 |
| SED | SIN | SED/SIN | ED12/ED23 | ED23/ED34 | ED34/ED45 |
| 0.542 | 0.535 | 1.013 | 0.346 | 0.738 | 0.333 |
| ED12/IN12 | ED23/IN23 | ED34/IN34 | ED45/IN45 | ED56/IN56 | ED45/ED56 |
| 0.386 | 0.350 | 1.716 | 1.547 | 1.580 | 2.905 |
| \|f/f1\| | \|f/f2\| | \|f/f3\| | \|f/f4\| | \|f/f5\| | \|f/f6\| |
| 1.16307 | 0.62490 | 0.89339 | 1.04541 | 1.16516 | 1.10011 |
| ΣPPR | ΣNPR | ΣPPR/\|ΣNPR\| | IN12/f | IN56/f | TP4/(IN34 + TP4 + IN45) |
| 3.37363 | 2.61839 | 1.28844 | 0.01772 | 0.01751 | 0.56211 |
| \|f1/f2\| | \|f2/f3\| | (TP1 + IN12)/TP2 | | (TP6 + IN56)/TP5 | |
| 0.53728 | 1.42966 | 3.86465 | | 1.66536 | |
| HOS | InTL | HOS/HOI | InS/HOS | ODT % | TDT % |
| 4.39613 | 3.41041 | 1.51018 | 0.95901 | 2.80561 | 1.25193 |
| HVT51 | HVT52 | HVT61 | HVT62 | HVT62/HOI | HVT62/HOS |
| 0.88338 | 0 | 0.52323 | 1.28452 | 0.44126 | 0.29219 |
| TP2/TP3 | TP3/TP4 | InRS61 | InRS62 | \|InRS61\|/TP6 | \|InRS62\|/TP6 |
| 0.61602 | 1.22507 | −0.11669 | −0.27285 | 0.15823 | 0.36997 |
| PSTA | PLTA | NSTA | NLTA | SSTA | SLTA |
| 0.010 mm | 0.012 mm | 0.016 mm | 0.010 mm | 0.001 mm | −0.002 mm |
| VSFS0 | VSFS3 | VSFS7 | VTFS0 | VTFS3 | VTFS7 |
| 0.005 | −0.005 | −0.000 | 0.005 | −0.000 | 0.005 |
| VSMTF0 | VSMTF3 | VSMTF7 | VTMTF0 | VTMTF3 | VTMTF7 |
| 0.611 | 0.583 | 0.497 | 0.611 | 0.497 | 0.417 |
| ISFS0 | ISFS3 | ISFS7 | ITFS0 | ITFS3 | ITFS7 |
| −0.000 | −0.005 | 0.005 | −0.000 | 0.020 | 0.030 |
| ISMTF0 | ISMTF3 | ISMTF7 | ITMTF0 | ITMTF3 | ITMTF7 |
| 0.710 | 0.545 | 0.511 | 0.711 | 0.374 | 0.444 |
| FS | AIFS | AVFS | AFS | | |
| 0.005 | 0.008 | 0.002 | 0.007 | | |

The following values for the conditional expressions can be obtained from the data in Table 11 and Table 12:

| Values Related to Inflection Point of Sixth Embodiment (Primary Reference Wavelength = 555 nm) | | | | | | |
|---|---|---|---|---|---|---|
| HIF121 | 0.5648 | HIF121/HOI | 0.1940 | SGI121 | 0.0065 | \|SGI121\|/(\|SGI121\|+TP1) | 0.0081 |
| HIF211 | 0.4693 | HIF211/HOI | 0.1612 | SGI211 | 0.0042 | \|SGI211\|/(\|SGI211\|+TP2) | 0.0189 |
| HIF221 | 0.6241 | HIF221/HOI | 0.2144 | SGI221 | 0.0537 | \|SGI221\|/(\|SGI221\|+TP2) | 0.1962 |
| HIF311 | 0.3815 | HIF311/HOI | 0.1311 | SGI311 | 0.0133 | \|SGI311\|/(\|SGI311\|+TP3) | 0.0359 |
| HIF312 | 0.8780 | HIF312/HOI | 0.3016 | SGI312 | −0.0286 | \|SGI312\|/(\|SGI312\|+TP3) | 0.0742 |
| HIF321 | 0.2105 | HIF321/HOI | 0.0723 | SGI321 | −0.0053 | \|SGI321\|/(\|SGI321\|+TP3) | 0.0145 |
| HIF322 | 0.3106 | HIF322/HOI | 0.1067 | SGI322 | −0.0089 | \|SGI322\|/(\|SGI322\|+TP3) | 0.0244 |
| HIF323 | 0.9346 | HIF323/HOI | 0.3210 | SGI323 | −0.1407 | \|SGI323\|/(\|SGI323\|+TP3) | 0.2827 |
| HIF411 | 0.6118 | HIF411/HOI | 0.2102 | SGI411 | −0.0551 | \|SGI411\|/(\|SGI411\|+TP4) | 0.1589 |

-continued

Values Related to Inflection Point of Sixth Embodiment
(Primary Reference Wavelength = 555 nm)

| HIF412 | 0.7927 | HIF412/HOI | 0.2723 | SGI412 | −0.0826 | |SGI412|/(|SGI412|+TP4) | 0.2209 |
|---|---|---|---|---|---|---|---|
| HIF421 | 0.1848 | HIF421/HOI | 0.0635 | SGI421 | 0.0005 | |SGI421|/(|SGI421|+TP4) | 0.0018 |
| HIF422 | 0.7066 | HIF422/HOI | 0.2427 | SGI422 | −0.0219 | |SGI422|/(|SGI422|+TP4) | 0.0700 |
| HIF511 | 0.6322 | HIF511/HOI | 0.2172 | SGI511 | 0.0371 | |SGI511|/(|SGI511|+TP5) | 0.0719 |
| HIF512 | 1.2345 | HIF512/HOI | 0.4241 | SGI512 | −0.1138 | |SGI512|/(|SGI512|+TP5) | 0.1922 |
| HIF521 | 0.3905 | HIF521/HOI | 0.1341 | SGI521 | −0.0319 | |SGI521|/(|SGI521|+TP5) | 0.0626 |
| HIF522 | 0.9201 | HIF522/HOI | 0.3161 | SGI522 | −0.0606 | |SGI522|/(|SGI522|+TP5) | 0.1125 |
| HIF611 | 0.2938 | HIF611/HOI | 0.1009 | SGI611 | 0.0062 | |SGI611|/(|SGI611|+TP6) | 0.0083 |
| HIF612 | 1.1129 | HIF612/HOI | 0.3823 | SGI612 | −0.0602 | |SGI612|/(|SGI612|+TP6) | 0.0755 |
| HIF613 | 1.8462 | HIF613/HOI | 0.6342 | SGI613 | −0.1211 | |SGI613|/(|SGI613|+TP6) | 0.1411 |
| HIF621 | 0.5709 | HIF621/HOI | 0.1961 | SGI621 | 0.0998 | |SGI621|/(|SGI621|+TP6) | 0.1193 |

Although the present invention is disclosed by the aforementioned embodiments, those embodiments do not serve to limit the scope of the present invention. A person skilled in the art could perform various alterations and modifications to the present invention, without departing from the spirit and the scope of the present invention. Hence, the scope of the present invention should be defined by the following appended claims.

Despite the fact that the present invention is specifically presented and illustrated with reference to the exemplary embodiments thereof, it should be apparent to a person skilled in the art that, various modifications could be performed to the forms and details of the present invention, without departing from the scope and spirit of the present invention defined in the claims and their equivalence.

What is claimed is:

1. An optical image capturing system, from an object side to an image side, comprising:
    a first lens with refractive power;
    a second lens with refractive power;
    a third lens with refractive power;
    a fourth lens with refractive power;
    a fifth lens with refractive power;
    a sixth lens with refractive power;
    a first image plane, which is an image plane specifically for visible light and perpendicular to an optical axis, and through focus modulation transfer rates (MTF) of the central field of view of the first image plane having a maximum value at a first spatial frequency; and
    a second image plane, which is an image plane specifically for infrared light and perpendicular to the optical axis, and through focus modulation transfer rates (MTF) of the central field of view of the second image plane having a maximum value at the first spatial frequency;
    wherein the optical image capturing system has only six lenses with refractive powers, and the optical image capturing system has a maximum image height HOI on the first image plane that is perpendicular to the optical axis, and there is at least one lens having positive refractive power among the first lens to the sixth lens, the focal lengths of the six lenses are respectively f1, f2, f3, f4, f5 and f6, and a focal length of the optical image capturing system is f, and an entrance pupil diameter of the optical image capturing system is HEP, there is a distance HOS on the optical axis from an object side of the first lens to the first image plane, there is a distance InTL on the optical axis from the object side of the first lens to an image side of the sixth lens, a half maximum angle of view of the optical image capturing system is HAF, a distance on the optical axis between the first image plane and the second image plane is FS, there is at least one lens made of the plastic material among the first lens to the sixth lens, thicknesses of the first lens through the sixth lens at a height of ½ HEP and parallel to the optical axis are respectively ETP1, ETP2, ETP3, ETP4, ETP5 and ETP6, a sum of ETP1 to ETP6 is SETP, thicknesses of the first lens through the sixth lens on the optical axis are respectively TP1, TP2, TP3, TP4, TP5 and TP6, a sum of TP1 to TP6 is STP, and the optical image capturing system meets the following conditions: 1.0≤f/HEP≤10.0; 0 deg<HAF≤150 deg; 0.2≤SETP/STP<:1 and |FS|≤15 μm.

2. The optical image capturing system of claim 1, wherein a wavelength of infrared light ranges from 700 nm to 1300 nm, the first spatial frequency is expressed as SP1, and the following condition is satisfied: SP1≤440 cycles/mm.

3. The optical image capturing system of claim 1, the distance on the optical axis between the second lens and the third lens is IN23, the distance on the optical axis between the fifth lens and the sixth lens is IN56, and the following condition is satisfied: IN23>IN56.

4. The optical image capturing system of claim 1, the distance on the optical axis between the fourth lens and the fifth lens is IN45, the distance on the optical axis between the fifth lens and the sixth lens is IN56, and the following condition is satisfied: IN45>IN56.

5. The optical image capturing system of claim 1, wherein the optical image capturing system meets the following condition: HOS/HOI≤1.52.

6. The optical image capturing system of claim 1, wherein the distance parallel to the optical axis between a first coordinate point at a height of ½ HEP on the object side of the first lens and the first image plane is ETL, the distance parallel to the optical axis between a second coordinate point at a height of ½ HEP on the image side of the sixth lens and the first coordinate point at a height of ½ HEP on the object side of the first lens is EIN, and the following condition is satisfied: 0.2≤EIN/ETL<1.

7. The optical image capturing system of claim 1, wherein thicknesses of the first lens through the sixth lens at a height of ½ HEP and parallel to the optical axis are respectively ETP1, ETP2, ETP3, ETP4, ETP5, ETP6, a sum of ETP1 to ETP5 is SETP and the following condition is satisfied: 0.2≤SETP/EIN<1.

8. The optical image capturing system of claim 1, wherein the distance parallel to the optical axis between a second coordinate point at a height of ½ HEP on the image side of the sixth lens and the first image plane is EBL, the distance parallel to the optical axis between an intersection point on the image side of the sixth lens crossing the optical axis and the first image plane is BL, and the following condition is satisfied: 0.1≤EBL/BL≤1.1.

9. The optical image capturing system of claim 1, further comprising an aperture, wherein a distance from the aperture to the first image plane on the optical axis is InS, and the following condition is satisfied: 0.2≤InS/HOS≤1.1.

10. An optical image capturing system, from an object side to an image side, comprising:
a first lens with refractive power:
a second lens with refractive power;
a third lens with refractive power; wherein an image side thereof on an optical axis is a convex surface,
a fourth lens with refractive power;
a fifth lens with refractive power; wherein an object side thereof on the optical axis is a convex surface;
a sixth lens with refractive power;
a first image plane, which is an image plane specifically for visible light and perpendicular to the optical axis, and through focus modulation transfer rates (MTF) of the central field of view of the first image plane having a maximum value at a first spatial frequency, and the first spatial frequency being 110 cycles/mm; and
a second image plane, which is an image plane specifically for infrared light and perpendicular to the optical axis, and through focus modulation transfer rates (MTF) of the central field of view of the second image plane having a maximum value at the first spatial frequency, and the first spatial frequency being 110 cycles/mm;
wherein the optical image capturing system has only six lenses with refractive powers, and the optical image capturing system has a maximum image height HOI on the first image plane that is perpendicular to the optical axis, there is at least one lens having positive refractive power among the first lens to the sixth lens, focal lengths of the six lenses are respectively f1, f2, f3, f4, f5 and f6, and the focal length of the optical image capturing system is f, and the entrance pupil diameter of the optical image capturing system is HEP, there is a distance HOS on the optical axis from an object side of the first lens to the first image plane, there is a distance InTL on the optical axis from the object side of the first lens to an image side of the sixth lens, the half maximum angle of view of the optical image capturing system is HAF, the distance on the optical axis between the first image plane and the second image plane is FS, the distance parallel to the optical axis between a first coordinate point at a height of ½ HEP on the object side of the first lens and the first image plane is ETL, the distance parallel to the optical axis between a second coordinate point at a height of ½ HEP on the image side of the sixth lens and the first coordinate point at a height of ½ HEP on the object side of the first lens is EIN and the optical image capturing system meets the following conditions: 1≤f/HEP≤10; 0 deg<HAF≤150 deg; 0.2≤EIN/ETL<1 and |FS|≤15 μm.

11. The optical image capturing system of claim 10, wherein there is at least two lenses made of plastic material among the first lens to the sixth lens.

12. The optical image capturing system of claim 10, wherein the modulation transfer rates (value of MTF) of visible light at the spatial frequency of 110 cycles/mm at positions of the optical axis, 0.3HOI and 0.7HOI on the first image plane are respectively expressed as MTFQ0、MTFQ3 and MTFQ7 and the following conditions are satisfied: MTFQ0≥0.2; MTFQ3≥0.01; and MTFQ7≥0.01.

13. The optical image capturing system of claim 10, the distance on the optical axis between the second lens and the third lens is IN23, the distance on the optical axis between the fourth lens and the fifth lens is IN45, the distance on the optical axis between the fifth lens and the sixth lens is IN56, and the following conditions are satisfied: IN45>IN56 and IN23>IN56.

14. The optical image capturing system of claim 10, wherein an object side of the fourth lens on the optical axis is concave surface.

15. The optical image capturing system of claim 10, wherein an image side of the second lens on the optical axis is concave surface.

16. The optical image capturing system of claim 10, wherein an image side of the first lens on the optical axis is a convex surface.

17. The optical image capturing system of claim 10, wherein at least one lens among the first lens, the second lens, the third lens, the fourth lens, the fifth lens and the sixth lens is a filtering element for light with a wavelength of less than 500 nm.

18. The optical image capturing system of claim 10, wherein a distance on the optical axis between the fifth lens and the sixth lens is IN56, and the thicknesses of the fifth lens and the sixth lens on the optical axis are respectively TP5 and TP6, and the following condition is satisfied: 0.1≤(TP6+IN56)/TP5≤50.

19. The optical image capturing system of claim 10, wherein at least one lens among the first lens to the sixth lens has at least three inflection point on at least one surface thereof.

20. An optical image capturing system, from an object side to an image side, comprising:
a first lens with refractive power;
a second lens with refractive power; wherein an image side thereof on an optical axis is concave surface;
a third lens with refractive power; wherein an image side thereof on the optical axis is a convex surface;
a fourth lens with refractive power;
a fifth lens with refractive power; wherein both an object side and an image side thereof on the optical axis are convex surfaces;
a sixth lens with refractive power;
a first average image plane, which is an image plane specifically for visible light and perpendicular to the optical axis and the first average image plane is disposed at the average position of the defocusing positions, where through focus modulation transfer rates (values of MTF) of visible light at central field of view, 0.3 field of view, and 0.7 field of view of the optical image capturing system are respectively at corresponding maximum at a first spatial frequency, and the first spatial frequency being 110 cycles/mm; and a second average image plane, which is an image plane specifically for infrared light and perpendicular to the optical axis and the second average image plane is disposed at the average position of the defocusing positions, where through focus modulation transfer rates of infrared light (values of MTF) at central field of view, 0.3 field of view, and 0.7 field of view the optical image capturing system are respectively at corresponding maximum at the first spatial frequency, and the first spatial frequency being 110 cycles/mm;

wherein the optical image capturing system has only six lenses with refractive powers, and the optical image capturing system has a maximum image height HOI on the first image plane that is perpendicular to the optical axis, focal lengths of the six lenses are respectively f1, f2, f3, f4, f5 and f6, and the focal length of the optical image capturing system is f, and the entrance pupil diameter of the optical image capturing system is HEP, the half maximum angle of view of the optical image capturing system is HAF, there is a distance HOS on the optical axis from an object side of the first lens to the first image plane, there is a distance InTL on the optical axis from the object side of the first lens to an image side of the sixth lens, a distance on the optical axis between the first average image plane and the second average image plane is AFS, the thicknesses of the first lens through the sixth lens at a height of ½ HEP and parallel to the optical axis are respectively ETP1, ETP2, ETP3, ETP4, ETP5 and ETP6, a sum of ETP1 to ETP6 is SETP, the thicknesses of the first lens through sixth lens on the optical axis are respectively TP1, TP2, TP3, TP4, TP5 and TP6, a sum of TP1 to TP6 is STP, and the optical image capturing system meets the following conditions: $1.0 \leq f/HEP \leq 10.0$; $0$ deg$<HAF \leq 150$ deg; $0.2 \leq SETP/STP<1$ and $|AFS| \leq 15$ μm.

21. The optical image capturing system of claim 20, wherein the distance parallel to the optical axis between a first coordinate point at a height of ½ HEP on the object side of the first lens and the first image plane is ETL, the distance parallel to the optical axis between a second coordinate point at a height of ½ HEP on the image side of the sixth lens and the first coordinate point at a height of ½ HEP on the object side of the first lens is EIN, and the following condition is satisfied: $0.2 \leq EIN/ETL<1$.

22. The optical image capturing system of claim 20, wherein the optical image capturing system meets the following condition: $HOS/HOI \leq 1.52$.

23. The optical image capturing system of claim 20, the distance on the optical axis between the second lens and the third lens is IN23, the distance on the optical axis between the fourth lens and the fifth lens is IN45, the distance on the optical axis between the fifth lens and the sixth lens is IN56, and the following conditions are satisfied: IN45>IN56 and IN23>IN56.

24. The optical image capturing system of claim 20, wherein an object side of the fourth lens on the optical axis are a concave surface and an image side of the first lens on the optical axis are a convex surface.

25. The optical image capturing system of claim 20, wherein the optical image capturing system further includes an aperture and an image sensing device, and the image sensing device is disposed on the first average image plane and is provided with at least 100 thousand pixels, and there is a distance InS on the optical axis from the aperture to the first average image plane, and the following condition is satisfied: $0.2 \leq InS/HOS \leq 1.1$.

* * * * *